(12) United States Patent
Lamport

(10) Patent No.: US 7,558,883 B1
(45) Date of Patent: *Jul. 7, 2009

(54) FAST TRANSACTION COMMIT

(75) Inventor: Leslie B. Lamport, Palo Alto, CA (US)

(73) Assignee: Microsoft Corporation, Redmond, WA (US)

( * ) Notice: Subject to any disclaimer, the term of this patent is extended or adjusted under 35 U.S.C. 154(b) by 874 days.

This patent is subject to a terminal disclaimer.

(21) Appl. No.: 10/184,767

(22) Filed: Jun. 28, 2002

(51) Int. Cl.
*G06F 15/16* (2006.01)

(52) U.S. Cl. ..................... 709/248; 709/201

(58) Field of Classification Search ............... 709/203, 709/205, 208, 248, 201, 220, 223
See application file for complete search history.

(56) References Cited

U.S. PATENT DOCUMENTS

| | | | |
|---|---|---|---|
| 5,261,085 A * | 11/1993 | Lamport | 714/4 |
| 6,202,067 B1 * | 3/2001 | Blood et al. | 707/10 |
| 6,351,811 B1 | 2/2002 | Groshon et al. | |
| 6,463,532 B1 * | 10/2002 | Reuter et al. | 709/224 |
| 6,587,860 B1 * | 7/2003 | Chandra et al. | 707/202 |
| 6,671,821 B1 * | 12/2003 | Castro et al. | 714/4 |
| 6,704,887 B2 | 3/2004 | Kwiat et al. | |
| 6,754,845 B2 | 6/2004 | Kursawe et al. | |
| 6,826,601 B2 * | 11/2004 | Jacobs et al. | 709/217 |
| 6,912,713 B2 * | 6/2005 | Badovinatz et al. | 718/106 |
| 6,931,431 B2 * | 8/2005 | Cachin et al. | 709/205 |
| 2002/0116611 A1 | 8/2002 | Zhou et al. | |

OTHER PUBLICATIONS

Roberto De Prisco, Revisiting the PAXOS algorithm, MIT Laboratory for computer science, revised Jul. 1999, pp. 35-91.*

Li Gong, Byzantine Agreement with Authentication, SRI international, Sep. 1995, pp. 1-12.*

Schneider, F.; Implementing Fault-tolerant Services Using the State Machine Approach: A Tutorial; *Computing Surveys*, 22(3):299-319, Sep. 1990.

(Continued)

*Primary Examiner*—John Follansbee
*Assistant Examiner*—Kamal Divecha

(57) ABSTRACT

A distributed computing system, having a sufficient number of devices and requiring a sufficiently large number of devices to select any proposal, can maintain synchronization between its constituent devices and respond to client requests with as few as two message delays. A leader can synchronize the devices of the system and establish a safe proposal number for all current and future steps of the system. Devices can then receive client requests directly, treating the request as a proposal having the proposal number determined previously by the leader, and voting for the proposal. If the client receives an indication from a least a quorum of devices, where a quorum can be the minimum number of devices that can be operational at a given time, the client can know that the request was selected. If two or more clients attempt to request different functions at approximately the same time, the system may not select either request, in which case a leader can be requested to determine if any requests may have been selected, and to reestablish a safe proposal number. Systems with fewer devices can also implement the message-delay-reducing algorithm if they can also revert to the standard Paxos algorithm if an insufficient number of devices are operational. Such algorithms can be used to provide an efficient method for determining whether to commit or abort a client transaction.

10 Claims, 43 Drawing Sheets

OTHER PUBLICATIONS

Deswarte, Y. et al; Intrusion Tolerance in Distributed Computing Systems; *Proceedings of the 1991 IEEE Symposium on Research in Security and Privacy*; pp. 110-121, May 1991.

Canetti, R. et al.; Fast asynchronous Byzantine agreement with optimal resilence; *Proc. 25th Annual ACM Symposium on Theory of Computing (STOC)*, pp. 42-51, 1993.

Reiter, M; How to Securely Replicate Services; *ACM Transactions on Programming Languages and Systems*, vol. 16, No. 3, pp. 986-1009, May 1994.

Reiter, M. K.; Secure Agreement Protocols: Reliable and Atomic Group Multicast in Rampart; *Proceedings of the 2nd ACM Conference on Computer and Communications Security*, pp. 68-80, Fairfax, Virginia, Nov. 1994.

Gong, L. et al.; Byzantine Agreement With Authentication: Observations and Applications in Tolerating Hybrid and Link Faults; *Dependable Computing for Critical Applications—5*, pp. 79-90, IFIP WG'10.4, preliminary proceedings, 1995.

Reiter, M. K.; The Ramport toolkit for building high-integrity services; *Theory and Practice in Distributed Systems, International Workshop, Selected Papers, Lecture Notes in Computer Science*, vol. 938, K. P. Birman, F. Mattern, and A. Schiper, Eds., Springer-Verlag, Berlin, 99-110, 1995.

Reiter, M. K.; Distributing Trust With the Rampart Toolkit; *Communications of the ACM*; 39, 4 pp. 71-74, Apr. 1996.

Malkhi, D. et al.; A high-Throughput Secure Reliable Multicast Protocol; *Proceedings of the 9th Computer Security Foundations Workshop*, Kenmore, Ireland, pp. 9-17, Jun. 1996.

Malkhi, D. et al.; A High-Throughput Secure Reliable Multicast Protocol; *Journal of Computer Security*. Also in *Proceedings of the $9^{th}$ IEEE Computer Security Foundations Workshop*, pp. 9-17, Jun. 1996.

Malkhi, D. et al.; Byzantine Quorum Systems; *Proceedings of the 29th ACM Symposium on Theory of Computing*, May 1997.

Malkhi, D. et al.; The Load and Availability of Byzantine Quorum Systems; *Proceedings $16^{th}$ ACM Symposium on Principles of Distributed Computing (PODC)*, pp. 249-257, Aug. 1997.

Kihlstrom, K. P. et al.; The SecureRing Protocols for Securing Group Communication; *Proceedings of the 31st Hawaii International Conference on System Sciences*, vol. 3, pp. 317-326, Jan. 1998.

Malkhi, D. et al.; Secure and Scalable Replication in Phalanx; *Proceedings of the 17th IEEE Symposium on Reliable Distirbuted Systems*; p. 51-58, West Lafayette, Indiana, USA, Oct. 1998.

Malkhi, D. et al.; Byzantine Quorum Systems; *Distributed Computing*; vol. 11, No. 4, p. 203-213, 1998.

Goldberg, A. et al.; Towards an Archival Intermemory; *International Forum on Research and Technology Advances in Digital Libraries*; IEEE, pp. 147-156, 1998.

Hartman, J.H. et al.; The Swarm Scalable Storage System; *19th ICDCS*; pp. 74-81, 1999.

Guerraoui, Rachid et al.; *Reducing the Cost for Non-Blocking in Atomic Commitment*; Département d'Informatique, Ecole Polytechnique Fedérale de Lausanne, pp. 1-11, May 1996.

Hayashibara, Noahiro et al.; *Performance Comparison Between the Paxos and Chandra-Toueg Consensus Algorithms*; Département d'Informatique, Ecole Polytechnique Fedérale de Lausanne; Technical Report IC-2002-61, pp. 1-11, Aug. 2002.

Awerbuch, Baruch et al.; *Maintaining Database Consistency in Peer to Peer Networks*; Department of Computer Science, John Hopkins University; Technical Report CNDS-2002-1, pp. 1-14, Feb. 6, 2002.

Birrell, Andrew D. et al.; *The Echo Distributed File System*; Digital Equipment Corp. Systems Research Center; Technical Report 111, pp. 1-22, Sep. 10, 1993.

Liskov, Barbara et al.; *Replication in the Harp File System*; Proceedings of the $13^{th}$ Symposium on Operating System Principles, 13 pp., Oct. 1991.

Hisgen, Andy et al.; *New-Value Logging in the Echo Replicated File System*; Digital Equipment Corp. Systems Research Center, Research Report 104, pp. 1-39, Jun. 1993.

Long, Darrell D.E. et al.; *Voting with Regenerable Volatile Witnesses*; University of California Computer and Information Sciences; Technical Report, pp. 1-20, Apr. 1990.

Swart, Garret et al.; *Availability in the Echo File System*; Digital Equipment Corp. Systems Research Center, Research Report 112, pp. 1-43, Sep. 1993.

Adya, A., et al.; FARSITE: Federated, Available, and Reliable Storage for an Incompletely Trusted Environment.; *In Proc. $5^{th}$ OSDI*, Boston, MA, pp. 1-14, Dec. 2002.

Castro, M., *Practical Byzantine Fault Tolerance*; Ph.D. Thesis Technical Report MIT-LCS-TR-817, MIT, Jan. 2001.

Chockler, G. V., et al., Group Communication Specifications: A Comprehensive Study; *ACM Computing Surveys*, pp. 33(4):427-469, Dec. 2001.

Deprisco, R., et al., Revisiting the Paxos Algorithm; *In Proc. $11^{th}$ Int'l Workshop on Distributed Algorithms*, pp. 111-125, Sep. 1997.

Lamport, L., Using Time Instead of Timeout for Fault Tolerance in Distributed Systems; *ACM Transactions on Programming Languages and Systems (TOPLAS)*, pp. 6(2):264-280, Apr. 1984.

Lamport, L., et al., Cheap Paxos; *In Proc. International Conference on Dependable Systems and Networks (DSN)*, Florence, Italy, 2004.

Lynch, N., et al., RAMBO: A Reconfigurable Atomic Memory Service for Dynamic Networks; *In Proc. $16^{th}$ International Symposium on Distributed Computing*, Toulouse, France, pp. 173-190, Oct. 2002.

Narasimhan, P., et al., *Replica Consistency of CORBA Objects in Partitionable Distributed Systems*, 1997.

Oki, B.M., *Viewstamped Replication for Highly Available Distributed Systems*; Ph.D. Thesis Technical Report MIT/LCS/TR-423, MIT, Aug. 1988.

Oki, B.M., et al., Viewstamped Replication: A New Primary Copy Method to Support Highly-Available Distributed Systems; *In Proc. $7^{th}$ Symposium on Principles of Distributed Computing*, Aug. 1988, pp. 8-17.

Rodrigues, R., et al., BASE: Using Abstractions to Improve Fault Tolerance; *In Proc. $18^{th}$ ACM Symposium on Operating System Principles*, Bantt, Canada, pp. 15-28, Oct. 2001.

Schneider, F.B., Synchronization in Distributed Programs; ACM Transactions on Programming Languages and Systems (TOPLAS; pp. 4(2):125-148.), Apr. 1982.

Yu, H., et al., Consistent and Automatic Replica Regeneration; *In Proc. $1^{st}$ NSDI*, San Francisco, CA, pp. 323-326, 2004.

Pedone, F., et al., Handling Message Semantics with Generic Broadcast Protocols, *Distributed Computing* 15, pp. 97-107, 2002.

Cukier, M., et al., AQuA: An Adaptive Architecture that Provides Dependable Distributed Objects, *In Proc. $17^{th}$ Symposium on Reliable Distributed Systems*, pp. 245-253, West Lafayette, IN, Oct. 1998.

Cukier, M., et al., AQuA: An Adaptive Architecture that Provides Dependable Distributed Objects, *IEEE Transactions on Computers*, vol. 52, No. 1, pp. 31-50, Jan. 2003.

Charron-Bost, Bernadette, et al., Uniform Consensus is Harder than Consensus (extended abstract), *Technical Report DSC/2000/028*, Switzerland, May 2000.

DePrisco, Robert, et al., Revisiting the PAXOS Algorithm, *Theroretical Computer Science*, 243:35-91, 2000.

Fischer, Michael J., et al., Impossibility of Distributed Consensus with One Faulty Process, *Journal of the ACM*, 32(2):374-382, Apr. 1985.

Lamport, Leslie, Lower Bounds for Asynchronous Consensus, in *Future Distributed Computing*, vol. 2584 *of Lecture Notes in Computer Science*, pp. 22-23, Spring, 2003.

Mazurkiewicz, A., *Semantics of Concurrent Systems; A Modular Fixed-Point Trace Approach*, Institute of Computer Science, Poland, pp. 353-375.

Keidar, Idit, et al.; On the Cost of Fault-Tolerant Consensus When There Are No Faults—A Tutorial; SIGACT News 32(2), *Distributed Computing* column, pp. 45-63; Jun. 2001.

Dwork, Cynthia, et al.; Consensus in the Presence Of Partial Synchrony; *Journal of the ACM*, 35(2):288-323, Apr. 1988.

Lampson, Butler W.; How to Build a Highly Available System Using Consensus; http://www.research.microsoft.com.

Lamport, Leslie; The Implementation of Reliable Distributed Multiprocess Systems; *Computer Networks*, 2:95-114, 1978.

Lamport, Leslie, et al.; The Byzantine Generals Problem; *ACM Transactions on Programming Languages and Systems*, vol. 4, No. 3, Jul. 1982, pp. 382-401.

Lamport, Leslie, "Time, Clocks, and the Ordering of Events in a Distributed System", *Communication of the ACM*, 21(7):558-565, Jul. 1978.

Lamport, Leslie, "The Part-Time Parliament", *ACM Transactions on Computer Systems* 16, 2 (May 1998), pp. 133-169. Also appeared as SRC Research Report 49.

Lamport, Leslie, "Paxos Made Simple", *ACM SIGACT* News (Distributed Computing Column), 32,4 (Whole No. 121, Dec. 2001) pp. 18-25.

Lampson, Butler W., "The ABCD's of Paxos", Presented at *Principles of Distributed Computing*, 2001, as one of the papers celebrating Leslie Lamport's 60th Birthday, Retrieved from http://research.microsoft.com/lampson/65-ABCDPaxos/Acrobat.pdf.

Castro, Miguel, et al., "Practical Byzantien Fault Tolerance", appears in *Proceedings of the Third-Symposium on Operating Design and Implementation*, New Orleans, USA, Feb. 1999, pp. 1-14.

Castro, Miguel, et al., "Proactive Recovery in a Byzantine-Fault-Tolerant System", appears in the *Proceedings of the Fourth Symposium on Operating Systems Design and Implementation* (OSDI '00), San Diego, USA, Oct. 2000, pp. 1-15.

Huang, Yennun, et al., "Software Rejuvenation: Analysis, Module and Applications", *Proc. International Symposium on Fault Tolerant Computing*, pp. 381-390, (1995).

Bracha, Gabriel, "An asynchronous $\lfloor(\eta-1)/3\rfloor$-resilient consensus protocol" this paper was Presented at the *ACM Symposium on Principles of Distributed Computing* 1984, pp. 154-162.

Keidar, Idit, et al., "Moshe: A Group Membership Service for WANs" to appear in *ACM Transactions on Computer Systems* (*TOCS*), Aug. 2002, pp. 1-47, Retrieved from http://theory.1cs.mit.edu/~idish/ftp/moshe-tocs02.pdf.

Khazan, Roger, I., "A One-Round Algorithm for Virtually Synchronous Group Communication in Wide Area Networks", PH.D. dissertation, Department of Electrical Engineering and Computer Science. MIT., May 22, 2002. Thesis Supervisors: Prof. Nancy A. Lynch and Dr. Idit Keidar. Retrieved from http://theory.1cs.mit.edu/~roger/Research/Papers /khazan-phd.pdf.

Anceaume et al., "Converging Toward Decision Conditions" $6^{th}$ *International Conference on Principles of Distributed Systems*, France, pp. 53-63 (Dec. 11-13, 2002).

Mostefaoui et al., "IRISA Research Report No. 1355" (Oct. 2000).

Brasileiro et al., "IRISA Research Report No. 1321" (Apr. 2000).

\* cited by examiner

FAST TRANSACTION COMMIT

TECHNICAL FIELD

This invention relates generally to distributed computing and, more particularly, relates to reducing messages delays of distributed computing.

BACKGROUND OF THE INVENTION

As personal computing devices become more powerful, containing increased storage space and processing capabilities, the average user consumes an increasingly smaller percentage of those resources in performing everyday tasks. Thus, many of today's personal computing devices are often not used to their full potential because their computing abilities greatly exceed the demands most users place upon them. An increasingly popular method of deriving use and value from the unused resources of powerful modern personal computing devices is a distributed computing system, in which the computing devices act in coordination with one another to perform tasks and maintain data.

A distributed computing system can utilize a number of interconnected computing devices to achieve the performance and storage capabilities of a larger, more-expensive computing device. Thus, while each personal computing device may only have a few gigabytes of usable storage space, a distributed computing system comprising a number of such devices, can aggregate the available storage space on each individual device and present to a user a terabyte or more of useable storage space. Similarly, a distributed computing system can present to a user a large amount of useable processing power by dividing the user's tasks into smaller segments and transmitting the segments to the individual devices for processing in parallel.

To effectively derive value from the unused capabilities of modern personal computing devices, a distributed computing system should not interfere with the individual use of each personal computing device. By allowing individual users to retain control of the devices, however, the reliability of each device is greatly decreased. To compensate for the increased risk that the individual computing device may become disconnected from the network, turned off, suffer a system malfunction, or otherwise become unusable to the distributing computing system, redundancy can be used to allow the distributed computing system to remain operational. Thus, the information stored on any one personal computing device can be redundantly stored on at least one additional similar personal computing device, allowing the information to remain accessible, even if one of the personal computing devices fails.

Alternatively, a distributed computing system can practice complete redundancy, in which every device within the system performs identical tasks and stores identical information. Such a system can allow users to continue to perform useful operations even if all but one of the devices should fail. Alternatively, such a system can be used to allow multiple copies of the same information to be distributed throughout a geographic region. For example, a multi-national corporation can establish a world-wide distributed computing system. Such a corporation might use a number of high performance server computing devices, rather than less powerful personal computing devices, because each individual computing device would be required to service many users within that geographic region. The individual high performance devices can each perform identical tasks and store identical data, allowing users who merely seek to access the data to obtain such access from a high performance device located in a convenient location for that user.

However, distributed computing systems can be difficult to maintain due to the complexity of properly synchronizing the individual devices that comprise the system. Because timekeeping across individual processes can be difficult at best, a state machine approach is often used to coordinate activity among the individual devices. A state machine can be described by a set of states, a set of commands, a set of responses, and functions that link each response/state pair to each command/state pair. A state machine can execute a command by changing its state and producing a response. Thus, a state machine can be completely described by its current state and the action it is about to perform, removing the need to use precise time-keeping.

The current state of a state machine is, therefore, dependent upon its previous state, the commands performed since then, and the order in which those commands were performed. To maintain synchronization between two or more state machines, a common initial state can be established, and each state machine can, beginning with the initial state, execute the identical commands in the identical order. Therefore, to synchronize one state machine to another, a determination of the commands performed by the other state machine needs to be made. The problem of synchronization, therefore, becomes a problem of determining the order of the commands performed, or, more specifically, determining the particular command performed for a given step.

One mechanism for determining which command is to be performed for a given step is known as the Paxos algorithm. In the Paxos algorithm, any of the individual devices can act as a leader and seek to propose that a given function be executed by every device in the system as the command to be performed for a given step. Every such proposal can be sent with a proposal number to more easily track the proposals. Such proposal numbers need not bear any relation to the particular step for which the devices are attempting to agree upon a command to perform. Initially, the leader can suggest a proposal number for a proposal the leader intends to submit. Each of the remaining devices can then respond to the leader's suggestion of a proposal number with an indication of the last proposal they voted for, or an indication that they have not voted for any proposals. If, through the various responses, the leader does not learn of any other proposals that were voted for by the devices, the leader can propose that a given function be executed by the devices, using the proposal number suggested in the earlier message. Each device can, at that stage, determine whether to vote for the action or reject it. A device should only reject an action if it has responded to another leader's suggestion of a different proposal number. If a sufficient number of devices, known as a quorum, vote for the proposal, the proposed action is said to have been agreed upon, and each device performs the action and transmits the results. In such a manner, an agreed upon command can be determined to be performed for a given step, maintaining the same state among all of the devices.

Generally, the Paxos algorithm can be though of in two phases, with an initial phase that allows a leader to learn of prior proposals that were voted on by the devices, as described above, and a second phase in which the leader can propose functions for execution. Once the leader has learned of prior proposals, it need not continually repeat the first phase. Instead, the leader can continually repeat the second phase, proposing a series of functions, that can be executed by the distributed computing system in multiple steps. In such a manner, while each function performed by the distributed computing system for each step can be though of as one instance of the Paxos algorithm, the leader need not wait for the devices to vote on a proposed function for a given step before proposing another function for the next step.

The distributed computing system, as a whole, can be modeled as a state machine. Thus, a distributed computing system implementing complete redundancy can be one in which each of the devices replicate the state of the overall system. Such a system requires that each device maintain the same state. If some devices believe that one function was executed, while a second group of devices believes that a second function was executed, the overall system no longer operates as a single state machine. To avoid such a situation, a majority of the devices can be generally required to select a proposed function for execution by the system. Because any two groups of devices, each having a majority, must share at least one device, mechanisms, such as the Paxos algorithm, can be implemented that rely on the at least one common device to prevent two groups, each containing a majority of devices, to select differing proposed functions.

The Paxos algorithm, however, requires at least two message delays between the time when a device that is part of the distributed computing system receives a request from a client and the time when the distributed computing system has agreed upon the execution of the proposed function requested by the client, executes that function, and transmits the results back to the client. Furthermore, the Paxos algorithm can require the presence of a leader device that receives client requests and determines the appropriate functions to submit for a vote to the devices of the distributed computing system. Should such a leader device fail, a new leader may not take its place immediately, leaving the distributed computing system idle and the client waiting for a response to its requests.

SUMMARY OF THE INVENTION

By increasing the number of computing devices used in a distributed computing system, and increasing the number of devices required to select a given proposal, clients can be provided responses to their requests more efficiently, and with fewer messages delays. If a proposal is selected by a sufficiently large number of devices such that any other grouping of devices in the system, having at least the same number devices, contains a majority of devices from the first grouping, the need for a leader device to ensure that there is only one function proposed by each proposal number can be reduced, while maintaining consistency among the devices. Therefore, if the number of devices required to select a proposed function for execution is set to be the minimum number of operational devices at any one time, a distributed computing system having more than three times more devices than the number of devices that can be experiencing a failure at any given time can implement the algorithms contemplated by the present invention.

Initially, a leader can suggest a proposal number to be used in proposing, to the devices, functions to be executed by the distributed computing system. In response, each of the devices can each respond with a message indicating the largest numbered proposal for which that device previously voted, or a message indicating that the device has not previously voted for a proposal. If any of the devices respond with an indication of a previous vote, the leader can determine if a majority of the devices in a quorum voted for a particular proposal, and if so, the leader can submit that proposal to the devices for a vote. A quorum can be any collection of devices having at least as many devices as the minimum number of devices that can be operational at a any time. If none of the proposals were voted for by at least a majority of some quorum of devices, then the leader can either attempt to determine which proposal to submit to the devices for a vote, or because, as will be described below, the leader may not be able to do so, the leader can signal an abort.

The leader can suggest a proposal number for all current and future the steps of the distributed computing system and can attempt to submit for a vote any functions that had been voted for by at least a majority of the devices in any quorum. Each successful vote can select a function for execution by the system for a given step, and can advance the system to the next step. After some initial steps, the remaining steps of the distributed computing system are not likely to have had any functions proposed for them and, consequently, none of the devices would indicate that they had voted for them. Thus, for these remaining steps, the proposal number suggested by the leader is safe for any proposals. As a result, the leader can signal to the devices and to any clients of the distributed computing system that the clients can send their requests directly to the devices.

The client can, therefore, send a request, that the distributed computing system execute a function on behalf of that client, directly to one of the devices of the distributed computing system. Upon receiving the request, the device can propose the client's request to the devices using the proposal number suggested by the leader. Alternatively, the client can send the request to all of the devices, or at least a quorum of devices. Upon receiving the request, the devices can internally treat the request as a proposal having the proposal number suggested by the leader. The devices can independently determine whether to vote for the proposal by checking whether they have previously voted for a proposal with the same proposal number or whether they have responded to a different proposal number suggestion message. In either case, the device should not vote for the proposal; otherwise its should vote for the proposal and execute the function specified. Each device can then provide the results of the function to the client, or to a leader. A response from a quorum of devices can indicate that the proposal was accepted and the function performed.

Because a leader device does not coordinate the proposals to ensure that each proposal has a unique proposal number, different devices can receive requests from different clients and, using the same proposal number, vote for different functions as part of that singular proposal number. However, because the minimum number of operating devices at any one time can be necessary to select a function, if a function is selected by such a quorum, every other quorum can have, as at least a majority of its devices, the same devices that voted for the function. As a result, each quorum can only have one value for which a majority of its devices voted for, allowing the leader to step in, if necessary, and determine if a function was previously selected. Therefore, if two or more clients send requests to two or more devices, causing multiple proposals to be assigned the same proposal number, a leader can synchronize all of the devices by determining if a majority of the devices in a quorum voted for a proposal, and submitting that proposal for a vote to the remaining devices. In such a manner, the synchronization of the devices of the system is maintained despite the possibility that multiple devices may be attempting multiple proposals with the same proposal number.

A distributed computing system having fewer than three times more devices than the number of devices that can be exhibiting failures at any time can still implement the reduced message delay algorithm described generally above if a larger number of devices than the minimum number of properly functioning devices is needed to select a proposed function.

However, because such a system may not always have a sufficient number of devices to operate the reduced message delay algorithm properly; such as if the maximum number devices fail concurrently, the system can revert, in those cases, to the Paxos algorithm generally described above. A device or a leader can determine if a sufficient number of devices are operating properly based on the number of votes the device or leader receive in response to a proposal. If an insufficient number of devices are properly operating to implement the reduced message delay algorithm, a leader device can attempt to solicit votes for the pending proposal using the Paxos algorithm. Furthermore, because of an insufficient number of properly operating devices, client requests sent directly to devices can be forwarded to the leader and proposed using the Paxos algorithm.

The reduced message delay algorithm generally described above can be used for transaction commit applications, such as database access. A series of replica databases can act as a devices in a distributed computing system and can act as a client to that system. When a transaction occurs at the database, such that a commit or abort instruction is received, the synchronization of information across the replica databases can be maintained using the algorithms described generally above. Each database can act as a client and submit a commit or abort request to a device in the system. The devices of the system can wait for a request from all of the database replicas, and can then vote for a commit if requested by all of the replicas, or provide no vote for a commit request if any one of the replicas requested an abort. In addition, if one of the replicas fails, a leader can attempt to learn the proposal the replica made prior to failing and then submit the proposal again. Alternatively, if the leader cannot determine what the replica proposed, the leader can propose an abort.

Additional advantages of the invention will be made apparent from the following detailed description of illustrative embodiments which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Figure 1:
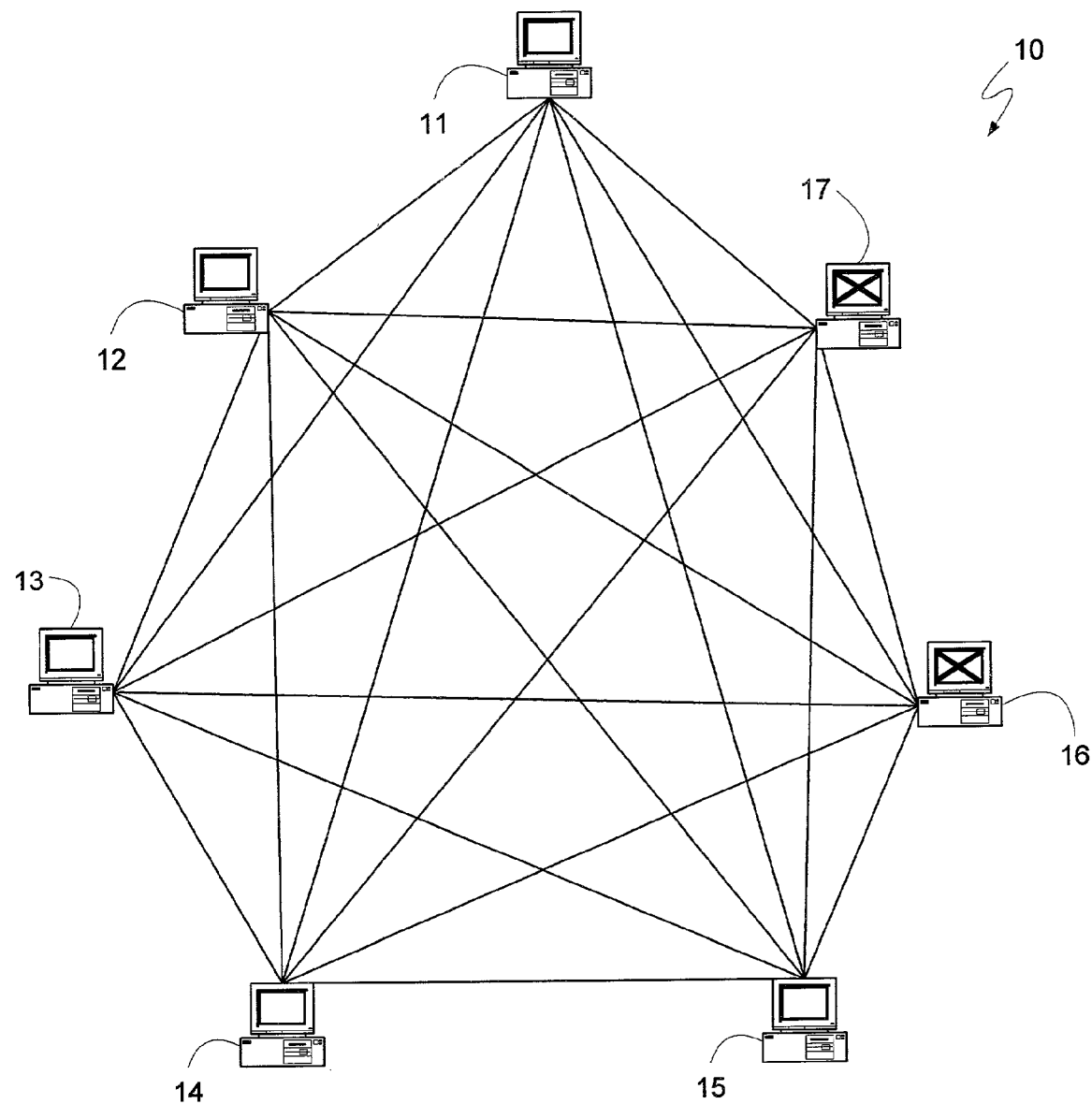
FIG. 1 is a block diagram generally illustrating an exemplary distributed computing system with which the present invention can be implemented.

A distributed computing system can be comprised of a number of individual personal computing devices, server computing devices, or other devices that have sufficient processor and storage abilities to participate in the system. The distributed computing system can aggregate the abilities of its constituent computing devices to either provide for greatly increased processing capabilities and storage space, or to implement redundancy, allowing multiple devices to provide access to the same information. Thus, one common usage for a distributed computing system is the aggregation of the unused processing capabilities and storage space of many different personal computing devices attached to a common network. Such a distributed computing system can maintain information regarding the system, such as which devices are currently part of the system and on which device a given set of information is stored. This information can be necessary for the devices to aggregate their capabilities and storage space and, as a result, each device may contain a copy. Synchronization of the information among the devices of the system can be facilitated through a state machine approach as described below.

Alternatively, an increasingly common usage for distributed computing systems is that of a network server device that can act as a central storage repository for various forms of information, such as a central database. Such a distributed system seeks to replicate the central store on all of its constituent devices so that every client seeking to communicate with the central storage can find a convenient and efficient device with which to communicate.

The distributed computing system can be thought of as a state machine, with the future state of the machine completely defined by the current state and the action to be taken. Each constituent device of the distributed computing system can then independently execute the state machine of the overall system. The state-machine approach can be implemented asynchronously such that precise synchrony across the constituent devices need not be maintained and synchronization between the devices can be achieved by setting an initial state for all of the devices and subsequently executing the same functions in the same order. A common method for maintaining synchronization is to allow the constituent devices of the distributed computing system to all agree upon the next function before executing that function, and to maintain a list of all of the functions that were executed. In such a manner, every device can have the same state and if a device fails it need only determine the last function it executed, identify, from the list, any functions that have been agreed upon since that last function, and execute those functions.

Such a distributed computing system acting as a server can be especially useful for serving a large amount of information to a diverse set of clients, such as a central database for a multi-national corporation, or a popular World Wide Web site. In such situations, a large number of clients can request information from the distributed computing system acting as a server. By implementing the server functionality across multiple devices, more clients can be serviced in parallel increasing the throughput of the overall system, and the server as a whole is far less prone to failure due to the increased redundancy.

One mechanism by which the constituent computing devices can agree upon the next function to execute is known as the Paxos algorithm. In the Paxos algorithm, as will be described further below, any device can act as a leader and transmit a suggestion for a proposal number to other devices within the distributed computing system. The other devices can respond with either an indication of the most recent proposal for which they have voted or an indication that they have not voted for any previous proposals. As explained above, each proposal can be transmitted with a proposal number, such that the proposal treated as most recent can be the proposal with the largest proposal number. To ensure that proposals with a larger proposal number are the most recent proposal considered by the device, devices can ignore later-in-time proposals that have smaller proposal numbers than the largest proposal number the device is aware of.

Once the leader that transmitted the suggested proposal number receives the responses from the other devices, it can determine which function to propose. Once a vote is requested for a proposal, each device will vote for the proposal unless it has, some time after the initial transmission of the proposal and prior to the requested vote, responded to a suggestion for a different proposal number. If a quorum of devices votes for the proposal, then the proposal is accepted, and the leader can transmit a message to all of the devices requesting that they execute the agreed upon function.

The Paxos algorithm, however, can introduce at least two message delays between the time when a leader receives a request from a client, which the leader can propose, and the time when the leader receives the votes from the devices deciding to execute the function and passes the results of the execution back to the client. Specifically, after a client requests the distributed computing system to perform a given task, the leader can, if the leader has previously polled the devices, submit the client's request as a proposed function for the system to execute. The submission of the proposed function for a vote by the devices can add one message delay. Similarly, the vote by the devices can add another message delay. If the vote approved the proposed function, that function can be executed and the results can be transmitted back to the client by the leader.

If the leader is not needed to implement the Paxos algorithm and maintain a single proposal per proposal number, at least one message delay can be eliminated from the time a client requests that a function be performed by the distributed computing device and the transmission of the results back to the client. The leader in the Paxos algorithm can ensure that only one function is proposed for any proposal number. However, if the minimum number of devices necessary to select a proposed function is increased from a simple majority, as in the Paxos algorithm, to the minimum number of operational devices at any one time, multiple proposals can be assigned a single proposal number and the system can continue to operate properly, as will be shown. As a result, the leader is no longer needed and the client can transmit its requests directly to one or more constituent devices. The devices can then attempt to obtain an agreement from the other devices to execute the requested function. Each device can determine whether or not to agree to the proposal and execute the function, and each can execute it independently and transmit the results back to the client. In such a case, a client's request can be acted upon with as little as one message delay between the receipt of the request and the transmission of the result.

Distributed Computing System

Turning to the drawings, wherein like reference numerals refer to like elements, the invention is illustrated as being implemented in a distributed computing system, such as the exemplary distributed computing system 10 shown in FIG. 1. For ease of presentation only, the present invention will be described with reference to distributed computer system 10, comprising computing devices 11 through 17 of which devices 16 and 17 are experiencing failures. As will be understood by those skilled in the art, the present invention is applicable to all distributed computing environments and is not intended to be limited in any way by the exemplary distributed computing system of FIG. 1, which has been simplified for presentation purposes. As will also be understood by those skilled in the art, the present invention does not require any foreknowledge of which devices are experiencing failures, nor does it require that the same devices fail or that a failed device remain failed. Rather, the exemplary system 10 is meant to illustrate a distributed computing system comprising seven devices, of which two could be experiencing failures at any given moment. Thus, while devices 16 and 17 are presented as failed devices, such knowledge is provided to the reader for presentation purposes only. As will be illustrated, the operation of the invention does not depend on knowledge of the operation of any particular device.

Although not required, the invention will be described in the general context of computer-executable instructions, such as program modules, being executed by a computing device. Generally, program modules include routines, programs, objects, components, data structures, and the like that perform particular tasks or implement particular abstract data types. Moreover, those skilled in the art will appreciate that the invention may be practiced with many different computing devices, including hand-held devices, multi-processor systems, microprocessor based or programmable consumer electronics, network PCs, minicomputers, mainframe computers, and the like. As described above, the invention may also be practiced in distributed computing environments, such as distributed computing system 10, where tasks are performed by remote processing devices that are linked through a communications network. In a distributed computing environment, program modules may be located in both local and remote memory storage devices.

Figure 2:
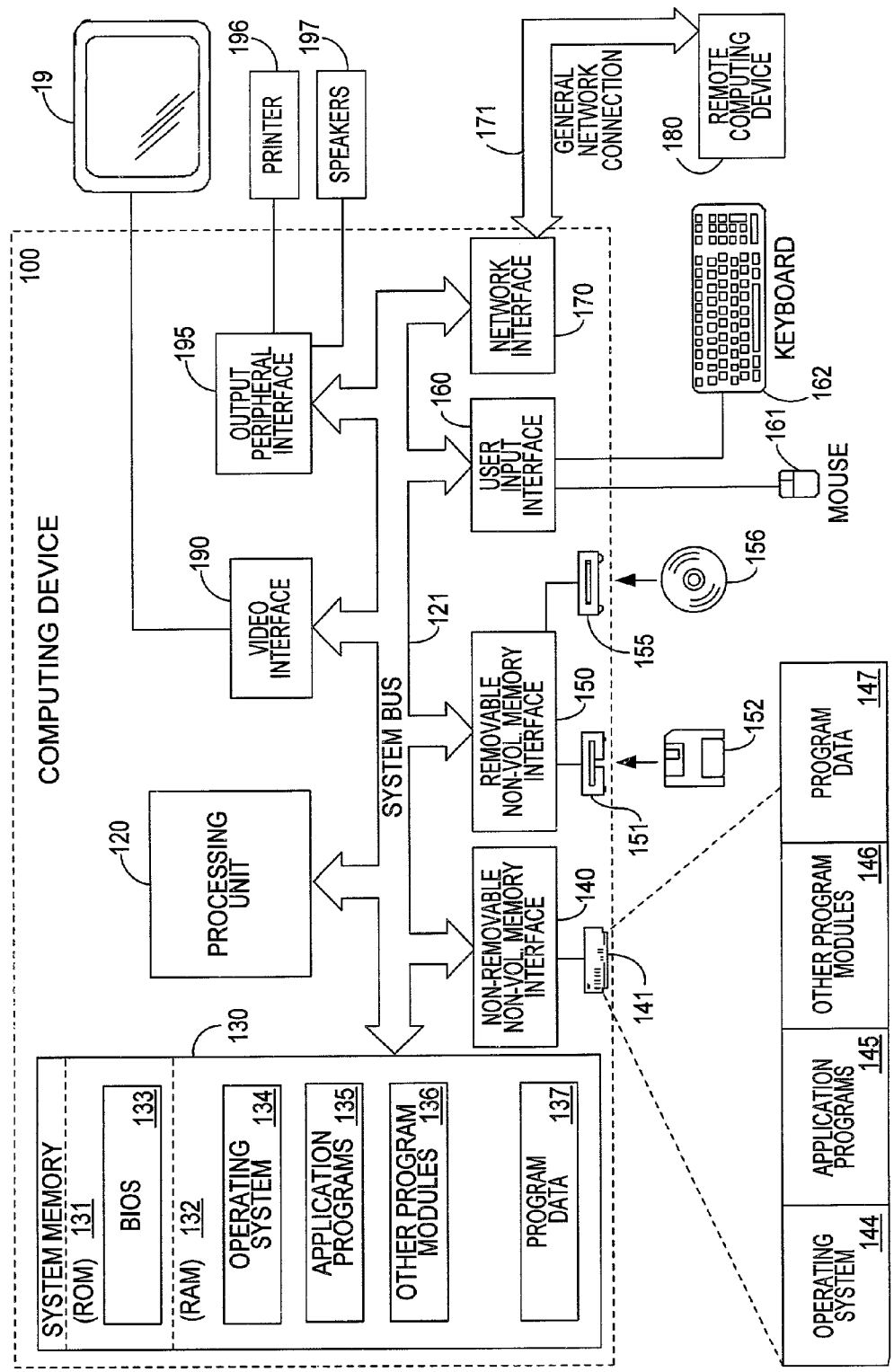
FIG. 2 is a block diagram generally illustrating an exemplary computing device with which the present invention can be implemented.

Turning to FIG. 2, an exemplary computing device 100 on which the invention may be implemented is shown. The computing device 100 is only one example of a suitable computing device and is not intended to suggest any limitation as to the scope of use or functionality of the invention. For example, the exemplary computing device 100 is not equivalent to any of the computing devices 10-17 illustrated in FIG. 1. The exemplary computing device 100 can implement one or more of the computing devices 10-17, such as through memory partitions, virtual machines, or similar programming techniques allowing one physical computing structure to perform the actions described below as attributed to multiple structures. Furthermore, the computing device 100 should not be interpreted as having any dependency or requirement relating to any one or combination of peripherals illustrated in FIG. 2.

The invention may be described in the general context of computer-executable instructions, such as program modules, being executed by a computer. Generally, program modules include routines, programs, objects, components, data structures, etc. that perform particular tasks or implement particular abstract data types. In distributed computing environments, tasks can be performed by remote processing devices that are linked through a communications network. In a distributed computing environment, program modules may be located in both local and remote computer storage media including memory storage devices.

Components of computer device 100 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Associate (VESA) local bus, and Peripheral Component Interconnect (PCI) bus also known as Mezzanine bus.

Computing device 100 typically includes a variety of computer readable media. Computer readable media can be any available media that can be accessed by computing device 100 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 2 illustrates operating system 134, application programs 135, other program modules 136, and program data 137.

The computing device 100 may also include other removable/non-removable, volatile/nonvolatile computer storage media. By way of example only, FIG. 2 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 2, provide storage of computer readable instructions, data structures, program modules and other data for the computing device 100. In FIG. 2, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers hereto illustrate that, at a minimum, they are different copies. A user may enter commands and information into the computing device 100 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through a output peripheral interface 195.

The computing device 100 operates in a networked environment, such as that shown in FIG. 1, using logical connections to one or more remote computers. FIG. 2 illustrates a general network connection 171 to a remote computing device 180. The general network connection 171 can be any of various different types of network connections, including a Local Area Network (LAN), a Wide-Area Network (WAN), networks conforming to the Ethernet protocol, the Token-Ring protocol, or other logical or physical networks such as the Internet or the World Wide Web.

When used in a networking environment, the computing device 100 is connected to the general network connection 171 through a network interface or adapter 170, which can be a network interface card, a modem, or similar networking device. In a networked environment, program modules depicted relative to the computing device 100, or portions thereof, may be stored in the remote memory storage device. It will be appreciated that the network connections shown are exemplary and other means of establishing a communications link between the computers may be used.

In the description that follows, the invention will be described with reference to acts and symbolic representations of operations that are performed by one or more computing devices, unless indicated otherwise. As such, it will be understood that such acts and operations, which are at times referred to as being computer-executed, include the manipulation by the processing unit of the computing device of electrical signals representing data in a structured form. This manipulation transforms the data or maintains it at locations in the memory system of the computing device, which reconfigures or otherwise alters the operation of the computing device in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

Overview

In accordance with the invention, a device that is part of a distributed computing system can receive a request from a client of the distributed computing system that the system perform a given action. If the system comprises more devices than three times the maximum number of devices that can be exhibiting failures at a given time, and if the number of devices needed to select a proposal to execute is the minimum number of operational devices at a given time, then the device receiving the request from the client can act upon the request on its own and without the aid of a leader. The device can propose the client's request to the remaining devices in the system, if the client transmitted the request to only that device, or the client can transmit the request to multiple devices directly, removing the need for retransmission. Each of the device can then execute the function, if appropriate, and individually transmit the response to the client. If the client receives a response from a quorum of devices, which can be any grouping of devices that has at least as many devices as are needed to select a function, then the client can determine that the requested function was selected and executed by the distributed computing system.

Prior to receiving a prior to receiving a proposal from a client, the devices of the distributed computing system can determine an appropriate proposal number which is safe for all current and future steps of the system. A leader can initially suggest a proposal number to the devices for all current and future steps of the system. In response, each device can send, for each current and future step, the proposal for which that device has voted that was associated with the largest proposal number less than the suggested proposal number. Alternatively, to decrease the number of messages required, the devices can respond with the proposal for which that device voted that has the largest proposal number, even if it is larger than the suggested proposal number.

If a majority of the devices of any quorum all indicate, for a given step, a vote for a given proposal, the leader can resubmit that proposal for a vote to the current quorum. If the proposal is passed, then the proposed function can be executed for the current step, and the leader can seek to propose a different function for the next step. Alternatively, if the leader cannot determine that a majority of the devices of any quorum all voted for the same proposed function, the leader can attempt to determine a function to propose, or the leader can abort. In such a manner the leader can seek to propose and have selected any functions for any steps that had garnered a vote from a majority of the devices in any quorum. For the remaining steps, the devices may not have indicated voting for any proposals and, thus, the suggested proposal number is safe for all remaining steps. Once a safe proposal number is determined, the leader can allow clients to transmit requests directly to the devices, and each device can treat the client's request as a proposal having a proposal number equal to that suggested by the leader and determined to be safe.

A distributed computing system can have fewer devices that than described above, and still be able to perform the message-delay-reducing algorithm described above if the number of devices needed to select a proposal is greater than the minimum number of operational devices. While the system can perform the above algorithm with fewer devices, if the maximum number of devices that can fail does fail, there may not be enough devices with which to select a proposal using the above algorithm. Therefore, the requesting client, or a leader, can detect when it has not received a sufficient number of responses from devices and can revert to using the Paxos algorithm, which can operate with fewer devices in the distributed computing system for the same number of possible failures. Specifically, the leader can intercept client requests and direct them to the devices with an appropriate proposal number, or the devices themselves can refuse to respond to client requests received directly from the client.

The message-delay-reducing algorithm can be used as a non-blocking commit algorithm in a distributed system having multiple replicas, such as database replicas. A client can issue a request to commit the modifications or work that a client has performed, or a client can issue a request to abort it. Upon receipt of the client request, each of the replicas can send a request to a series of devices, wherein the devices can be implemented on the same computing device as the replicas. The devices can accept the requests from the replicas in parallel, using the message-delay-reducing algorithm to vote for the requests. However, if one of the requests is for an abort action, then the devices can vote for the abort action for each of the replicas. If one or more of the devices should fail, a leader can step in an algorithm, such as the Paxos algorithm, to determine the vote of the devices and inform the replicas.

State Machines

In a distributed system, such as distributed system 10 illustrated in FIG. 1, coordination among devices can be a difficult task. One mechanism for avoiding difficulties inherent in relying on time as a coordinating factor is to model the distributed computing system in terms of a state machine where the performance of a function moves the state machine from one state to another. Thus, a state machine can be described with reference to a set of states, a set of commands, a set of responses, and functions that link each response/state pair to each command/state pair. A client of a state machine can issue a command which requests that the state machine execute a function. The function can then change the state of the state machine and produce a response.

The individual devices that comprise the distributed computing system can each execute the state machine of the system. The devices can, therefore, be coordinated by determining an initial state and then executing the same functions in the same order from then on. A device can be synchronized by simply determining the last function the device executed, locating that function in an ordered list of functions executed by other devices, and then directing the device to perform the remaining functions from the ordered list. Such a state machine approach was initially proposed in the article "Time, Clocks, and the Ordering of Events in a Distributed System," by Leslie Lamport published in *The Communications of the ACM*, Volume 21, Number 7, July 1978, the contents of which are hereby incorporated by reference in their entirety.

Paxos Algorithm

By using a state machine approach, the synchronization of the constituent devices 11 through 17 of the distributed computing system 10 becomes a problem of agreeing on the functions to be performed and the order in which to perform them. One method for agreeing upon a function to be performed is known as the Paxos algorithm. The Paxos algorithm allows the system 10 to operate properly even in the face of non-malicious failures, where devices can stop operating without advanced warning. The Paxos algorithm requires that at least a quorum of devices agree to a function before the system as a whole performs that function. A quorum can be a simple majority, or it can include more devices than that, depending upon the particular requirements of the system. However defined, a quorum can be sufficiently large such that any two quorums have at least one properly functioning, non-malicious device in common.

To maintain consistency, the system 10 can limit the performance of functions to a single function per step. Therefore, it can be desirable to select only a single function for a given step. Since any two quorums have at least one properly functioning, non-malicious device in common, the selection of no more than one step could be ensured by requiring that every device vote only for one proposal. However, if a number of devices simultaneously acted as leaders, such a requirement would cause a stalemate because it would be possible that none of the proposals was agreed to by a quorum, and yet none of the devices could vote for a proposal for a different function so that a quorum could eventually be reached.

The Paxos algorithm solves this problem through a multi-step process by which devices are allowed to change their votes, but leaders are constrained in the functions they propose. Using the Paxos algorithm, a leader can propose any function the leader chooses, unless the leader learns of a previously proposed function. If the leader has learned of at least one previously proposed function, that at least one device in the quorum has already voted for, the leader can propose the most recent of the previously proposed functions the leader has learned of. Each device need only track the most recent proposal that device voted for. If the device receives a proposal for which it has promised to vote, and it has not promised to vote for another proposal in the meantime, the device can cast a vote for the proposal. A device can only promise to vote for a proposal if the proposal has a larger proposal number than any other proposal the device has previously promised to vote for. The use of proposal numbers allows the system to achieve correct operation without the need to resort to complicated and expensive synchronization of clocks between the constituent devices. The most recent proposal will generally have the largest proposal number. If it does not, it can be ignored, as explained further below. When promising to vote for a proposal, the device can also transmit to the leader soliciting the votes the highest proposal number, that is less than the current proposal number, for which the device has previously promised to vote for. In such a manner the leader can always learn of previous proposals.

Figure 3A:
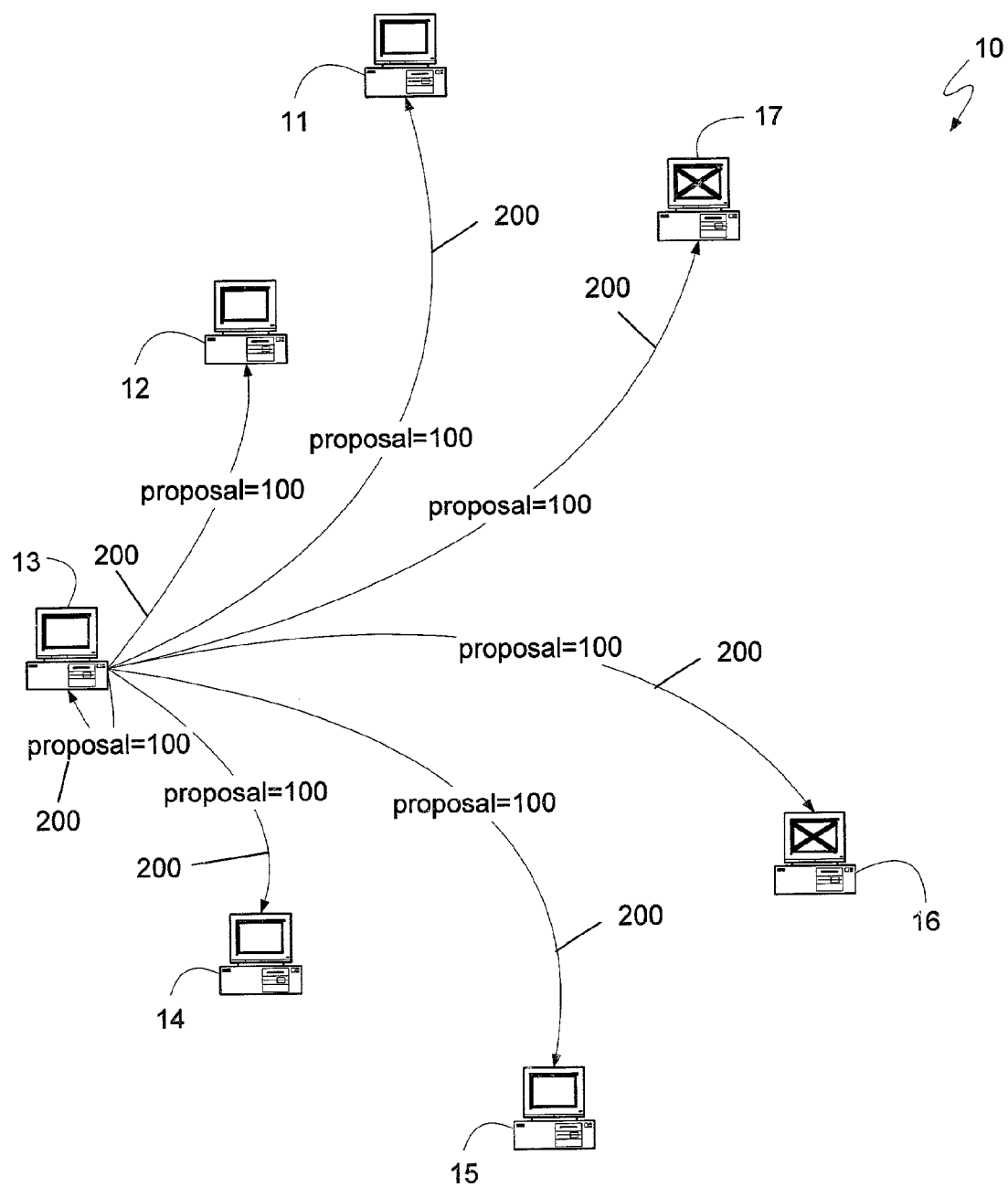
FIGS. 3a-e generally illustrate the operation of a consensus algorithm contemplated by the present invention.

Turning to FIG. 3a, the Paxos algorithm is explained in greater detail using the exemplary distributed computing system 10. Because the exemplary distributed computing system 10, shown in FIG. 3a, has seven devices, a quorum can be defined as any group of four or more devices because such a definition will ensure that any two quorums have at least one device in common. As shown in FIG. 3a, device 13 can assume a leadership position and transmit message 200 to devices 11-17, suggesting a proposal number for a proposal that the system execute a given function. Because device 13 can act as both a device and a leader, it sends itself message 200, though such a transmission could be handled internally to the device and need not be physically transmitted. Device 13 can select an arbitrarily large proposal number in an effort to ensure that there are no previous proposals with larger proposal numbers. Furthermore, because device 13 itself may have voted on previous proposals, it can select a proposal number that is larger than any proposal device 13 is aware of.

Because proposals can be ordered based on their proposal numbers, efficiencies can be gained by preventing two or more devices using the same proposal number for two or more different proposals. Therefore, proposal numbers can be selected by devices using mechanisms based on unique device properties, such as a Media Access Control (MAC) address of the device sending the proposal. Alternatively, proposal numbers can be partitioned among the devices, requiring each device to select proposal numbers only from among its partition. One method for partitioning the proposal numbers would be to grant to the "$i^{th}$" device proposal numbers congruent to "i" modulo the number of devices in the system.

Because, as will be shown, the Paxos algorithm can operate even if a number of devices act as leaders, the mechanism by which a device assumes a leadership position is not important. Nevertheless, a mechanism that minimizes the chances that different devices can simultaneously believe they are the leader can increase the efficiency of the system. For example, mechanisms based on unique device properties, such as a MAC address, can reduce the chance of having more than one simultaneous leader. One such mechanism could simply select a properly functioning device with the smallest MAC address to be the next leader. In addition, a leader selection mechanism could prevent a device from attempting to become a leader if the device has already received a message from another device acting as a leader within a pre-determined amount of time, to prevent a constant changing of the leadership device. Such constant leadership change can introduce inefficiencies into the operation of the system.

Figure 3B:
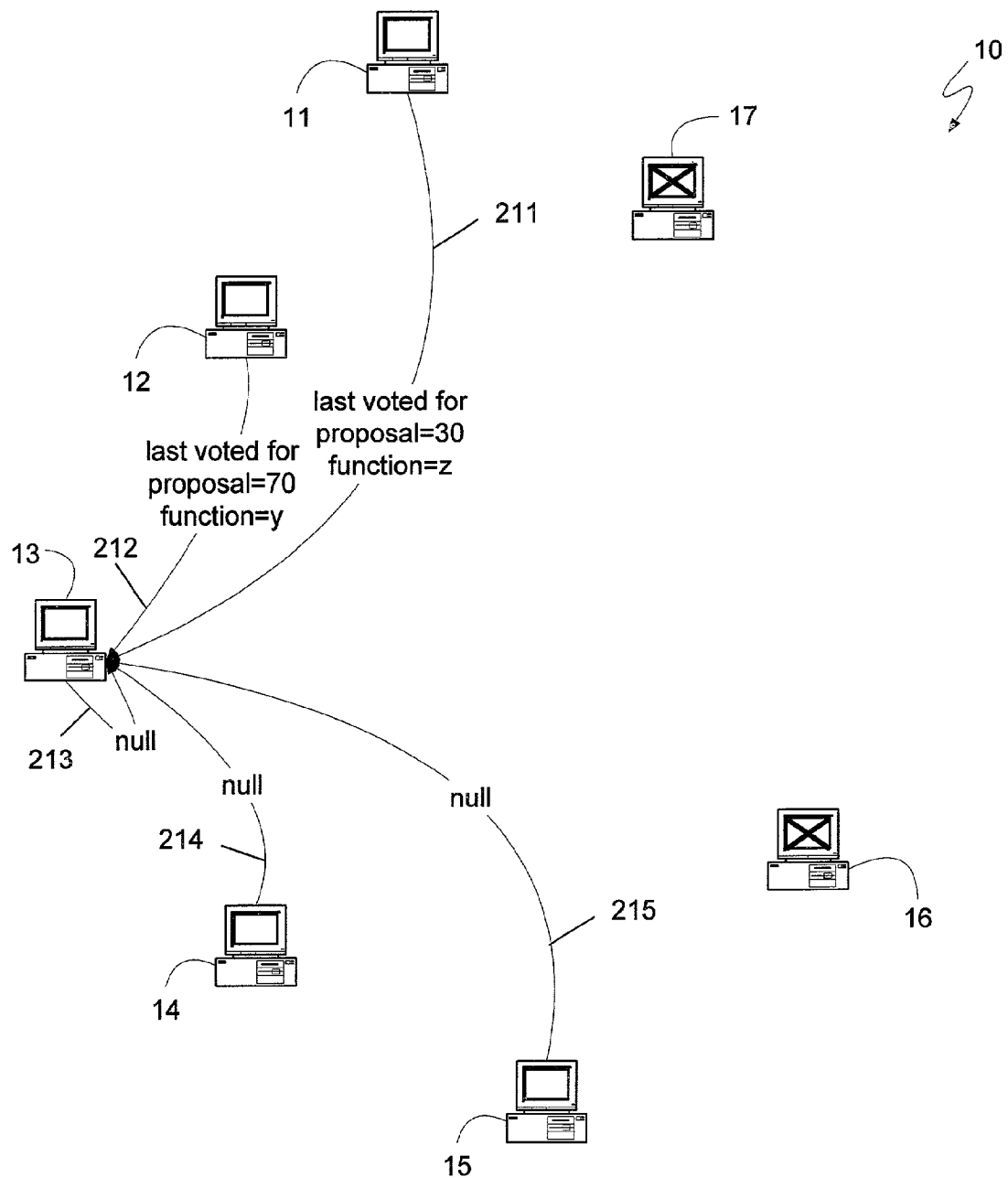

Turning to FIG. 3b, upon receipt of a message, such as message 200, suggesting a new proposal number, each device 11-15 can respond with message indicating the largest proposal number, and the function proposed by it, for which that device has cast a vote that is still less than the proposal number suggested by message 200. If the device has cast a vote for a proposal number that is greater than the proposal number used by the leader, the device can ignore the message from the leader. In the exemplary condition shown in FIG. 3b, device 12 has previously voted for proposal number 70, which had proposed that the system 10 execute a function identified by the variable "y". Thus, in response to message 200, device 12 can send message 212 indicating that it last voted for proposal number 70, which proposed the execution of the function "y". Similarly, device 11 previously voted for proposal number 30, which had proposed that the system 10 execute a function identified by the variable "z". Message 211 can, therefore, convey this last vote information of device 11 back to device 13. Devices 13-15 may not have received any proposals and have, therefore, not previously cast a vote for any proposal. They can, therefore return a null response, as indicated by messages 213-215. Again, as above, messages sent from device 13 to itself can be handled internally by device 13, but are illustrated for explanatory purposes. Also, because devices 16 and 17 may be experiencing a fault, such as a connection problem, they may not respond to message 200.

Figure 3C:
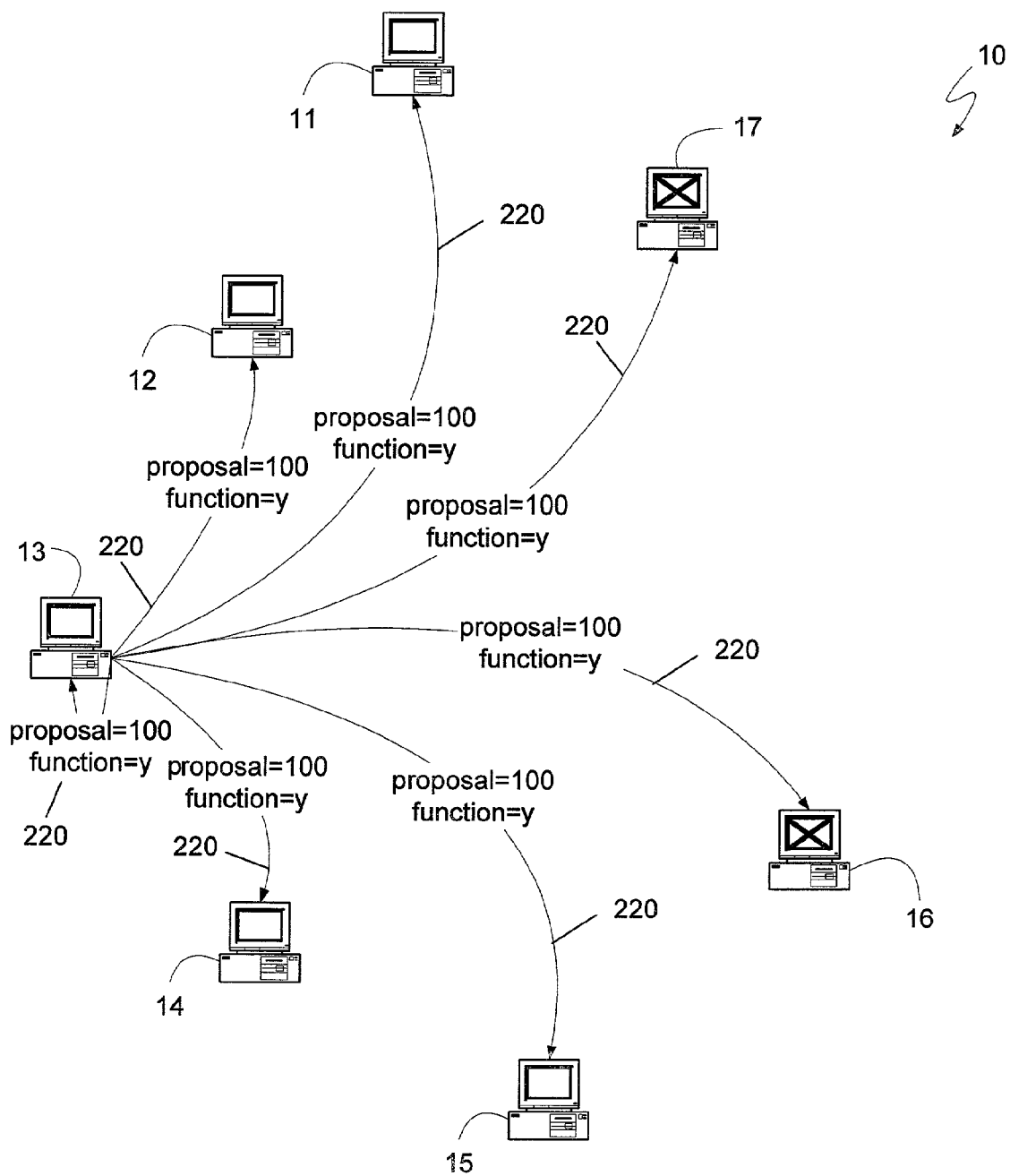

Turning to FIG. 3c, when the leader 13 receives messages 211-215, the leader can determine an appropriate function to propose such that the function proposed is equivalent to the function with the largest proposal number that was voted on by any member of the quorum. If none of the quorum members had voted on any previous proposal, then the leader is free to select whichever function the leader wishes to propose. Therefore, given the messages 211-215 illustrated in FIG. 3b, device 13 can select to solicit votes for the execution of function "y" as that function was voted for by device 12 as part of proposal number 70, which is the proposal with the largest proposal number of which the leader 13 has learned. However, because the system 10 illustrated in FIGS. 3a through 3e contains 7 devices, including at most two devices suffering a failure, a quorum can be as few as four devices. Thus, it is sufficient for the leader 13 to solicit votes for a proposal from devices 11 and 13-15 only. In such a case, the leader 13 need not propose the function "y" because device 12 is not a member of the selected quorum. Instead, the leader 13 can propose the function "z" as that function was voted for by device 11 as part of proposal number 30. Because proposal number 30 is the largest proposal number voted on by devices in the quorum, the leader can select function "z" to be submitted to a vote.

Returning to FIG. 3c, the leader 13 is shown selecting a quorum consisting of all of the devices of the system 10, and transmitting a message 220 seeking a vote on the execution of function "y" by the system 10. Upon receipt of message 220, each device can determine whether to vote for function "y". A device can vote for a function so long as the device has not responded to a suggestion of a new proposal having a larger proposal number than the proposal for which the vote is currently being requested. Thus, for the example illustrated in FIG. 3c, if any of the devices 11-15 had received and responded to another suggestion for a new proposal, having a proposal number greater than 100, prior to leader 13 sending message 220 as shown in FIG. 3c, then that device may not vote for the function for which a vote was solicited by message 220.

Figure 3D:
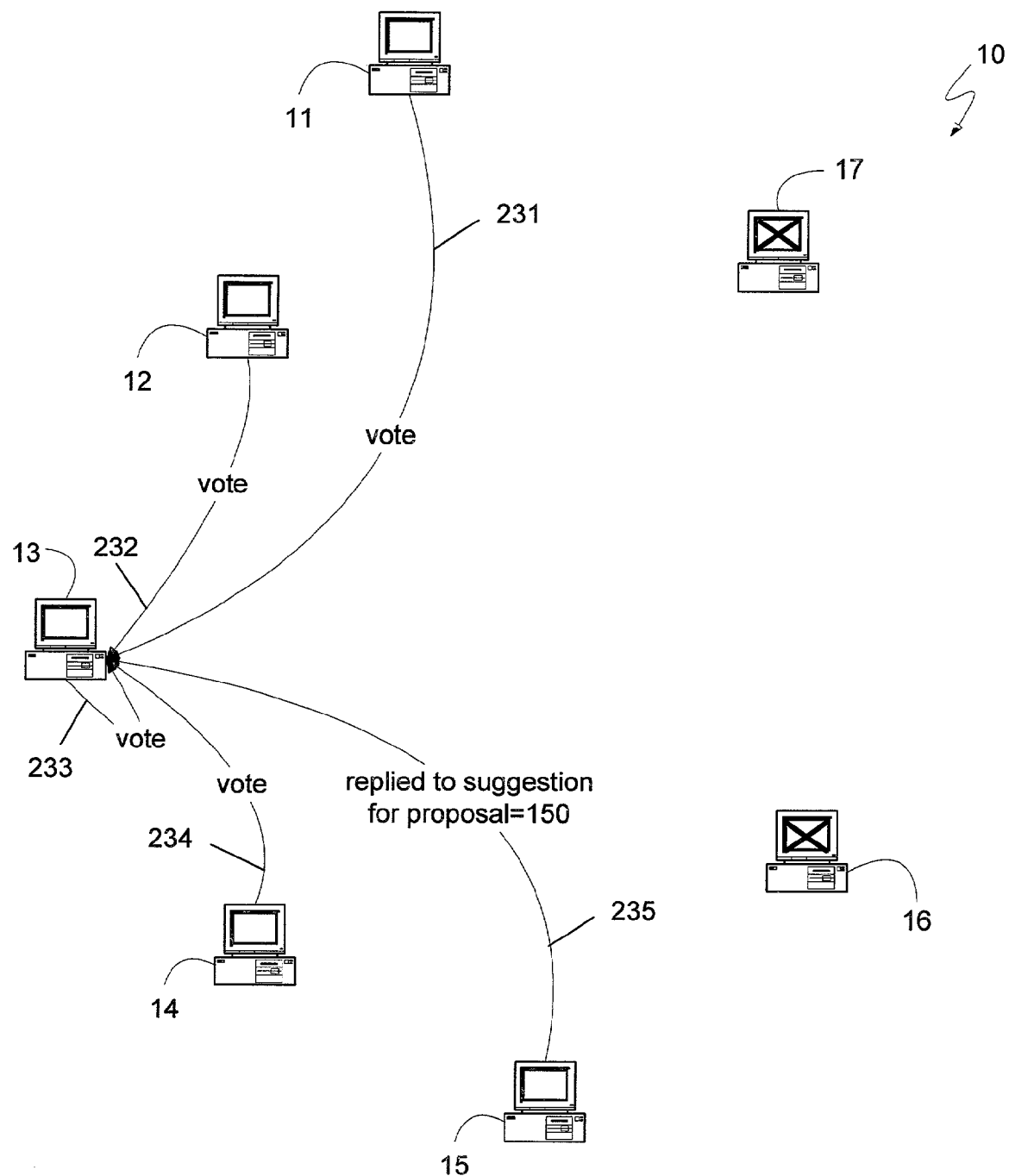

Turning to FIG. 3d, each of the devices 11-14 has independently determined that they have replied to no other suggestions for new proposals with proposal numbers greater than 100. Therefore, because the last suggestion for a new proposal to which they responded is not for a proposal with a larger number than the current proposal, devices 11-14 vote for the proposal and indicate their votes in messages 231-234, respectively. As before, message 233 is shown for illustration purposes, and could be handled internally to device 13. Device 15, however, may have, sometime prior to the transmission of message 220, received and responded to a suggestion for a new proposal with a proposal number greater than 100. Therefore, upon receipt of message 220, device 15 determined that it had already responded to a suggestion for a new proposal with a number greater than 100 and could not, therefore, vote for proposal 100. As a result, as shown in FIG. 3d, device 15 responds with message 235 informing the leader 13 that it has responded to suggestion for a proposal with a proposal number of 150. If leader 13 determines that it needs the vote of device 15, it can send another message, similar to message 220, except with a proposal number greater than 150. Alternatively, device 15 need not respond to message 220, and device 13 can, if it needs device 15's vote, attempt another vote with a proposal with an arbitrarily large proposal number. As can be seen, if device 15 does not indicate the larger proposal number to leader 13, the leader may have to guess and could waste resources guessing, through multiple messages, an appropriately large proposal number.

Figure 3E:
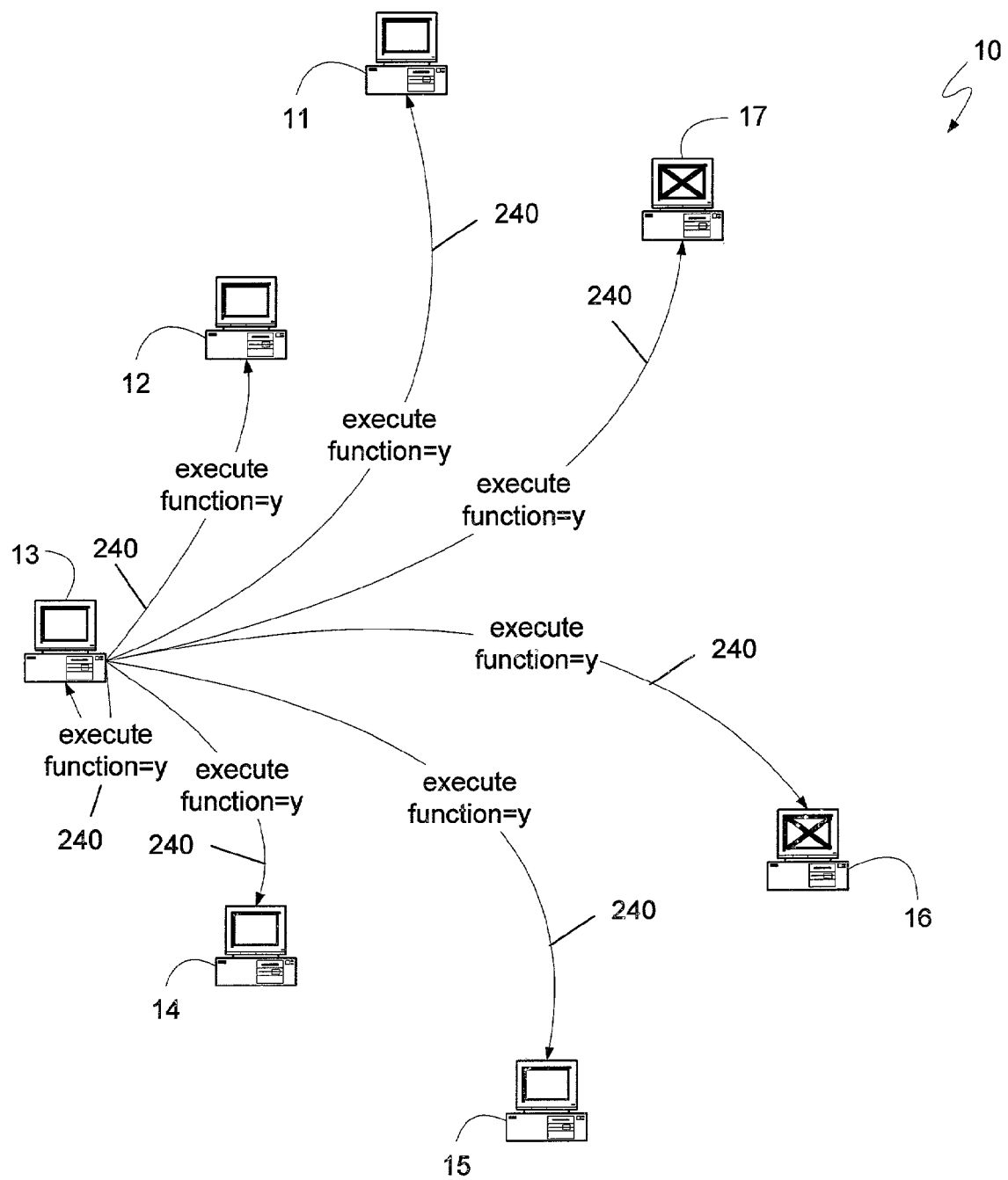

However, because devices 11-14 are sufficient to constitute a quorum, the leader 13 can determine that the proposal has been accepted, even without the vote of device 15, and can request, with message 240 as shown in FIG. 3e, that each of the devices 11-15 execute function "y". While devices 11-14 do constitute a quorum, it is not the same quorum to which leader 13 submitted the proposal to a vote, which included devices 15-17. However, as described above, a leader need only receive votes from a quorum, and not necessary the same quorum to which the request was sent, to determine that the proposal has been accepted. The Paxos algorithm described above ensures that only a single function is selected and executed by the system 10 for any given step in its operation.

For example, if another device that was previously non-operational, such as device 16 or 17, became operational and re-joined the system 10, it might try to propose a function different from "y" for the same step for which the system had selected and executed "y". If device 16 sent a proposal with a proposal number less than 100, it could be ignored by each of the devices 11-14, since they had already voted on proposal number 100 as shown in FIG. 3d. If device 16 sent a proposal with a proposal number greater than 100, such as proposal number 130, each of the devices 11-14 would return a message indicating that they had voted for function "y" in proposal number 100. Device 15, because it may not have voted, as illustrated in FIG. 3d, might respond with message 215, indicating that it had voted for function "z" in proposal number 30.

Device 16 could then select the largest proposal among a quorum, which, by definition would include at least some of the devices 11-15, and submit the function proposed in that proposal for voting. Thus, for proposal 130, device 16 would submit function "y" for a vote. Each device could then vote on proposal 130 following the algorithm set forth above. Either proposal 130 would be selected, which would not change the prior decision to execute the function "y" for the particular step, or proposal 130 would fail because too many devices had, in the meantime, promised to vote for another proposal. However, as can be seen, once a proposal is passed, all other proposals will propose the same function, and, by definition, all of the devices can only vote for that same function. In such a manner the Paxos algorithm ensures that every device the system 10 executes the same function for a given step.

Figure 4A:
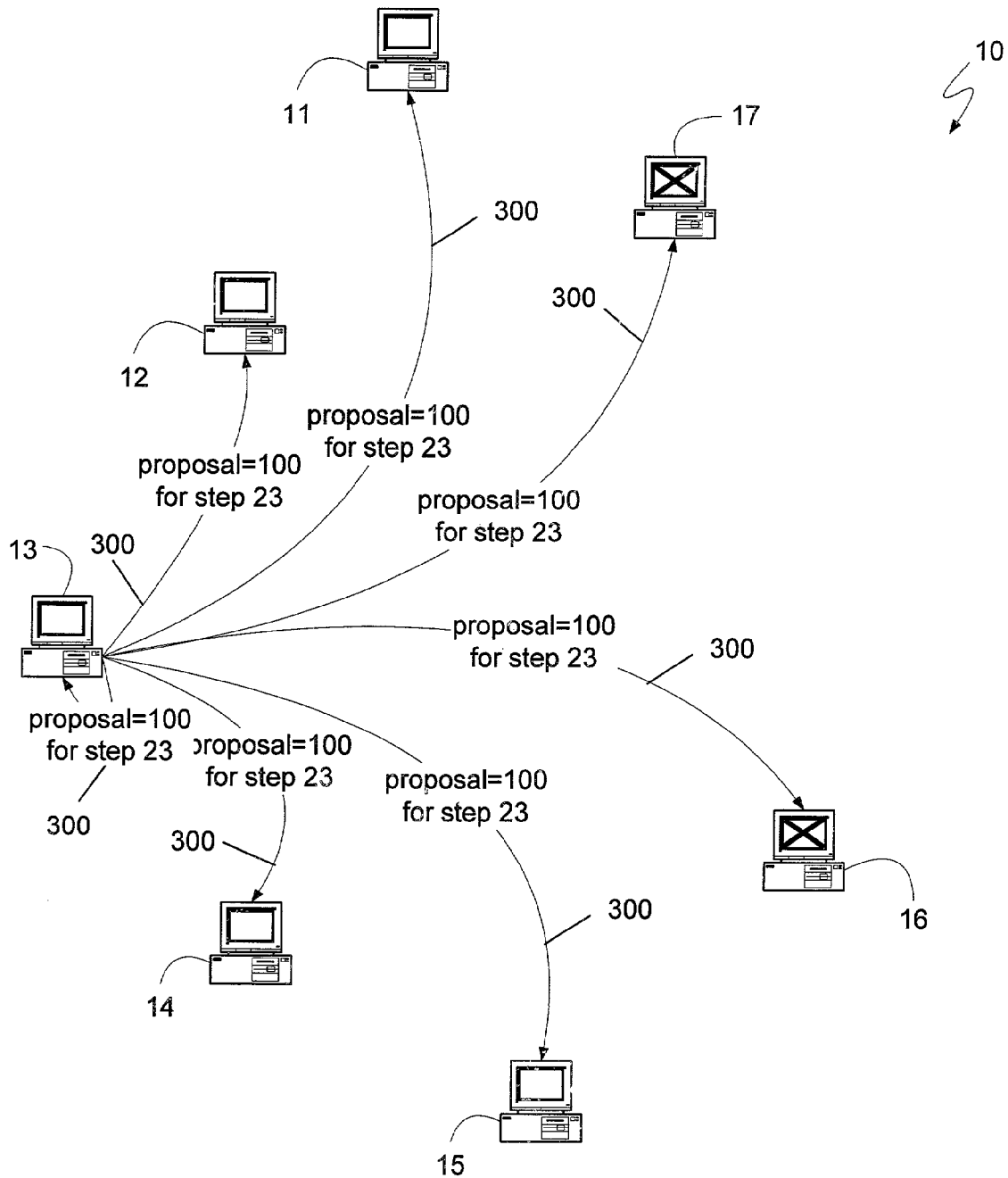
FIGS. 4a-g generally illustrate the operation of a multi-step consensus algorithm contemplated by the present invention.

By repeating the Paxos algorithm, a distributed computing system can agree upon a series of functions to be performed as a series of steps, and can thereby form a continuously operating system. FIGS. 3a-3e, described above, illustrated the application of the Paxos algorithm to the determination of a function to execute for a given step in the operation of the system 10. Turning to FIG. 4a, the system 10 can have already been operational for a number of steps. For example, in the exemplary system 10 illustrated in FIG. 4a, the most recently executed step can be step 24, and step can be is the current step. However, the device that was previously acting as a leader can have failed, leaving the system 10 without a leader. Device 13 can, according to any number of mechanisms, such as those described above, determine that it should attempt to become a leader. As such, device 13 can send message 300 suggesting the use of proposal number 100 for the next proposal, and including the step for which the proposal is being made. In the exemplary distributed computing system 10 of FIG. 4a, device 13 is not aware that steps 23 and 24 have already been decided upon and executed by the other devices 11, 12, 14 and 15. Thus, message 300 indicates that it is suggesting a proposal numbered 100 for step 23.

To expedite the operation of the algorithm in a system executing multiple steps, a message, such as message 300, can be understood to suggest a proposal numbered 100 for all steps greater than or equal to step 23. In such a manner, the leader 13 need not continually transmit messages, such as message 300, as it learns of every step that has already been decided. Instead, the leader 13 can learn of the already executed steps through only one message round trip, as will be shown. If device 13 included a proposed function is message 300, then additional information, indicating that the proposed function applied only to step 23 and was not intended to apply to all steps greater than 23, could also be included in message 300.

The above algorithm could be used for each step greater than or equal to step 23, with the devices 11-15 responding with the largest proposal number for which they voted for each step greater than or equal to step 23, and then the leader 13 proposing the function proposed by the largest proposal number and getting that function approved. Because the above algorithm will not allow leader 13 to propose any function other than the functions that have already been executed by the system 10 for those steps, there is no risk in performing the algorithm for each step greater than or equal to step 23. However, such a procedure can be easily avoided by simply having devices inform the leader of previously performed steps. Avoiding the performance of the above described algorithm for every step, when some devices may already have knowledge of the function executed at that step, can increase the efficiency of the overall system by decreasing the number of transmitted messages. In such a manner, the leader 13 can learn of already executed steps through only one message round trip, as illustrated in FIGS. 4a and 4b.

Figure 4B:
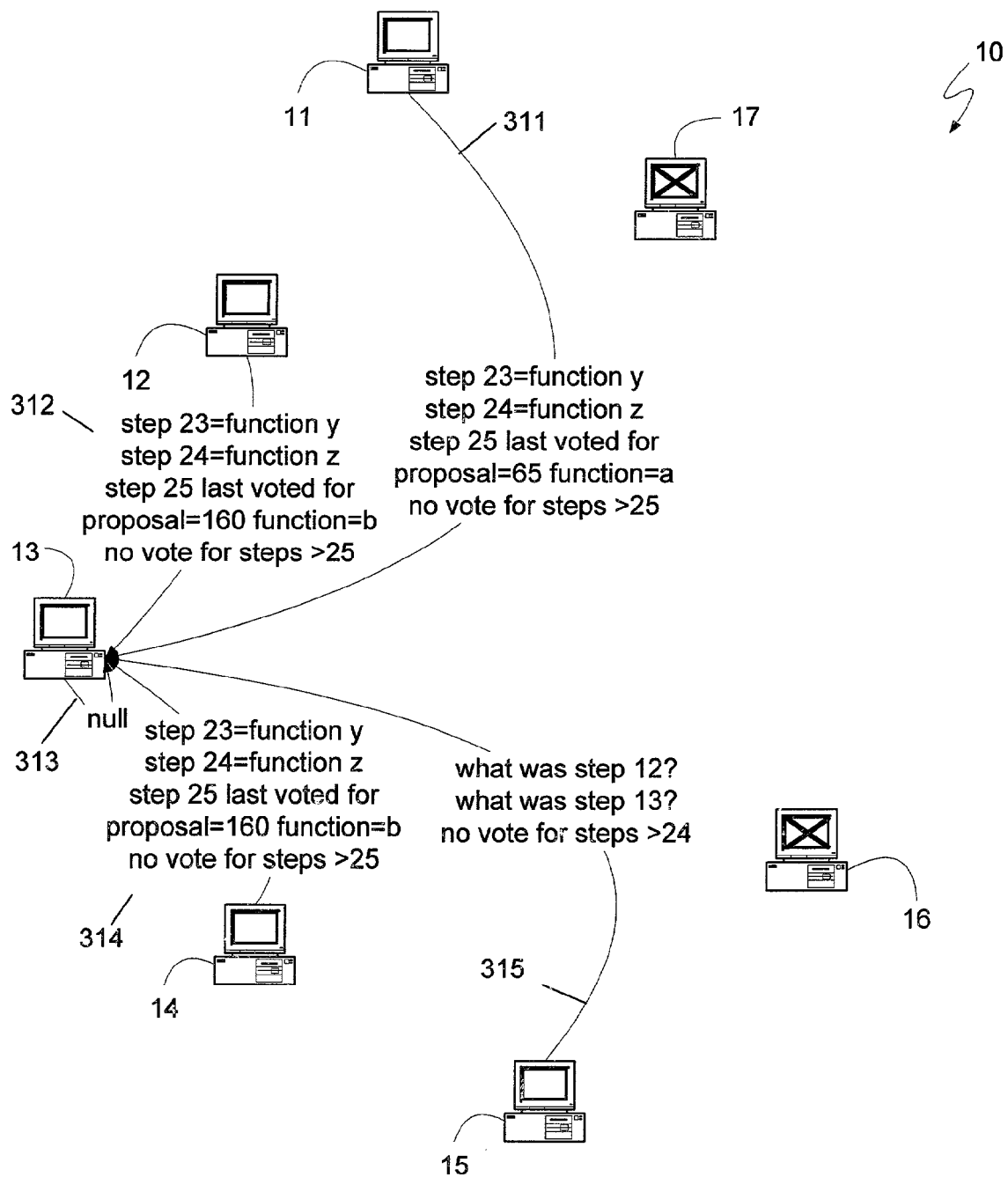

Turning to FIG. 4b, response messages 311-315 from the devices 11-15 of distributed computing system 10 are shown, with devices 16 and 17 not responding due to failures. Device 12, for example, has recorded that function "y" was performed for step 23 and function "z" was performed for step 24. Thus, upon receipt of message 300 seeking to propose a function for step 23, device 12 can respond with message 312 indicating the functions it has stored as being performed for all steps greater than or equal to 23; in this case steps 23 and 24 only. Similarly, device 14 can transmit message 314 providing the functions executed for all steps greater than or equal to step 23. In addition, devices 12 and 14 can provide an indication of the proposals with the largest proposal numbers for which they have voted for steps greater than or equal to 25. Thus, in the example illustrated in FIG. 4(b), messages 312 and 314 indicate that devices 12 and 14 did not vote for any proposals for steps greater than 25, and that they voted for proposal number 160, proposing function "b" for step 25.

Device 11, in addition, to having a record of the functions performed at steps 23 and 24, has also voted for a proposal for step 25 with a proposal number 65, though it too has not voted for any proposals for steps greater than 25. Because message 300 can be thought of as a proposal, having a proposal number of 100, for all steps greater than or equal to step 23, any proposals that have been voted for, for any steps greater than or equal to step 23, can be provided in response. However, to decrease the number of messages being transmitting within the system 10, devices need only respond with their highest proposal number votes if they do not know of a function that has been executed for the given step. Thus, because device 11 already is aware that functions were executed for step 23 and 24, but not step 25, it need only respond with proposals numbered less than 100 that it has received for step 25 or greater. As a result, message 311, as shown in FIG. 4b, transmits an indication that function "y" was performed for step 23, function "z" was performed for step 24, proposal 65, proposing function "a", was voted on by device 11, and device 11 did not vote for any proposals for steps greater than 25.

As before, device 13 can act as both a leader and a voting device. As such, device 13 can send itself messages, such as message 300, and it can respond to itself with messages such as message 313. Such messages are shown in the figures for illustrative purposes only, as they would likely be transmitted internally to device 13. Furthermore, because device 13 can check what is the step with the largest step number for which it knows the function executed, and it can check what the largest proposal number is for the proposals for all steps above that which device 13 voted for, message 313 should rarely contain any information other than a null indicator. If message 313 does contain additional information, device 13 acting as a leader may not have properly selected the step for which to suggest a proposal number, and may not have properly selected the proposal number.

The current state of a state machine may depend, not only on the functions that were executed, but on the order in which those functions were executed. Therefore, if a device does not know which function was executed for a given step, there may be situations in which that device should not execute any functions beyond that step or it will execute functions out of order and its state will be different from that of the distributed computing system. For example, some functions, such as functions that specify a new state unconditionally, are independent of the current state of the device. Such functions can be executed even if functions for steps having lower step numbers than the current step have not yet been executed. Similarly, functions for which the output can be computed without knowing all of the previous steps, such as writing to a database, can also be partially executed out of order to generate the output to be sent to the client. In general, however, a function should not be executed until all previous functions have been executed. Therefore, a device can always attempt to learn which functions were executed for a step that the device missed. When device 13 sends message 300, as shown in FIG. 4a, it is an implicit statement that device 13 believes that step 23 is the next step and that it has executed the agreed upon functions through step 22. A device that is missing a function for a step below step 23, therefore, knows that device 13 has executed all of the functions through step 22, and it can request that function from device 13.

Returning to FIG. 4b, device 15 does not know which functions were executed for steps 12 and 13. As a result, device 15 may have been unable to execute any functions since step 11, even though it may know the functions executed for steps 14-23. Thus, in message 315, device 15 can request the functions for steps 12 and 13 from the leader 13. In addition, device 15 can indicate that it has not voted on any proposals for step 25 or higher numbered steps.

If a device, such as device 15, has missed too many steps, it can be more efficient to simply inform the device of the current state rather than transmitting all of the functions for all of the steps it has missed. One mechanism for ensuring that a device does not miss too many steps is to enable each device, or a collection of devices to periodically take a snapshot of the various parts of the state, or the whole state. The state of another device could, therefore, be updated by sending it the appropriate snapshot together with the functions that were executed since the latest snapshot. Additionally, by using checksums of individual parts of the state, the state of another device could be updated by just sending that other device the parts of the state that differ from its current copy.

As a result of receiving messages 311 through 315, the leader 13 can attempt to determine the appropriate function to propose for step 25, and can respond to questions regarding earlier steps posed by devices. However, the leader 13 originally suggested a proposal number of 100 in message 300, but devices 12 and 14 responded with messages 312 and 314 indicating that they had already voted for a proposal with a larger proposal number than 100 for step 25. As a result, leader 13 can select a proposal number greater than the largest proposal number of which the leader is aware of and transmit another suggestion message such as message 320 shown in FIG. 4c.

Alternatively, devices 12 and 14 could simply ignore the suggestion for proposal number 100 in message 300 because the proposal number was less than the proposal number of the proposal for which devices 12 and 14 had already voted for. In such a case, the leader can retry by increasing the proposal number to attempt to account for devices that ignored the initial suggestion for a proposal number because the proposal number was too low. As can be seen, if devices ignore suggestions for proposals with proposal numbers that are less than the proposal numbers of the proposals for which the devices had already voted, the leader may be forced to perform multiple retries, each time increasing the suggested proposal number. Such multiple messages can be inefficient. It may, therefore, be preferable for devices to respond to all suggestions for a new proposal number, even if the proposal number is less than the proposal numbers of the proposals for which the devices had already voted, because the leader can then determine, with greater precision, an appropriate proposal number to suggest, and can avoid multiple messages.

Figure 4C:
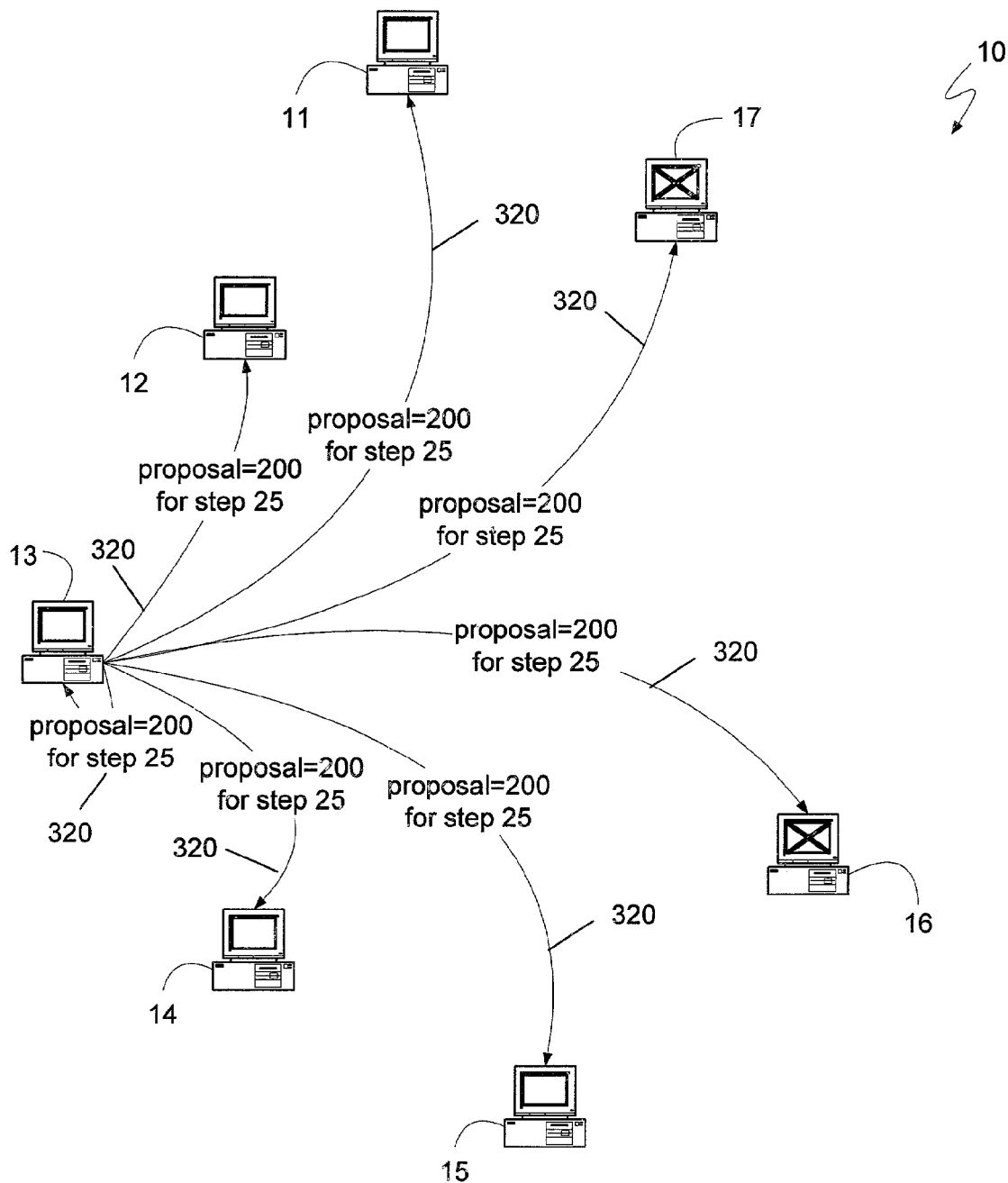

Turning to FIG. 4c, the leader 13 can suggest a larger proposal number, such as proposal number 200 as shown in message 320, in an attempt to suggest a proposal number that is larger than the number of any proposal which leader 13 has learned that a device has previously voted for. Thus, because messages 312 and 314 from devices 12 and 14, indicated that those devices had previously voted for a proposal whose number was 160, leader 13 selected proposal number 200 in the second attempt to suggest a proposal number, as shown in FIG. 4c.

Figure 4D:
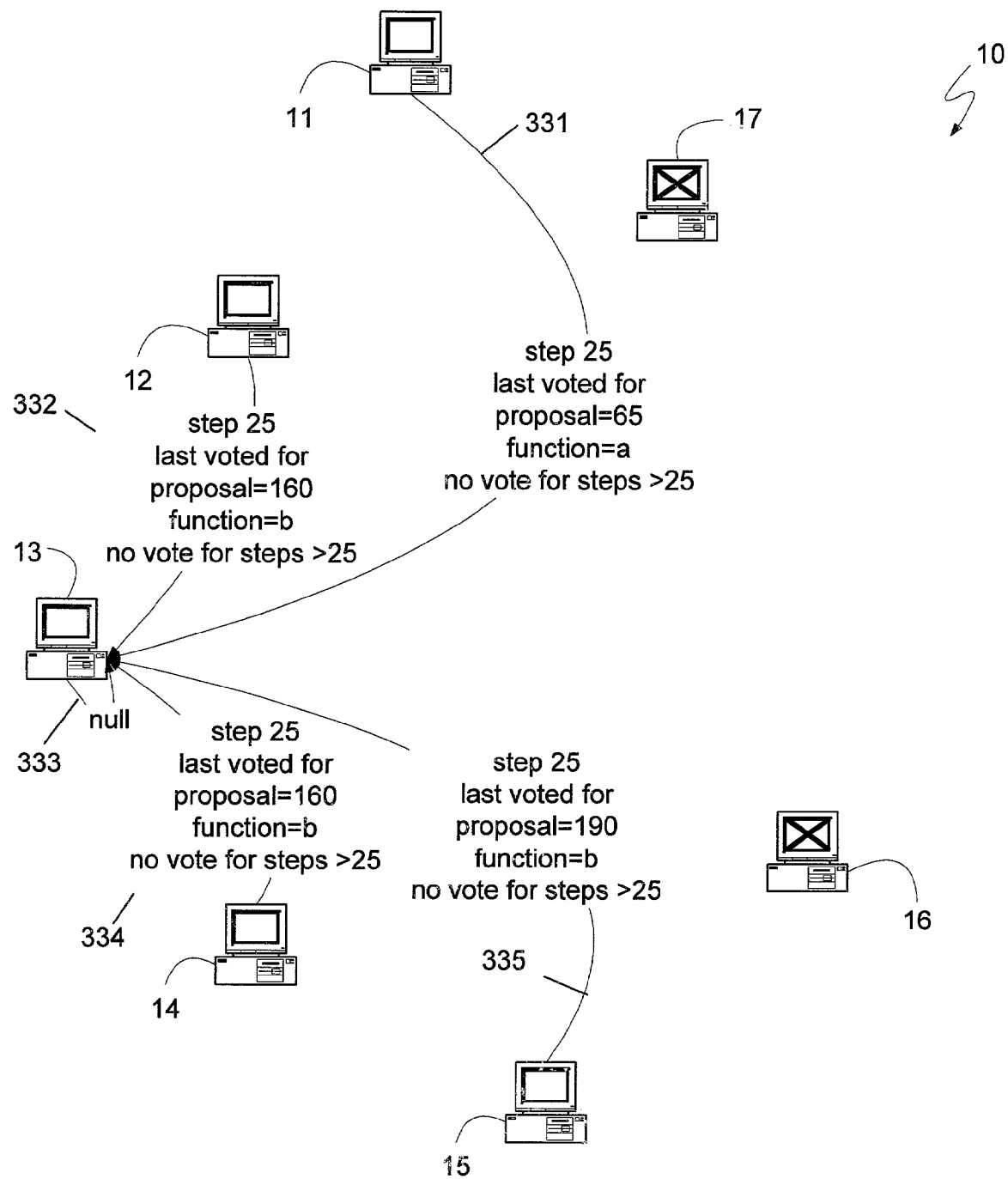

In FIG. 4d, then, the devices 11-15 can respond, in a manner similar to that shown above in FIG. 4b, with the exception that devices 11-15 need not inform device 13 of executed functions for steps 23 and 24, as device 13 has already learned of these steps through messages 311-315 and, in message 320, device 13 specified step 25 as the step for which it was suggesting proposal 200. Furthermore, messages 331-335 can contain additional information than messages 311-315, such as for additional proposals for which the devices may have voted for. For example, device 15 may have, sometime between the transmission of message 315 and message 335, voted for a proposal with a proposal number 190. Consequently, message 315 indicated that device 15 may not have previously cast a vote for any proposal for step 25, but message 335 can indicate that device 15 has voted for proposal 190 for step 25, though it has still not voted for any proposal for steps greater than 25. However, because each of the proposal numbers are less than the suggested proposal number the leader 13 sent in message 320, the leader can proceed to propose a function with the proposal number 200 specified in message 320.

Figure 4E:
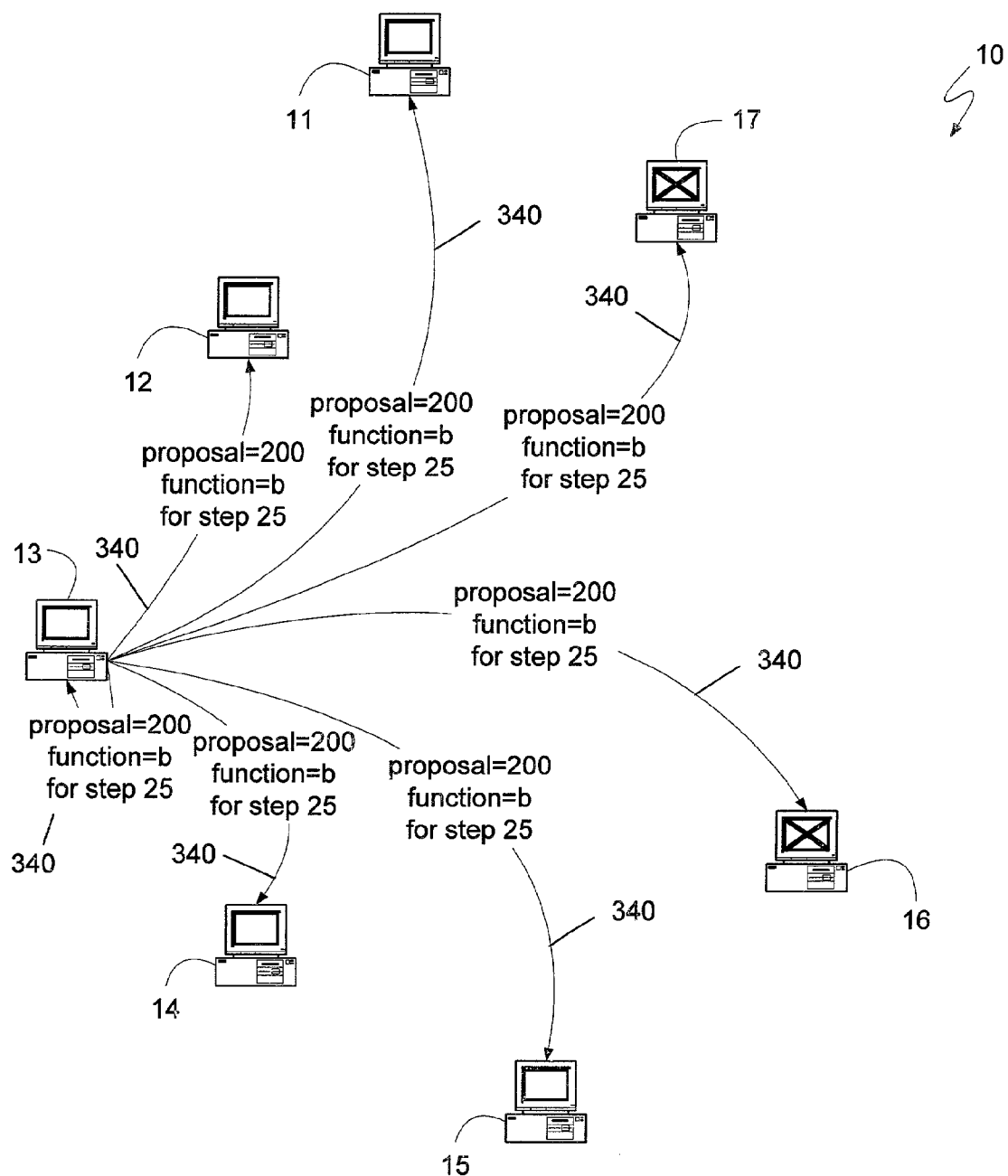

Turning to FIG. 4e, the leader 13 now has sufficient information with which to select a proposal to submit as proposal number 200, as illustrated by message 340, which requests that devices 11-17 vote on proposal 200, proposing that the system execute function "b" for step 25. As before, because devices 12 and 14, all members of a quorum, have previously voted for proposal number 160, proposing the execution of function "b", and no other member of the quorum has voted for a larger numbered proposal, the leader 13 can propose function "b" for proposal number 200

Figure 4F:
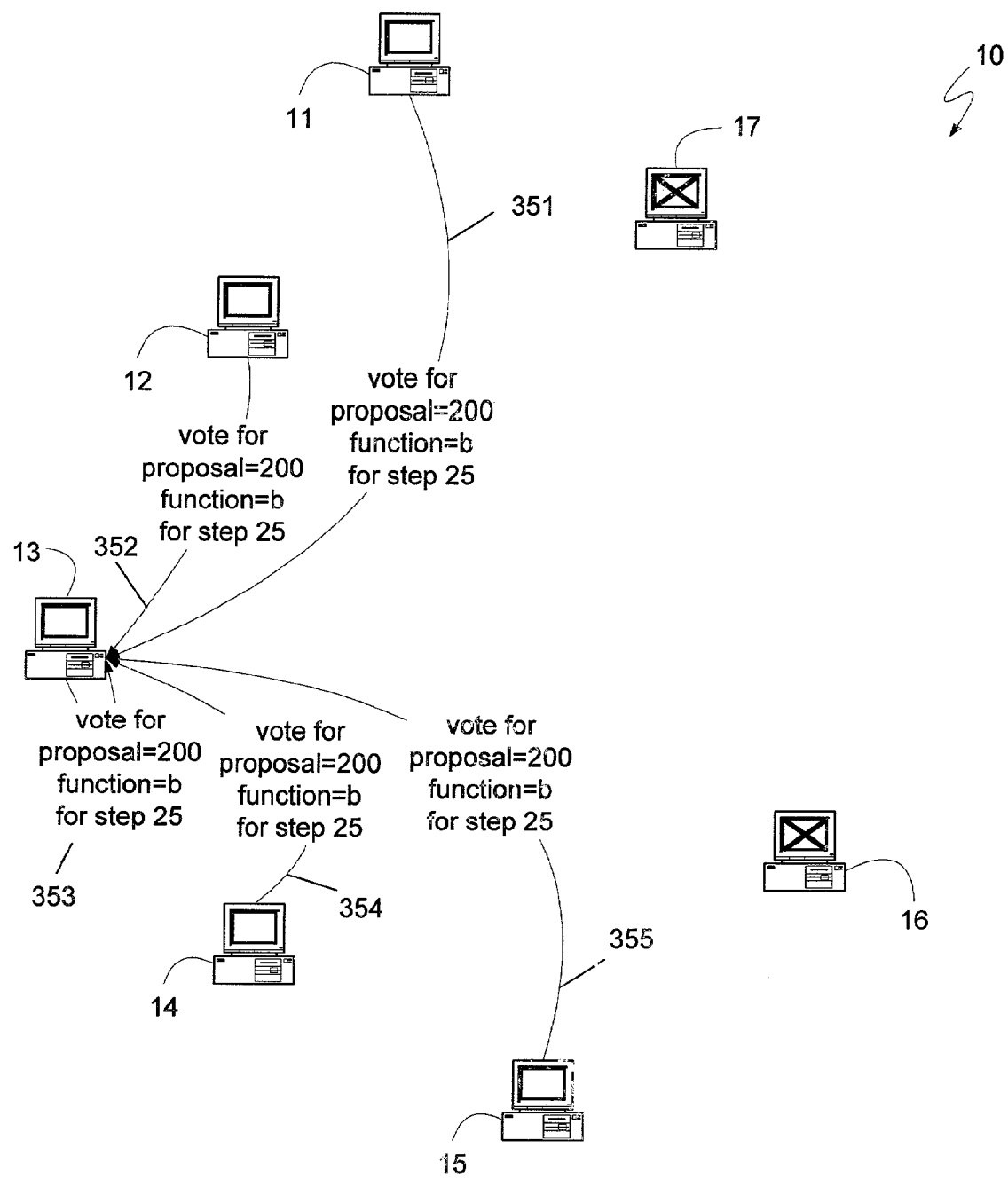
Figure 4G:
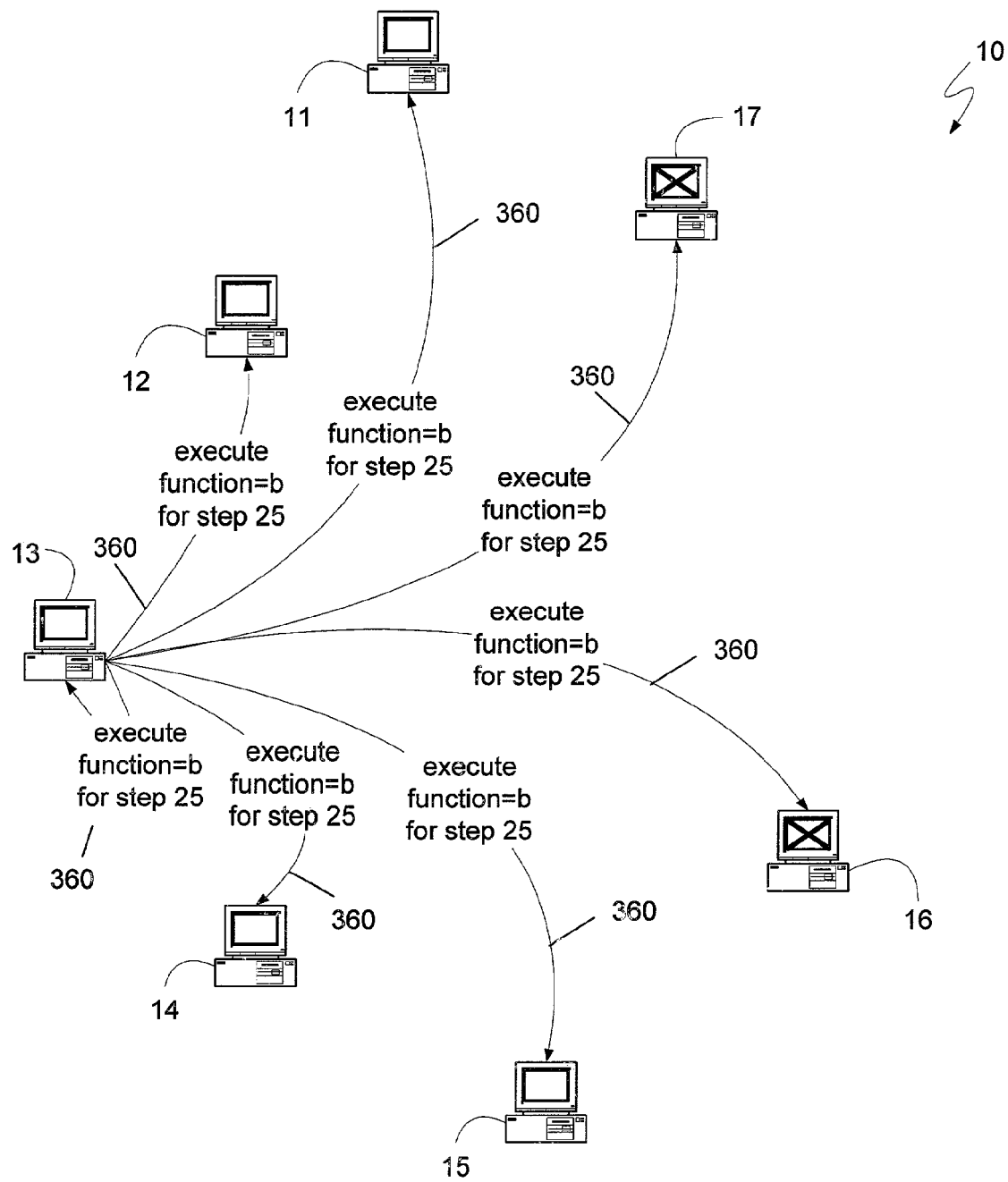

FIG. 4f illustrates devices 11-15 voting, for step 25, for proposal 200 proposing function "b" with messages 351-355, respectively. As before, a device can vote for a proposal so long as it has not promised to vote for a different proposal with a larger proposal number between the receipt of messages 300 and message 340. Once the leader 13 receives messages 351-355, it can transmit a message 360, as shown in FIG. 4e, instructing devices 11-17 to execute function "b for step 25.

The devices implementing the steps of the Paxos algorithm described above in conjunction with FIGS. 3a-e and FIGS. 4a-g can maintain variables storing information used in the algorithm. For example, for each step for which the devices does not know which function was chosen, the device can store the proposal number of the proposal with the largest proposal number for which they responded to, the proposal number of the proposal with the largest proposal number they voted for, the value proposed by the proposal with the largest proposal number for which they voted, and, if the device is a leader, it can additionally store the proposal number for the last proposal it issued. Additionally, devices can record which function was selected for all of the steps for which they have such information. Alternatively, as described above, a device could store a snapshot of its state at a given time, and the functions executed only since that time. Such variables can be stored in either volatile storage 130 or non-volatile storage, such as hard disk 141, floppy disk 152, or optical disk 156, shown in FIG. 2.

Conceptually, the Paxos algorithm described above can be divided into two general phases. The first phase, illustrated by FIGS. 3a and 3b and FIGS. 4a-4d, comprises the leader learning of previous proposals that were voted for by the devices through responses to a suggestion for a proposal number. The second phase, illustrated by FIGS. 3c-e and FIGS. 4e-g, comprises the leader submitting a proposed function for a vote, using a suggested proposal number sent during the first phase, receiving the votes, and, if the proposal was voted on by a sufficient number of devices, instructing the devices to execute the agreed to function. The first phase of the algorithm, however, need only be performed once by a new leader device. Once the leader learns of other proposals, and finds a proposal number that is safe for all of the current and future steps, it does not need to solicit further information unless it fails, or another device attempts to become a leader.

Figure 5A:
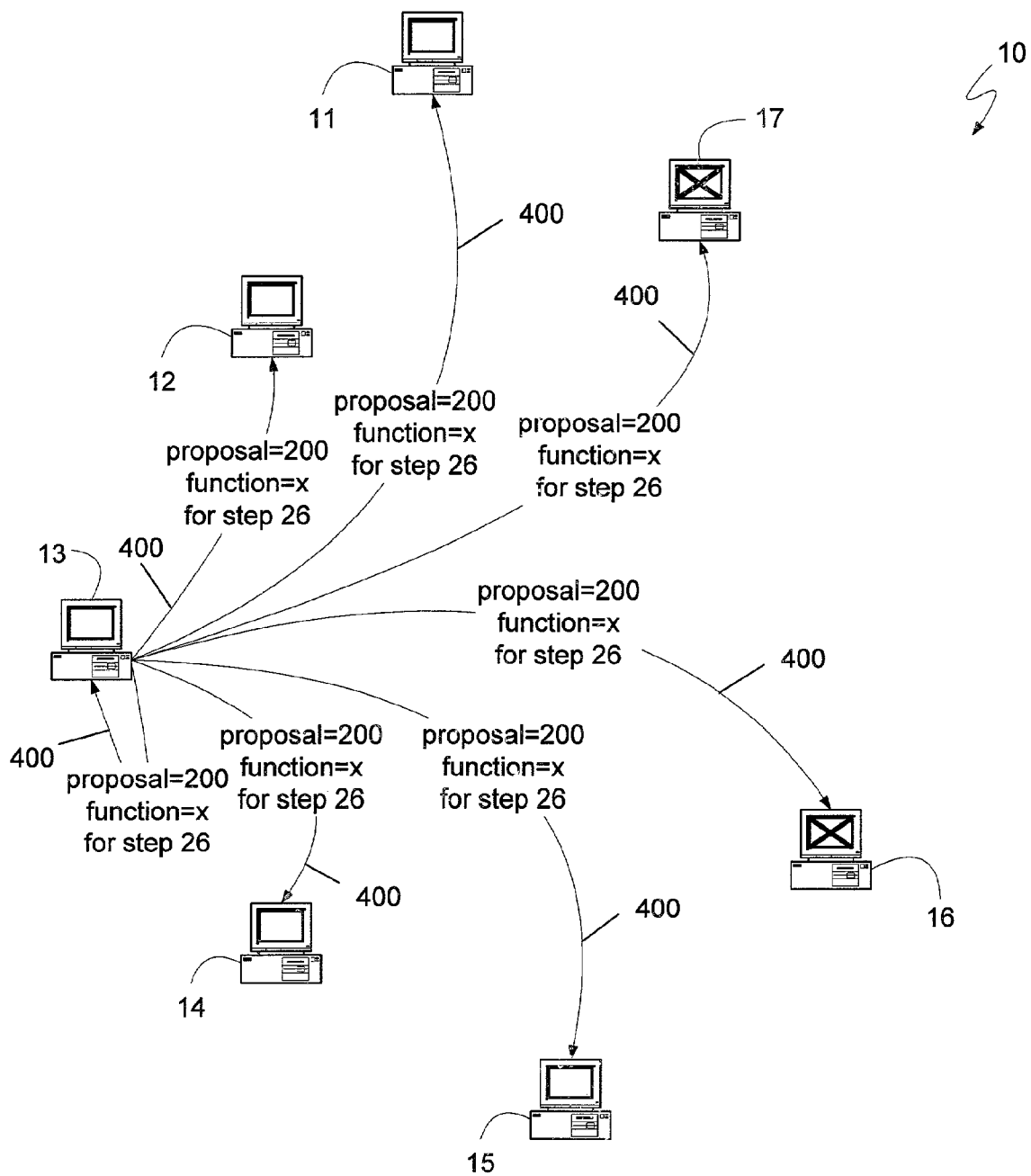
FIGS. 5a-c generally illustrate the operation of an efficient consensus algorithm contemplated by the present invention.
Figure 5B:
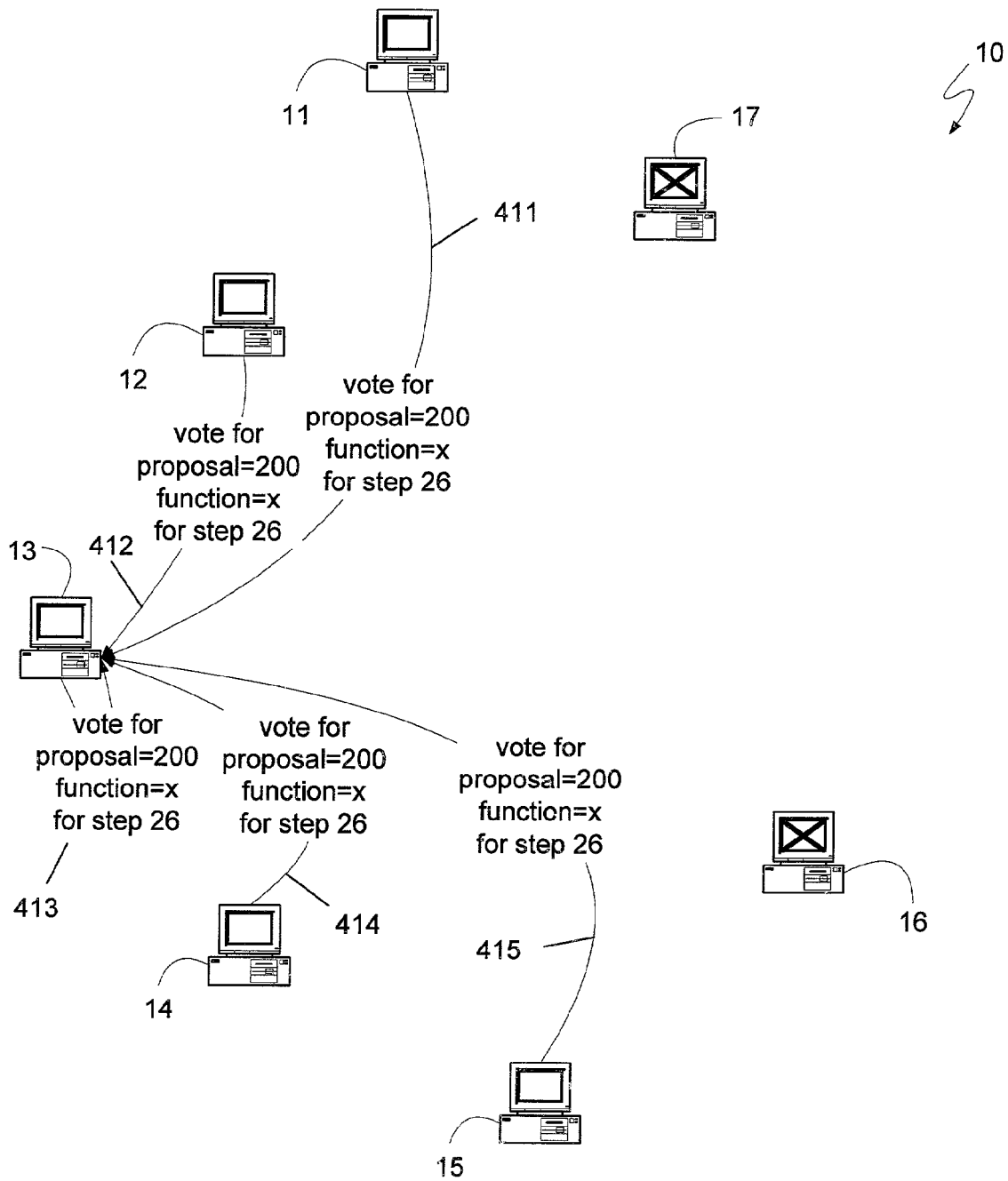
Figure 5C:
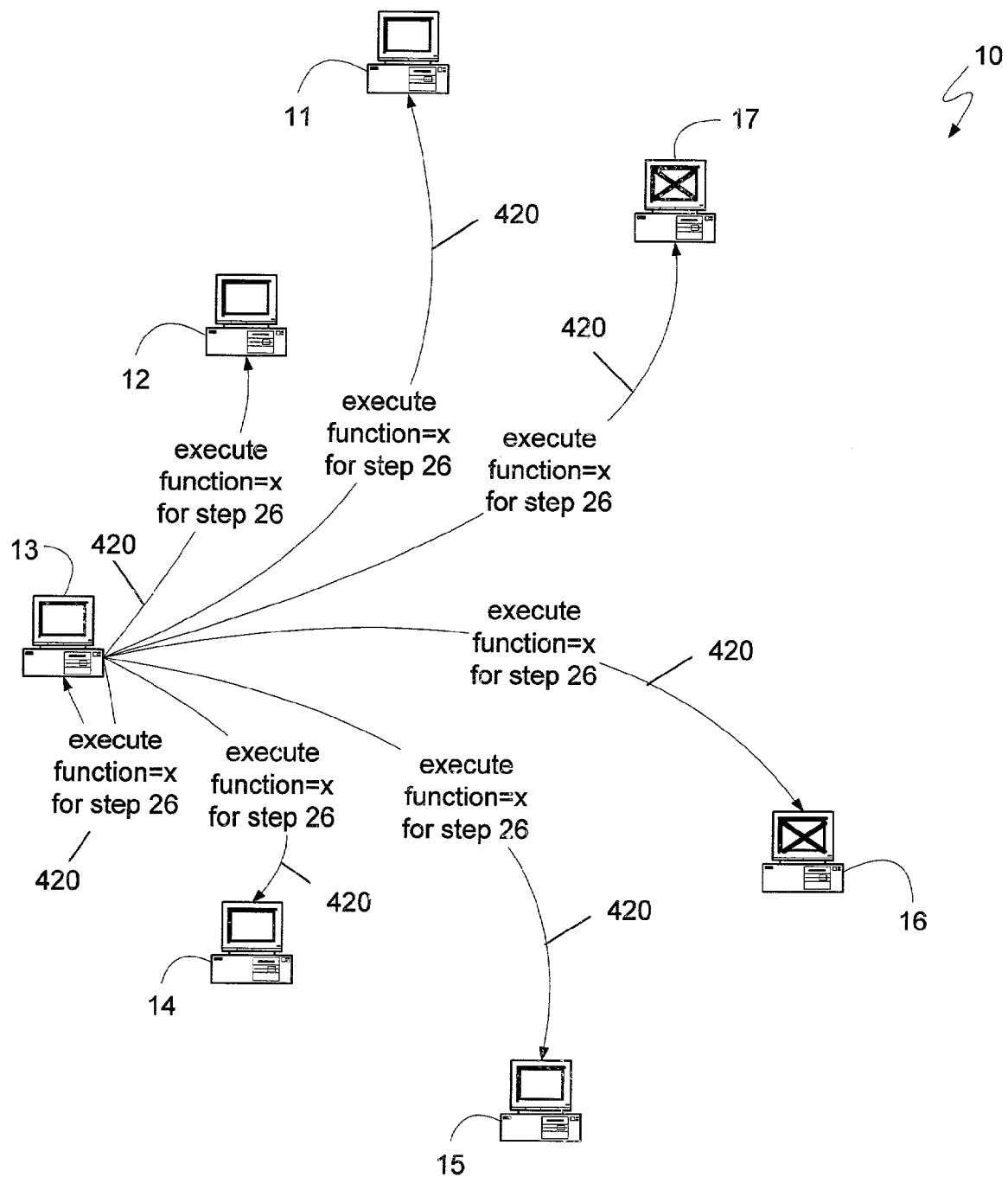

Turning to FIG. 5a, the exemplary distributed computing system 10 from FIGS. 4a-e is shown executing an additional step 26 subsequent to step 25 described in detail above. In FIGS. 4a-d, the leader 13 learned of all of the functions that were executed for steps greater than, or equal to, step 23; and it learned of the largest proposal number for which each device had voted for any steps greater than, or equal to, step 25 on which a function was not executed. As a result, the leader 13 already is aware that none of the devices 11-15 has voted for any proposals above step 25 and that proposal number 200 is, therefore, safe for all proposals for steps greater than step 25. Therefore, as shown in FIG. 5a, for step 26, the message 400 can directly solicit votes for the execution of function "x" as proposal number 200. Each of the devices 11-15 can then respond with votes, as shown in FIG. 5b with messages 411-415. Because each of the devices in the quorum had voted for the function, the leader 13 can signal, with message 420, as shown in FIG. 5c, that the devices 11-17 execute function "x" for step 26.

As can be seen, once a leader has been established, and has learned the various highest numbered proposals voted on by the devices in the quorum for all forthcoming step numbers, the leader can solicit proposals for a vote without cycling through the first phase of the Paxos algorithm. By avoiding the first phase, the distributed computing system can operate more efficiently. In addition, while the messages shown in FIG. 5a are described as taking place after the transmission of message 360 in FIG. 4g, the leader 13 need not wait for the devices to vote for one proposal before sending another proposal for a subsequent step. Therefore, upon sending message 340, as shown in FIG. 4e, the leader 13 can send message 400 shown in FIG. 5a, and can continue, in such a manner, proposing a series of functions, using proposal number 200, for steps greater than step 26. By operating in such an asynchronous fashion, the overall distributed computing system need not be slowed down by waiting to learn of votes for previous steps.

Should another device, such as a previously non-functioning device, attempt to become a leader, it would not cause the system to perform improperly, but would only succeed in causing the first phase of the algorithm to be repeated. For example, if another device attempted to become a leader, it might suggest a proposal number that some devices would respond to. Having responded to the proposal number offered by a second leader, the devices would then inform the first leader of the higher numbered proposal when the first leader solicited a vote, or the devices might ignore the request by the first leader to vote on its proposal. When the proposal failed, because an insufficient number of devices voted for it, the first leader would attempt to pass the proposal again by initially performing the first phase again and selecting what it believes is a sufficiently large proposal number which it can suggest to the devices. In such a manner, a second leader would only delay the system, but it would not cause improper operation on the part of the distributed computing system.

Additional information regarding the Paxos algorithm can be found in the paper entitled "The Part-Time Parliament" by Leslie Lamport, published in *ACM Transactions on Computer Systems*, volume 16, number 2 on pages 133-169, dated May 1998, which is hereby incorporated by reference in its entirety.

Fast Paxos

In the Paxos algorithm described above, the leader ensures that different groups of devices of the distributed computing system do not select two different functions for the same step. Because some devices may fail, the leader provides continuity between the quorums such that, even if all of the devices but one from a quorum that selected a particular function should fail, the leader, through suggesting a proposal number and receiving the last vote information from a new quorum, can learn of the vote cast by the one remaining device and can use that information to ensure that the new quorum does not select a function that is inconsistent with the function selected by the former quorum. Additionally, because devices can only vote for proposals submitted by leaders, and leader can transmit each proposal with a unique proposal number, it is unlikely that a device will receive two different proposals with the same proposal number.

In order to provide that any two quorums share at least one device, a quorum can be defined as at least a majority of the devices present in the distributed computing system. By definition, any two groupings of devices, each having a majority of devices, must share a common device. Furthermore, to allow the distributed computing system to operate and select new functions for new steps, the number of devices that can fail at any one time may not be greater than a majority. If a majority of the devices were to fail, the remaining devices would, by definition, be less than a majority and would not, therefore, constitute a quorum. Without a quorum, no function could be selected for execution. However, it should be noted that the algorithms contemplated by the present invention operate properly if a quorum was restored due to the adding of new devices or repairing of failed ones.

Given the above parameters, the number of devices needed to implement a distributed computing system using the Paxos algorithm can be represented in terms of the maximum number of failed devices the system is to anticipate at any one time. Representing the number of devices that can be exhibiting failures at any one time as the variable "F", the requirement that the number of simultaneously failed devices be less than a majority of the total number of devices in the system can be represented as $F<N/2$, where the variable "N" can represent the number of devices in the system. Thus, if $N>2F$, the system can operate in the face of F simultaneous failures.

Figure 6:
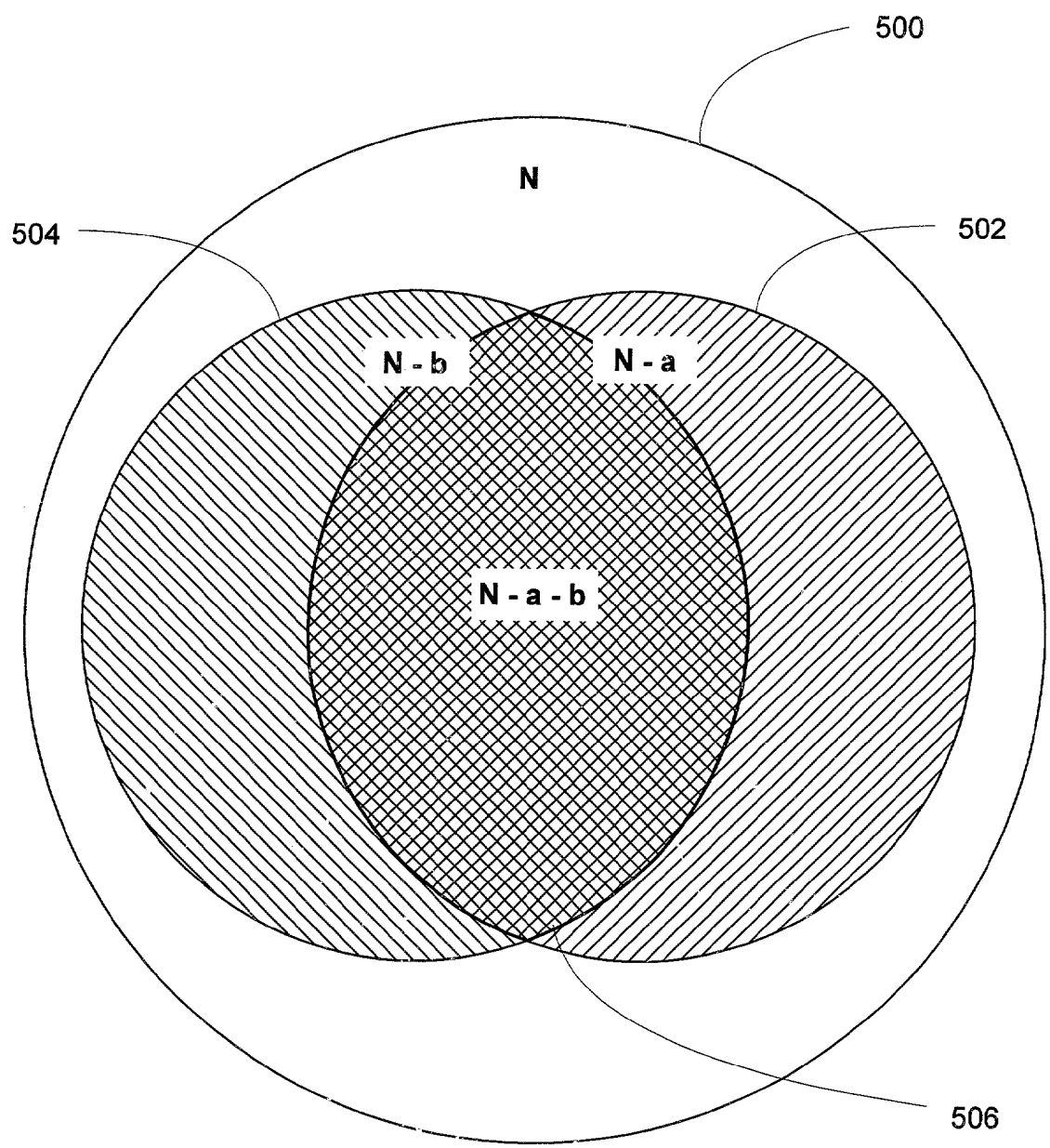
FIG. 6 generally illustrates the division of devices contemplated by the present invention.

However, if the ratio of the number of devices in the system to the number of simultaneous failures is increased, and the number of devices necessary to select a function is increased, the role of the leader can be reduced, leading to a more efficient system. Turning to FIG. 6, a set diagram illustrating a set of devices is shown. The set of all of the devices 500 is titled with the representative variable "N". The set of N devices is divided into two overlapping groups, 502 and 504, titled "N−a" and "N−b", respectively. The intersection 506 of groups 502 and 504 can vary in size depending on how the devices in groups 502 and 504 are chosen and the size of groups 502 and 504, which is dependent on the size of the variables "a" and "b", respectively. However, for purposes of the present invention, the size of the intersection can be expressed as N−a−b, as shown in FIG. 6.

The role of the leader can be reduced if, given any quorum, there is only one function which could be the function selected by a previous quorum, even if the function was proposed using the same proposal number as a different function. As described above, in the Paxos algorithm, any two quorums share at least one device. Therefore, if one quorum selects a function, at least one device that was part of that quorum will also be a part of another set of devices that constitute a quorum. However, because a quorum contains more than one device, there may be multiple functions, each voted for by at least one device in the quorum, that were proposed by proposals having the same proposal number. In such a case, even though one quorum may have selected a function, the devices of another quorum may not be able to determine which function was selected because there may be as few as one device in the second quorum that voted in the first quorum, and that device may have selected a function that was proposed by a proposal having the same proposal number as a different proposal, proposing a different function, that was also voted for by one device in the second quorum.

Because there cannot exist two independent majorities within a group, a function voted for by a majority of the devices in a quorum can be a unique value. Therefore, if the number of devices needed to select a function is such that any other quorum will have, as a majority of its devices, devices from the first quorum, then a selected function can be uniquely determined by reference to the function voted for by a majority of the devices in any quorum.

Returning to FIG. 6, if the devices in set 502 constitute a quorum and select a given function, and the devices in 504 are selected as another quorum, then if the intersection 506 is sufficiently large that it contains at least a majority of all of the devices in set 504, then the function selected by the quorum 502 will be the only function for which a majority of the devices of quorum 504 voted for as the largest proposal number for which those devices voted. As a result, the devices of quorum 504 can determine the function selected by the previous quorum 502 by simply polling themselves and determining the only function for which a majority of the devices of quorum 504 voted as the function proposed by the largest proposal number for which those devices voted.

The above criteria that the intersection 506 be at least a majority of all of the devices of 504 or 502 can be express as $N-a-b>(N-b)/2$ or $N-a-b>(N-a)/2$, respectively. If both quorums 502 and 504 are the minimum size for which the above criteria hold, then they are both the same size and a=b. Therefore, the above inequality translates to $N-2a>(N-a)/2$.

Multiplying both sides by a factor of 2 yields: 2N−4a>N−a, subtracting N from both sides and adding 4a to both sides yields: N>3a. Thus, the above criteria results in the property that the number of devices in the system is greater than three times larger than the number of devices represented by the variable "a". If the number of devices that can fail at any one time is represented by the variable "F", then the maximum size for a quorum of devices, that still allows the system to select a function even if F devices have failed, is a quorum comprising all of the working devices, or N−F devices. Therefore, if N−a is set to be larger than N−F, the number of devices required to select a function may be greater than the number of operational devices at any given time. As a result, to provide for proper operation even if F devices fail, N−a≦N−F. Removing N yields a≧F. Because each device can have an initial cost and a subsequent operating cost, it is generally desirable to determine the smallest number of devices necessary to meet a given criteria. Since N>3a, the smallest N can be found by setting "a" to its lowest limit of F, as expressed in the inequality above. The resulting equation yields N>3F. Therefore, a distributed computing system can operate without a leader if it has more than three times the number of devices as the number of failures that can occur at any given time, and it selects functions to execute with a quorum equal to the minimum number of operational devices at any given time.

Figure 7A:
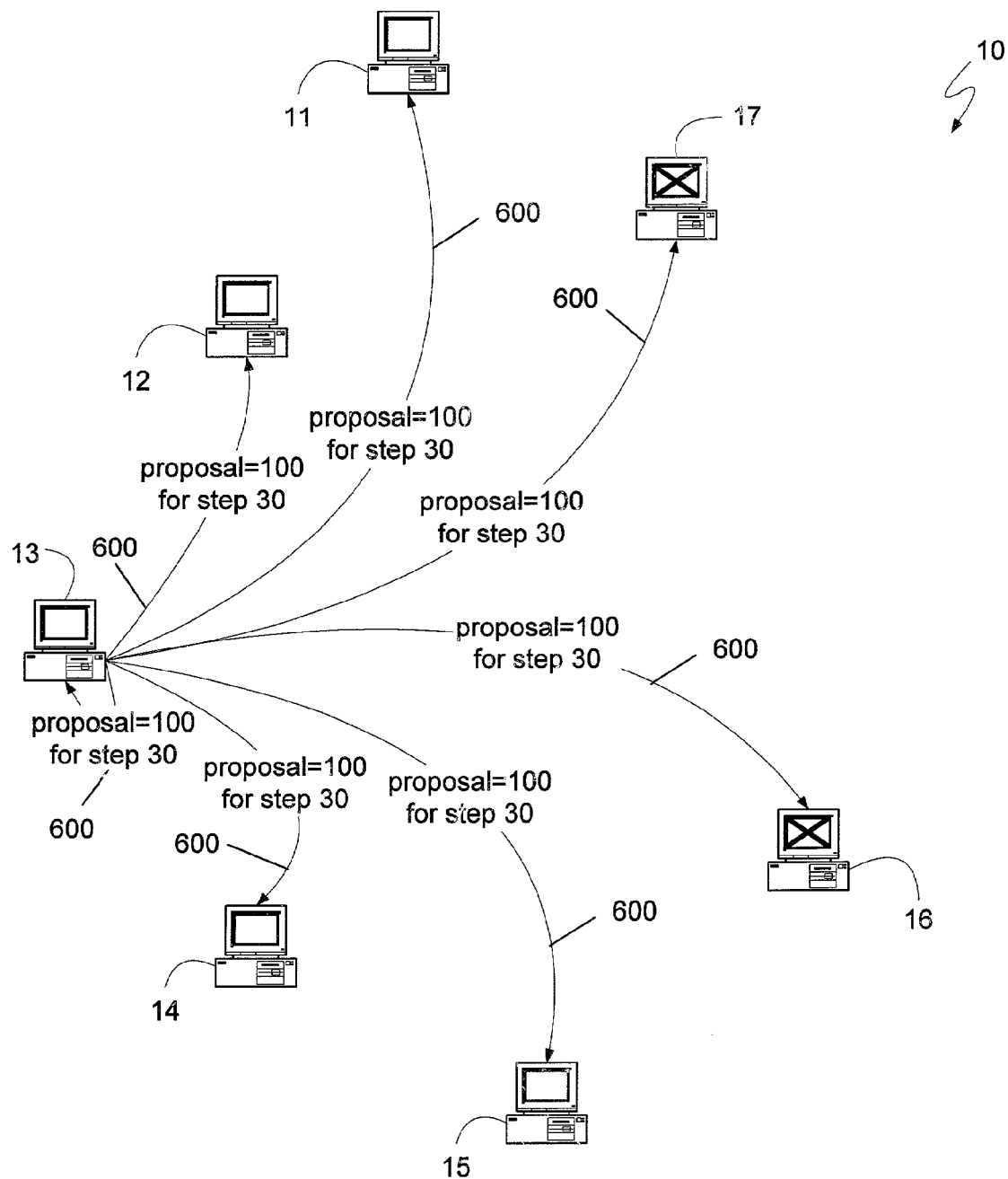
FIGS. 7a-e generally illustrate the operation of a first phase of a message-delay-reducing algorithm contemplated by the present invention.

As can be seen, any previous functions selected by a quorum of devices can be uniquely identified by determining which function was voted for by a majority of the devices in the new quorum, even if the function was proposed by a proposal with a non-unique proposal number. Such a determination can yield a maximum of one unique function, and the devices of the new quorum can, thereby, maintain consistency with the selection of the previous quorum without the need for a leader. Turning to FIG. 7a, an illustrative distributed computing system 10 having seven devices, of which a maximum of two can be experiencing failures at any given time, is shown. By the derivations above, because the total number of devices, seven, is more than three times larger that the maximum number of failures the system can experience, two, the system can be used to reduce the number of message delays between a client's request and the system's response if a minimum of five devices are used to select a given function.

Figure 7B:
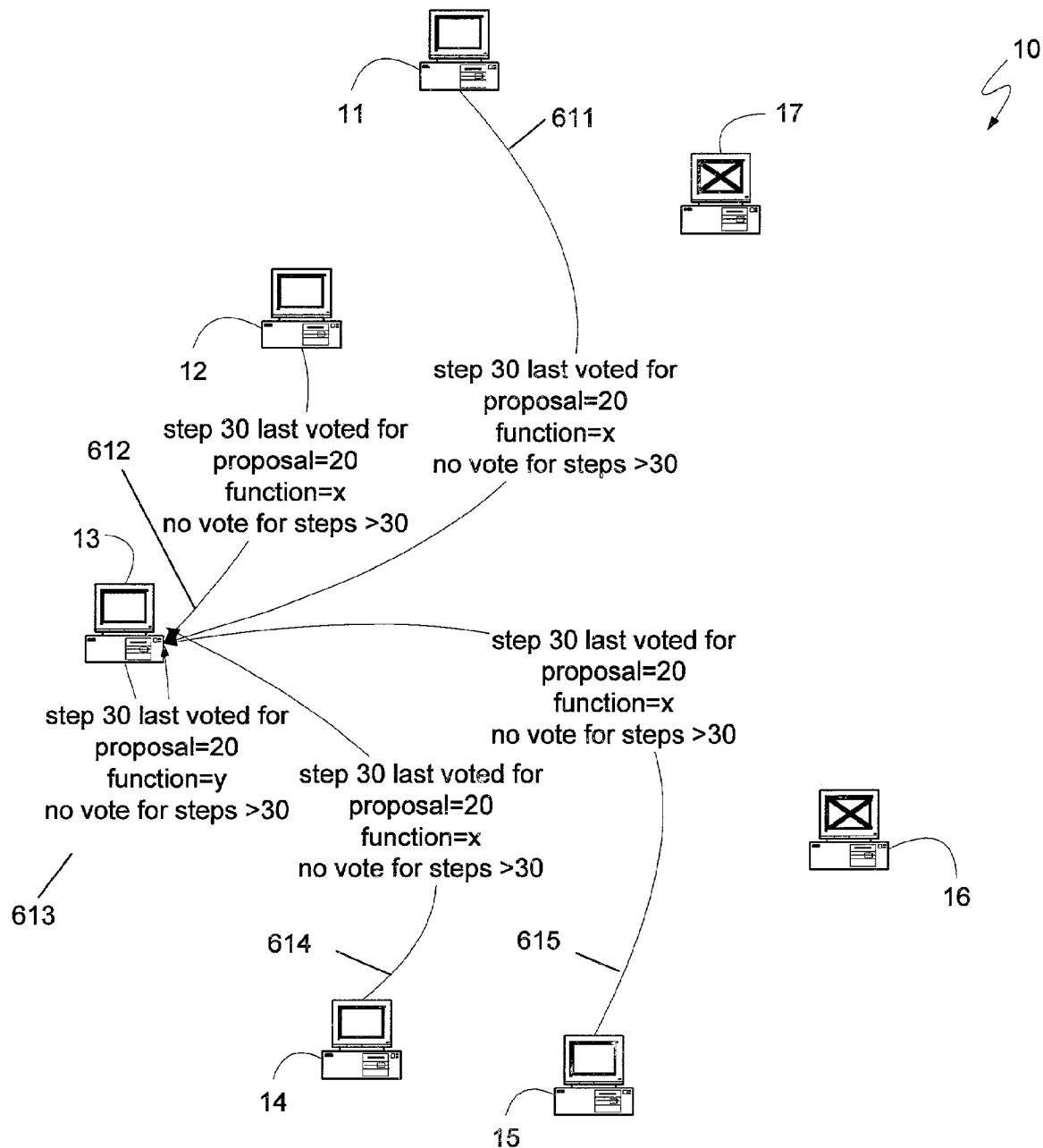

Initially, a device can act as a leader of the distributed computing system 10 in order to establish a proposal number which can be safe for all current and future steps of the system 10. Therefore, as shown in FIG. 7a, the device 13 can act as a leader, and can send a suggestion 600 to one or more of the constituent devices of the system, suggesting proposal 100 for step 30, which can be the last step of which the leader is aware of. Turning to FIG. 7b, the devices 11-15 can respond with the last vote information for all steps greater than or equal to step 30, in a manner similar to that described above in connection with FIGS. 3-5. Therefore, if leader 13 did not realize that a function had already been selected for step 30, the devices could provide that information as described above. Similarly if some of the devices had last voted for a proposal with a proposal number greater than 100, the leader 13 could submit another suggestion for a larger numbered proposal, as also described above.

For simplicity, FIG. 7b illustrates a system 10 in which the devices had not voted for a proposal whose number was greater than 100, as proposed by the leader. Therefore, as can be seen, devices 11, 12, 14 and 15 respond with messages 611, 612, 614 and 615, respectively, indicating that they last voted for proposal number 20, proposing function "x" for step 30, and did not vote for any proposals for steps greater than step 30. Device 13 may have also voted for proposal 20, but it may have voted for a different proposal 20 that proposed function "y" instead. Such a condition would not arise in the Paxos algorithm described above, since each leader would have suggested a proposal number before using that proposal number to submit a function for a vote, and would not have used the proposal number if another leader had already done so. However, as will be seen, by allowing the clients of the system 10 to communicate directly with the devices, different clients can propose different functions that are assigned the same proposal number, resulting in the possibility that two devices voted for different proposals, each having the same proposal number.

Figure 7C:
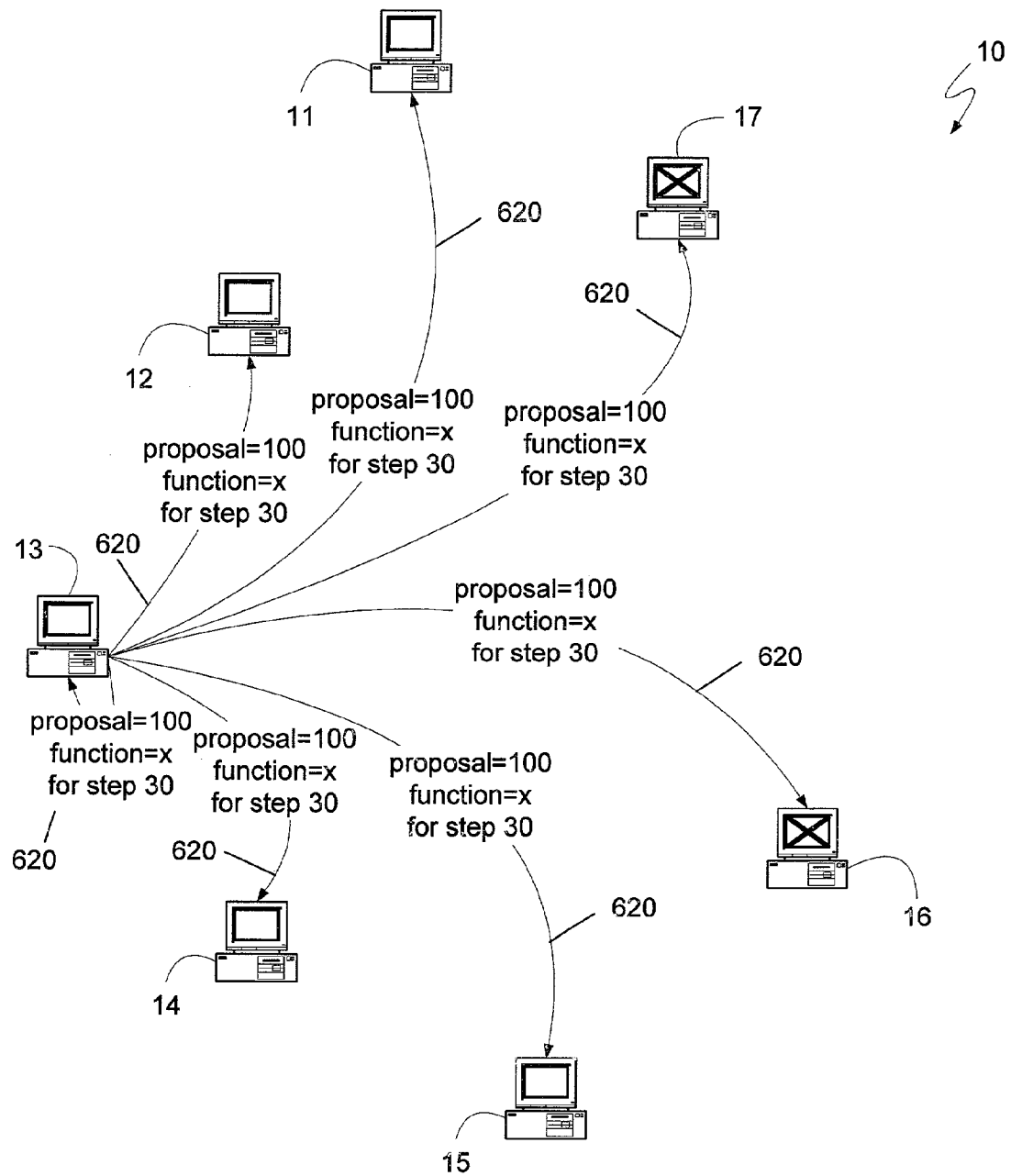
Figure 7D:
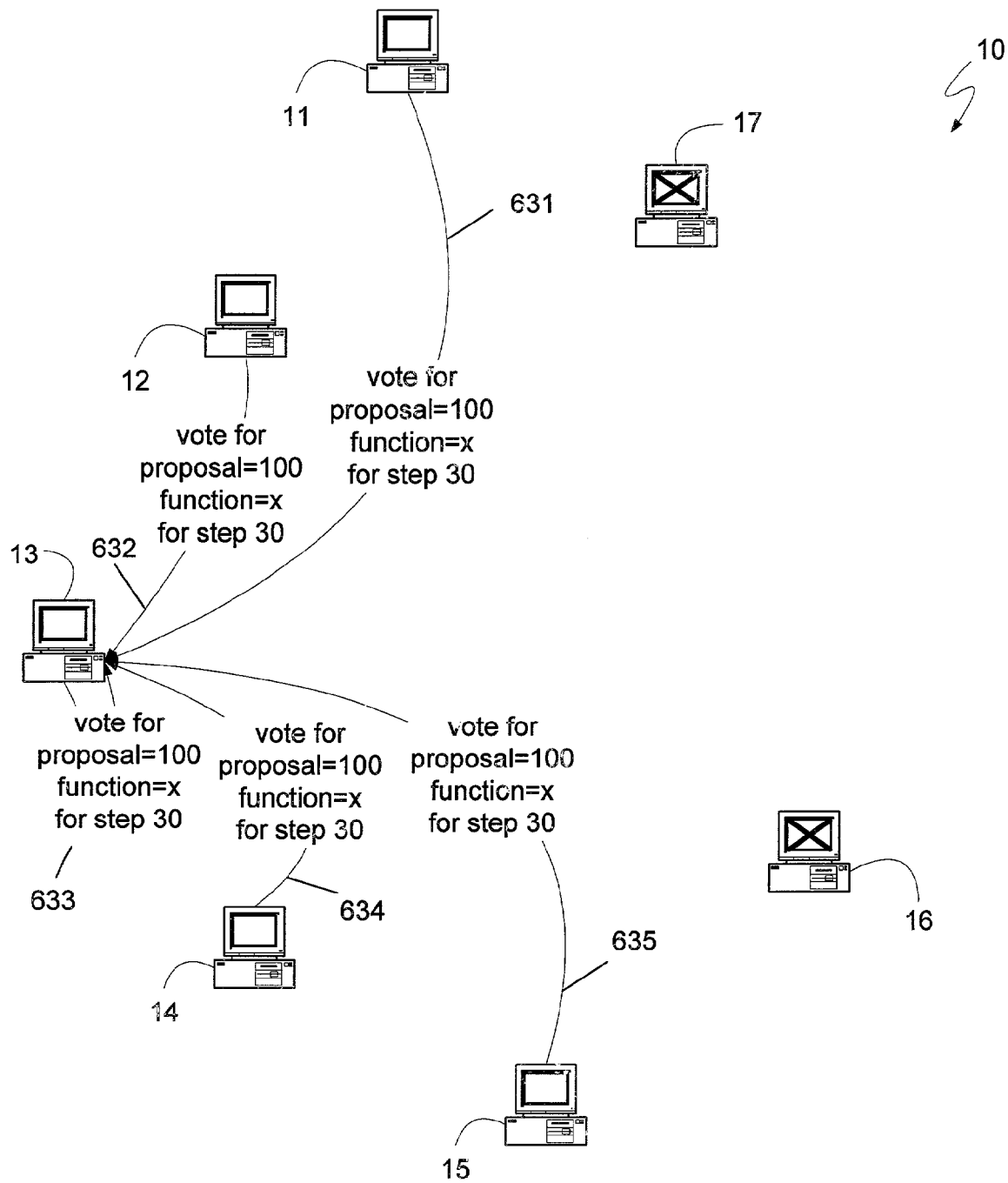

Nevertheless, because a majority of the current quorum, namely devices 11, 12, 14, and 15, each voted for the same function "x", the leader 13 can determine that function "x" is the only one that could have been selected for step 30, for the reasons described above. Therefore, as shown in FIG. 7c, the leader 13 can send message 620 proposing, with proposal number 100, function "x" for step 30. As above, the devices can each independently determine whether to vote for the proposal, based on whether they have responded to another message suggesting a different proposal number. Similarly, if the devices cannot vote for the proposal because of a subsequent message from another leader, the leader 13 can send another suggestion for a larger proposal number, as also described above. For simplicity, FIG. 7d illustrates each of the devices 11-15 selecting function "x" for step 30 and transmitting the information back to the leader 13 as messages 631-635, respectively. As before, because a sufficient number of devices, namely five, as established above, voted for function "x", it has been selected, and the leader 13 can indicate as much in message 640, shown in FIG. 7e.

Figure 7E:
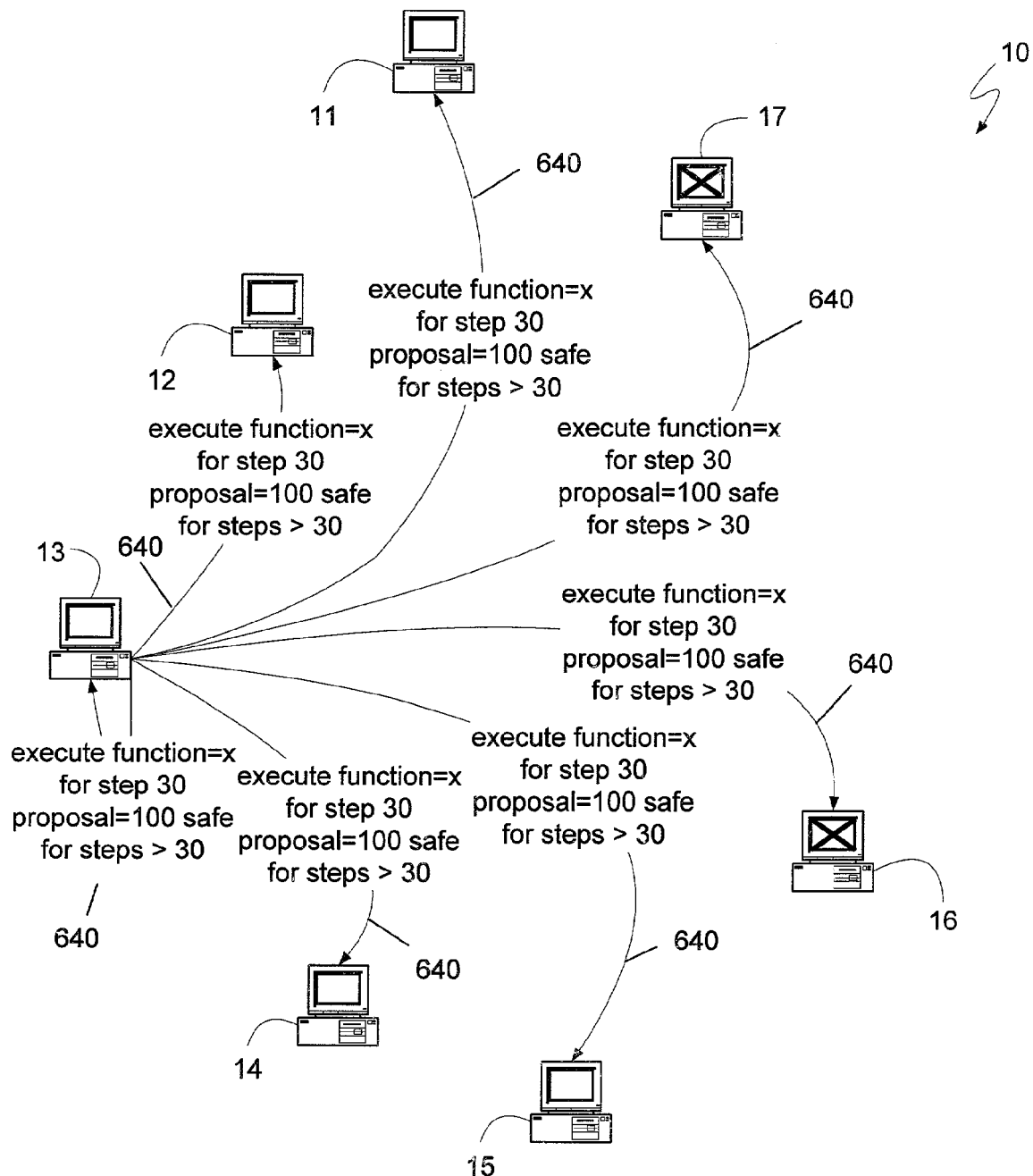

The leader 13 can also indicate that, because all of the clients responded with an indication that they had not voted for any proposals for steps greater than step 30, proposal 100 is safe for all steps above 30. Therefore, message 640 also contains an indication that proposal 100 is safe for all steps greater than step 30, as shown in FIG. 7e. Such an indication can allow the devices to receive requests directly from the clients, instead of only from a leader device.

Figure 8A:
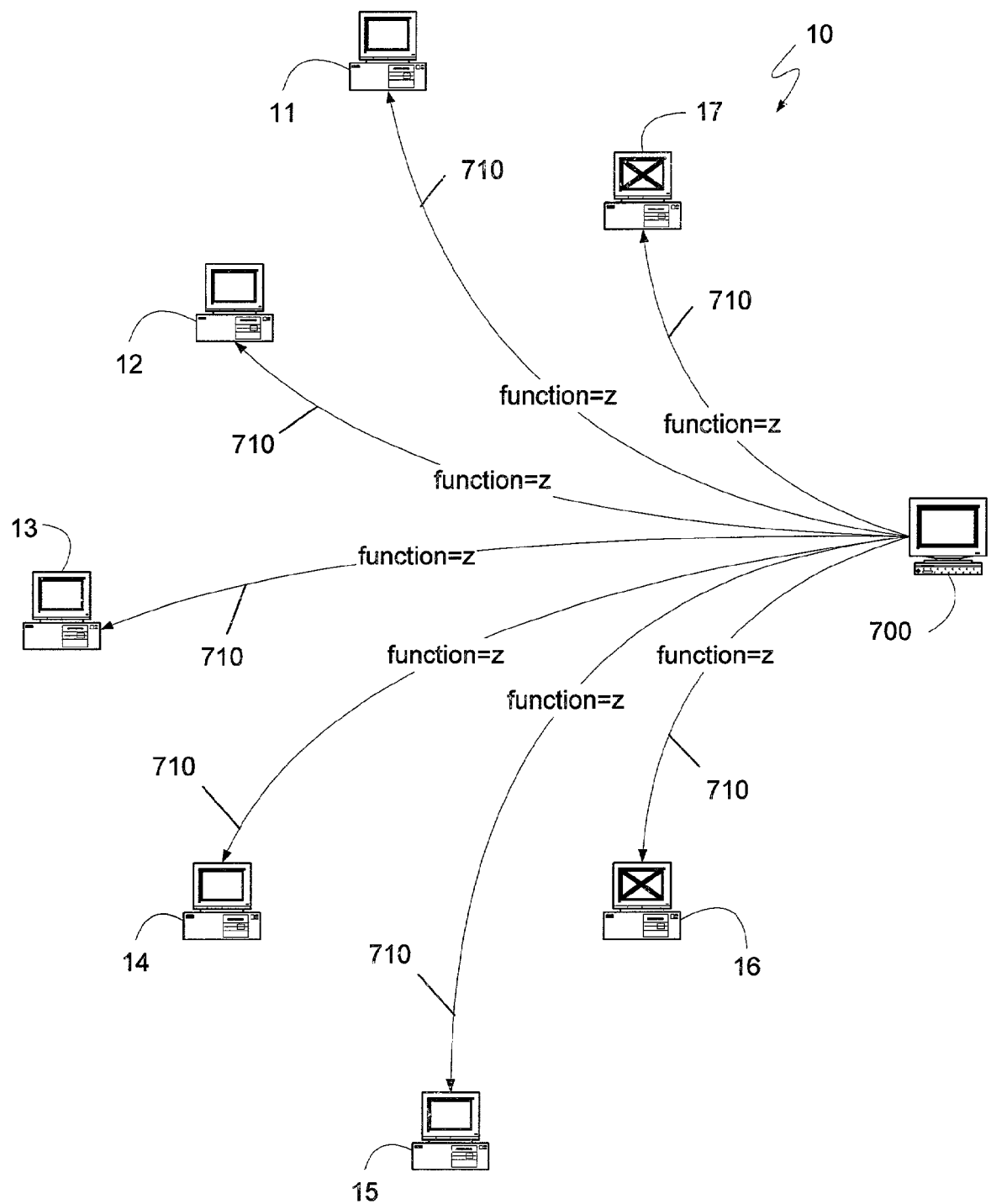
FIGS. 8a-d generally illustrate the operation of a second phase of a message-delay-reducing algorithm contemplated by the present invention.

Turning to FIG. 8a, a client 700 of the distributed computing system 10 is shown. The client 700 can send a request 710 to each of the devices in system 10, requesting that they execute function "z". Alternatively, the client 700 can send request 710 to one or more devices, and those devices can, in turn, forward the request onto the other devices. From message 640, the devices know that proposal 100 is safe for all steps greater than 30, and each device, having executed function "x" for step 30 as requested in message 640, can look to execute the next function for step 31. Therefore, upon receipt of the request 710, each client can treat the request in a manner analogous to a proposal from a leader for step 31, with a proposal number of 100. Each client can vote for the execution of function "z" if they have not responded to a suggestion for another proposal number and if they have not already voted for a function proposed by a proposal numbered 100 for step 31.

Figure 8B:
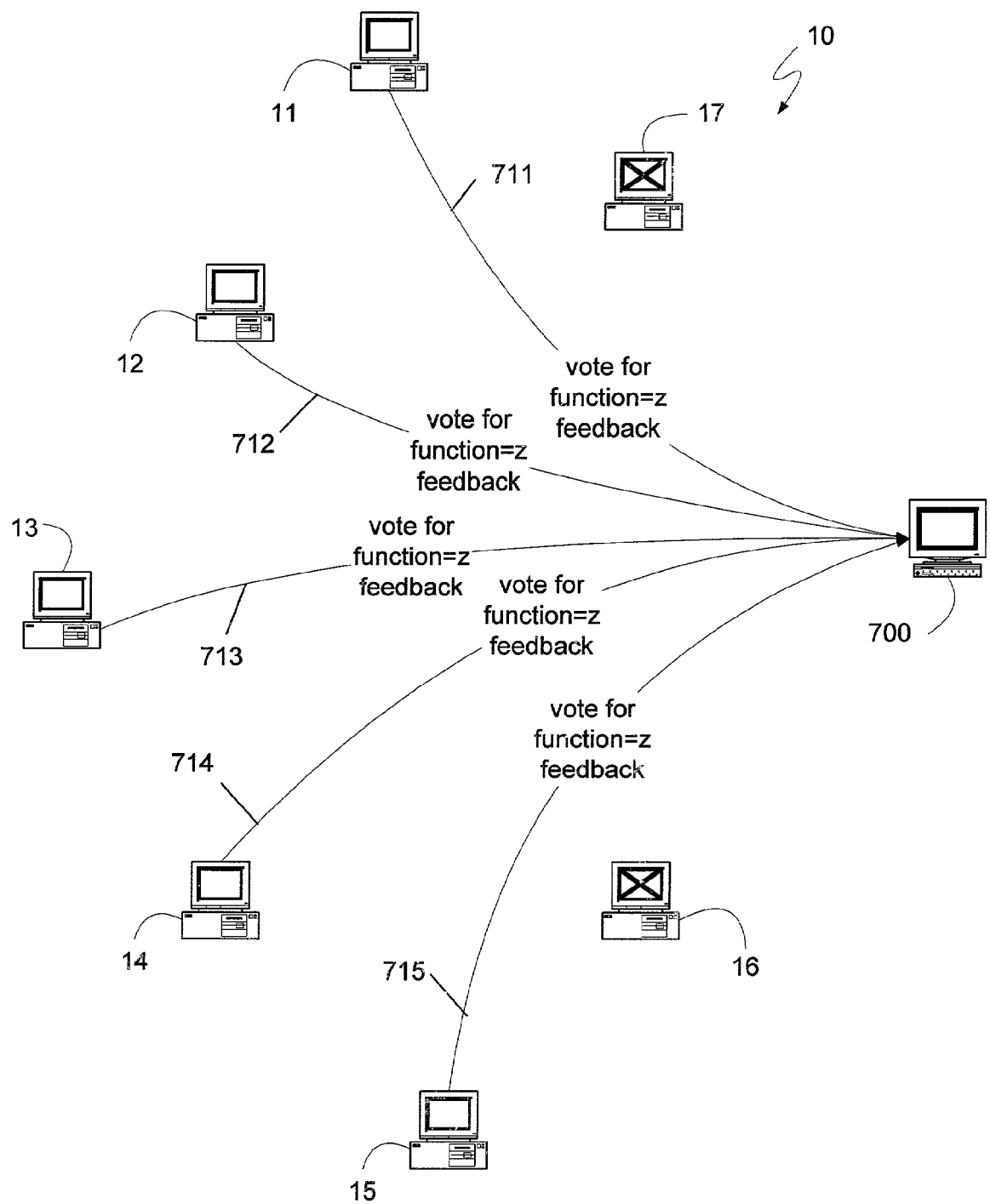

FIG. 8b illustrates the clients 11-15 each voting for the execution of "z", executing function "z" and providing feedback to the client 700 through messages 711-715. The feedback provided can be a simple acknowledgement that the function was performed, or it can contain a resultant value if function "z" was directed to obtaining a value. If the feedback to function "z" requires information that is state dependent, a device may not be able to provide such information until it has executed all of the agreed upon functions for all of the steps prior to the current step. For example, a function that would request the device to provide a value of a variable could require that the device have an updated state, as the value of the variable could have changed between states. However, functions that do not require a current state, such as a function that can request that the device perform an action, regardless of its state, can be executed without requiring the device to update its state. Therefore, a function that, for example, merely instructs the device to store a given value does not require that the device have a current state because the requested function, and its results, are the same regardless of the device's state. In such a case, the device can execute the function and provide an acknowledgement even though it may not have performed all of the other functions selected for the previous steps. Because devices 16 and 17 may be experiencing a failure, they can provide no response to the client 700. However, as above, devices 16 and 17 are merely representative of any two devices of the system 10 that can fail at any one time and are not intended to represent specific, invariant devices.

The messages 711-715 can also be transmitted to each of the devices in the system 10, or to a leader device. Each device receiving the messages 711-715 can verify that each of the operational clients responded with the same information. If one of the devices responded with a message indicating that it did not vote for function "x", or if the feedback provided was not equivalent to the feedback provided by the other devices, the devices can signal a function may not have been chosen, and can request that a leader perform steps analogous to those described above in connection with FIGS. 7a-7e. As will be shown below, such a mechanism can ensure that each of the devices remains synchronized and implements the state of the overall system 10.

As will be understood by those skilled in the art, transmitting the messages 711-715 to each of the devices increases the number of messages sent by the square of the number of devices to which the messages are sent. Therefore, to reduce the number of messages transmitted, each of the messages 711-715 can be sent to a single device, such as the last device to act as a leader. However, such a mechanism introduces at least one message delay into the system, as the leader will then need to transmit an indication to the client that the client's request was chosen and performed. Such a tradeoff between the number of messages and message delays is well known in the art.

Figure 8C:
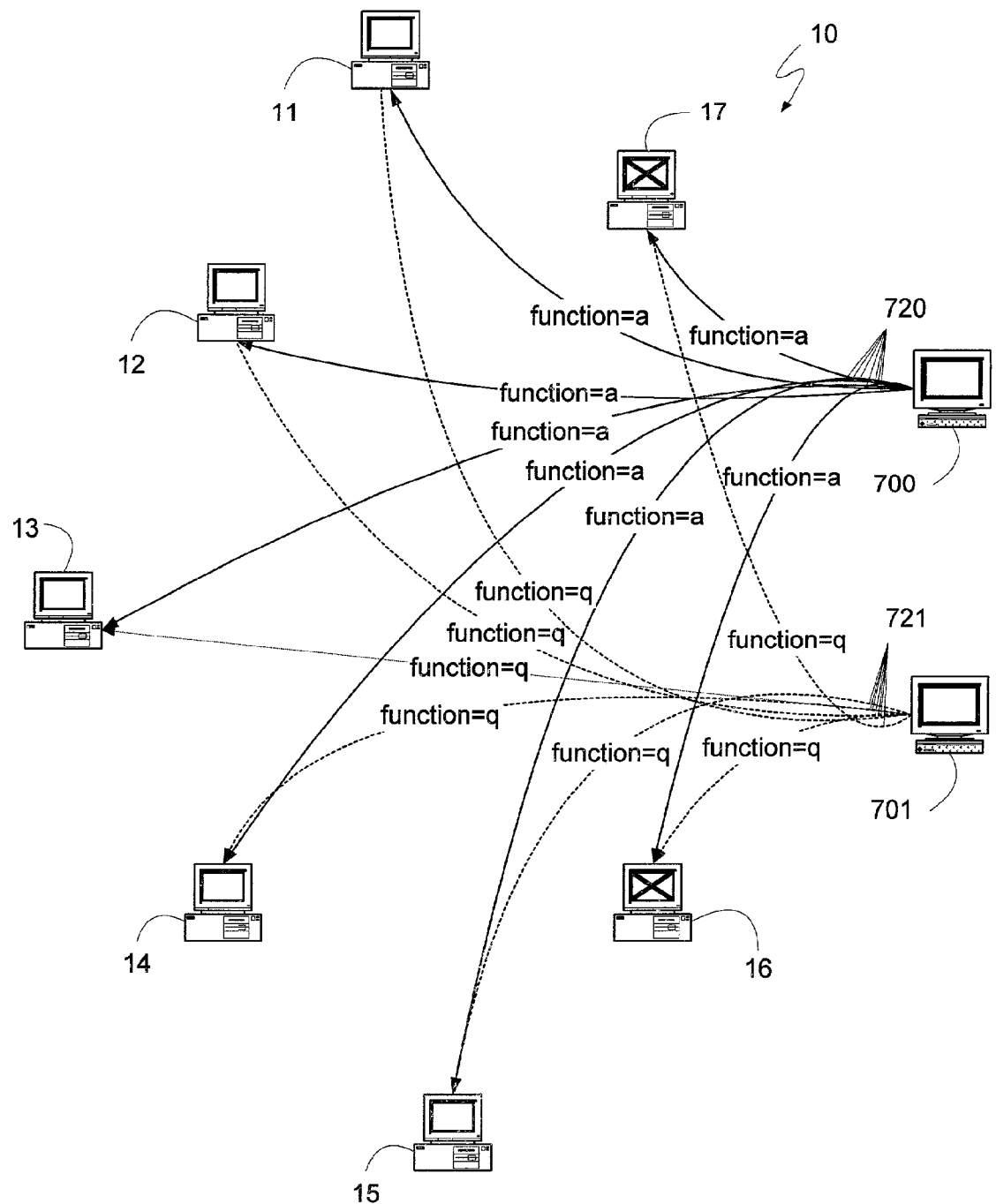

If the client 700 receives a quorum of votes from the devices, indicating that they voted for the function and providing the requested feedback, the client can know that the distributed computing system 10 selected the requested function. In a manner similar to that described above in connection with the Paxos algorithm, the client need not wait for the responses 711-715 from the clients 11-15 prior to requesting the execution of another function. Therefore, the request 720 for function "a", as shown in FIG. 8c, can have been sent prior to the response messages from the devices illustrated in FIG. 8b. As can be seen, the client can receive a response to its request in as few as two message delays, namely the delay of transmitting message 710 and the delay of transmitting messages 711-715.

Turning to FIG. 8c, client 700 is shown transmitting a request 720 to the devices 11-17, which, as explained above, can be sent prior to messages 711-715. Request 720 can request the execution of function "a", and each of the receiving clients can, as before, treat the request 720 as a proposal for the next step, such as step 32 in the present example, having a proposal number of 100. However, FIG. 8c also indicates a second client 701, transmitting request 721 to the devices 11-17. Requests 720 and 721 may be received by each device at a different time, depending on such factors as network bandwidth and congestion, and network distances, including the number of intermediate devices such as routers. For those devices that receive request 720 first, they can treat request 720 as a proposal for step 32 with a proposal number of 100. After voting for request 720, those devices can refuse to vote for request 721, which may arrive later in time, or they may vote for request 721 for step 33. Conversely, for those devices that receive request 721 first, they can treat request 721 as a proposal for step 32 with a proposal number of 100, vote for request 721, and then either refuse to vote for request 720, or vote for request 720 as step 33.

Figure 8D:
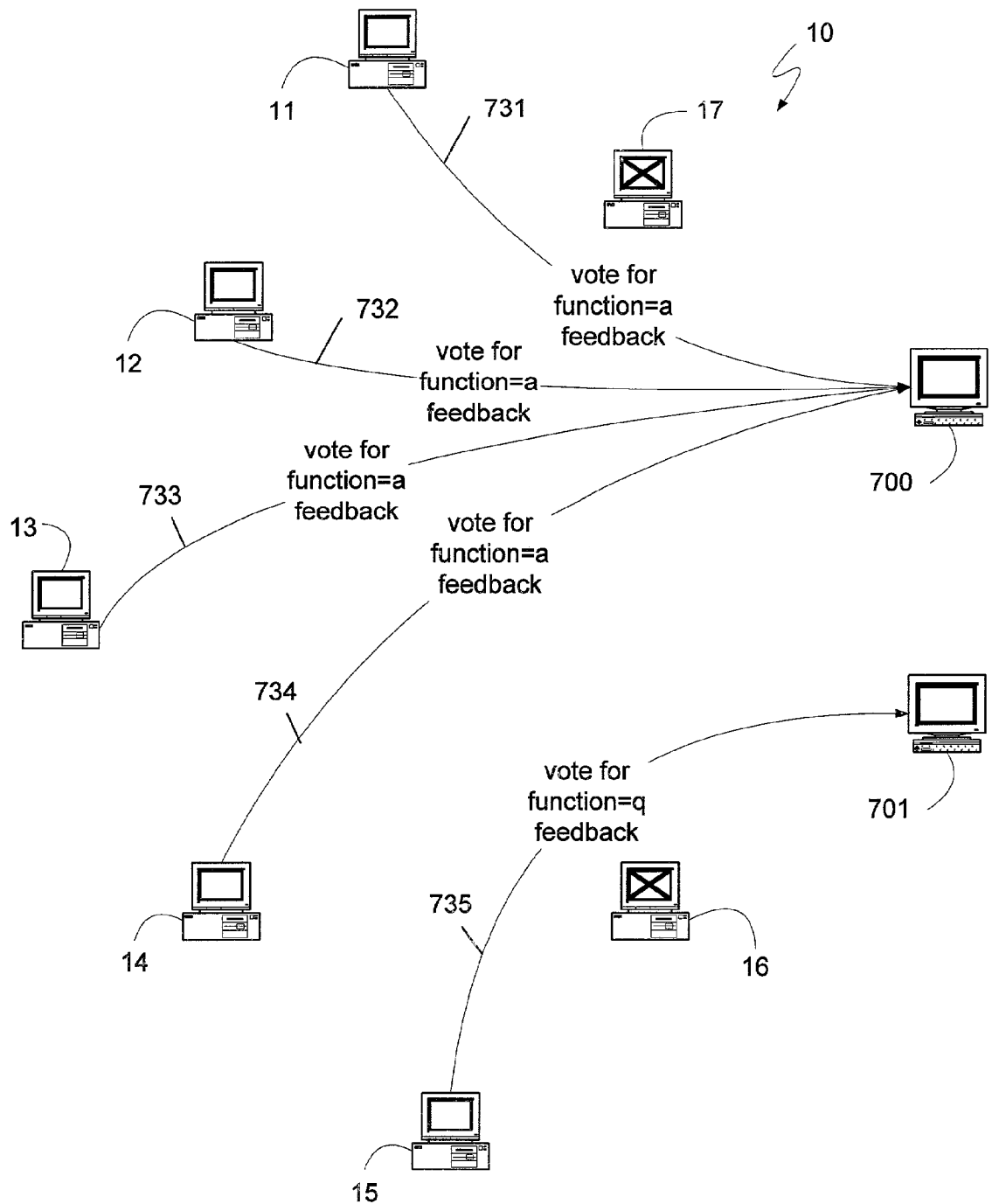

FIG. 8d illustrates the responses provided by devices 11-15 to the requests 720 and 721 sent by clients 700 and 701, respectively. As shown in FIG. 8d, devices 11-14 may have received request 720 first, in which case they voted for request 720, executed it, such as executing it speculatively, as described below and provided any appropriate feedback to client 700 in the same manner as described above. The feedback and the indication of the vote can be provided to client 700 via messages 731-734, as shown. Having voted for request 720, the devices 11-14 may receive request 721 later in time, and can choose to not vote for it, as also shown. Device 15, however, may have received request 721 first, in which case it voted for request 721, executed it, and provided any appropriate feedback to the client 701 also in the same manner described above, via message 735.

As can be seen from FIG. 8d, neither client 700 nor client 701 has received a quorum of responses from a quorum of devices indicated that they have voted for either client's requests. Furthermore, some of the devices of the distributed computing system 10, such as devices 11-14 may have executed one function for step 32, while other devices, such as device 15, may have executed a different function for the same step. When the messages 731-735 are received by the devices, or a leader, it can be determined that the devices of the system did not agree upon the function to execute, and a leader can be requested to perform steps analogous to those described above in conjunction with FIGS. 7a-7e. When the leader transmits a suggested new proposal number, assuming that devices 11-15 remain operational, it can learn that four devices voted for proposal 100, proposing function "a" for step 32 and one device voted for the same proposal 100, but proposing a different function "q" for step 32. Because the four devices can be a majority of the present quorum, the leader can find a singular value, namely function "a" to submit for a vote using the new proposal number. All of the devices can then vote for function "a", and can execute it and provide feedback to the client 700, which has now received a vote from a quorum of devices and can determine that the function was selected. Device 701 can then retry function "q" at a later time.

If two of the devices 11-14 fail prior to the time that the leader sends a new proposal number suggestion, and the failed devices 16 and 17 become operational, the leader may learn that only two devices voted for proposal 100, proposing function "a" for step 32, one device voted for the same proposal 100, but proposing a different function "q" for step 32, and one device did not vote. Because a majority of the devices in the quorum did not vote for the same function, and there are two functions proposed with the proposal having the largest proposal number that any device has voted for, the leader may not be able to determine a singular value to propose. Therefore, if the functions were executed speculatively by the two functioning devices, such that the client was informed of the result that the execution would have produced but that the execution of the function was only performed after the devices learned that the function was chosen, the lack of a message indicating that the functions was chosen would prevent the two operating devices from executing the function and becoming unsynchronized with the remaining devices in the system. Alternatively, if the functions were executed and needed to be undone, the leader may seek to abort the execution of any functions for step 32, causing both client 700 and client 701 to try and resubmit their requests. Each of the devices can undo the function performed for step 32 and can set the next proposal received to be a proposal for step 32.

Before the leader can allow the devices 11-17 to receive client requests directly from the client, the leader can perform the steps described above in connection with FIGS. 7*a*-7*e*, so as to obtain a proposal number which is safe for all current and future steps. In addition, the leader, in performing these steps, would learn of functions that may have been chosen and could, at the leader's discretion, select one to propose for step 32 and another for step 33. Alternatively, the leader could perform the steps and propose functions for steps 32 and 33, but then revert to the previous proposal number as safe for all functions for steps 34 and larger.

As can be seen, the above algorithms provide a mechanism by which devices can receive and process client requests directly and treat them as proposals having a proposal number that is determined safe, without the need for each of the client requests to be directed initially through a leader. If multiple clients cause the system to become unsynchronized, a leader can step in and perform the standard Paxos algorithm to reestablish synchronization, and to provide a new proposal number that is safe for all current and future steps of the system. If a client attempts to submit a proposal directly to a device during a time when the leader is attempting to determine a safe proposal number or request a vote on a proposal, the clients can either ignore the device's request, or can forward it to the leader, which can propose the request after the leader has established a safe proposal number, but prior to allowing the devices to accept direct client communication. As yet another alternative, the receiving device can treat the new request as it did prior to the leader performing the above operations for steps 32 and 33, and it could vote for the new request, using the old safe proposal number and a larger step, such as step 35. The operation of the system when voting on one function for one step is independent of the operation of the system when voting on another function for another step.

Fast Paxos with Fewer Devices

Figure 9A:
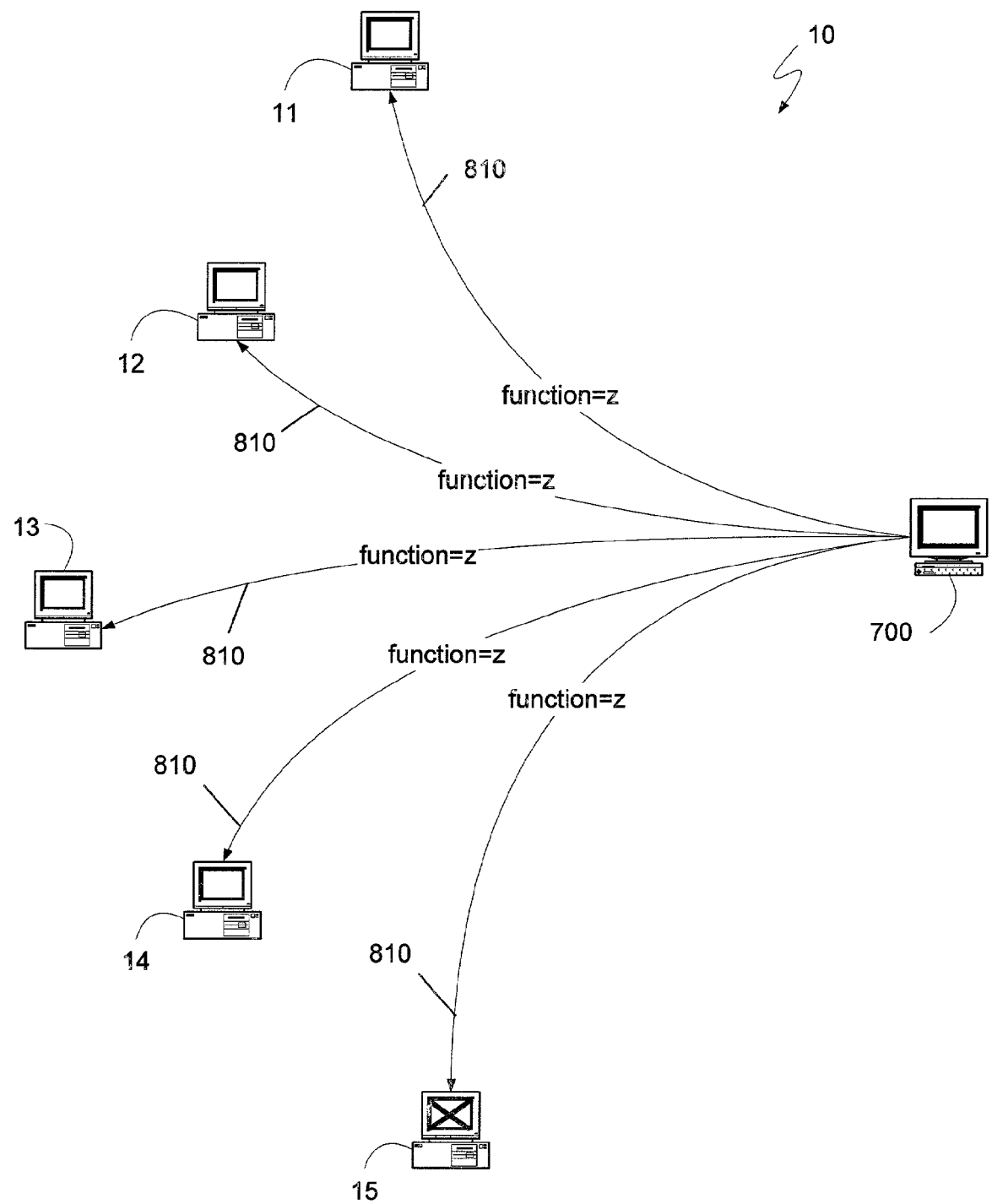
FIGS. 9a-9k generally illustrate the operation of a first and second phase of a message-delay-reducing algorithm capable of adapting to fewer than required devices.

In addition, a distributed computing system having fewer than three times more devices than the maximum number of devices that can fail is also capable of using the message-delay-reducing algorithm described above if the system can revert to the Paxos algorithm, also described above, when there are too many devices exhibiting failures for the system to properly execute the message-delay-reducing algorithm. Turning to FIG. 9*a*, distributed computing system 10 may now comprise only five devices 11-15, as shown. As described above, a system having more than three times the number of devices as the maximum number of devices that can fail at a given time can function properly while still sending client requests directly to the devices because the size of the quorum can provide that any collection of devices that contains a quorum will have, as a majority of its devices, devices that were part of the previous quorum. In such a manner, a unique value can be determined as selected by a prior quorum, even if proposals may not have unique proposal numbers.

The exemplary system of FIG. 9*a* has only five devices, though it may have as many as two failures. Therefore, it does not meet the requirements set forth above. However, as will be shown, for those times that the exemplary system of FIG. 9*a* operates with one failure or fewer, it can implement the message-delay-reducing algorithm. In FIG. 9*a*, a client 700 can send a request 810 in a manner analogous to request 710 described in detail above. The devices can treat the request 810 as a proposal with a proposal number equivalent to the safe proposal number determined by a leader, such as described in FIGS. 7*a*-7*e*, above. Each device can then determine whether to vote for the request 810 and, can indicate the result of its vote to the client 700, together with any feedback that may be appropriate if the device voted for, and executed the requested function.

Figure 9B:
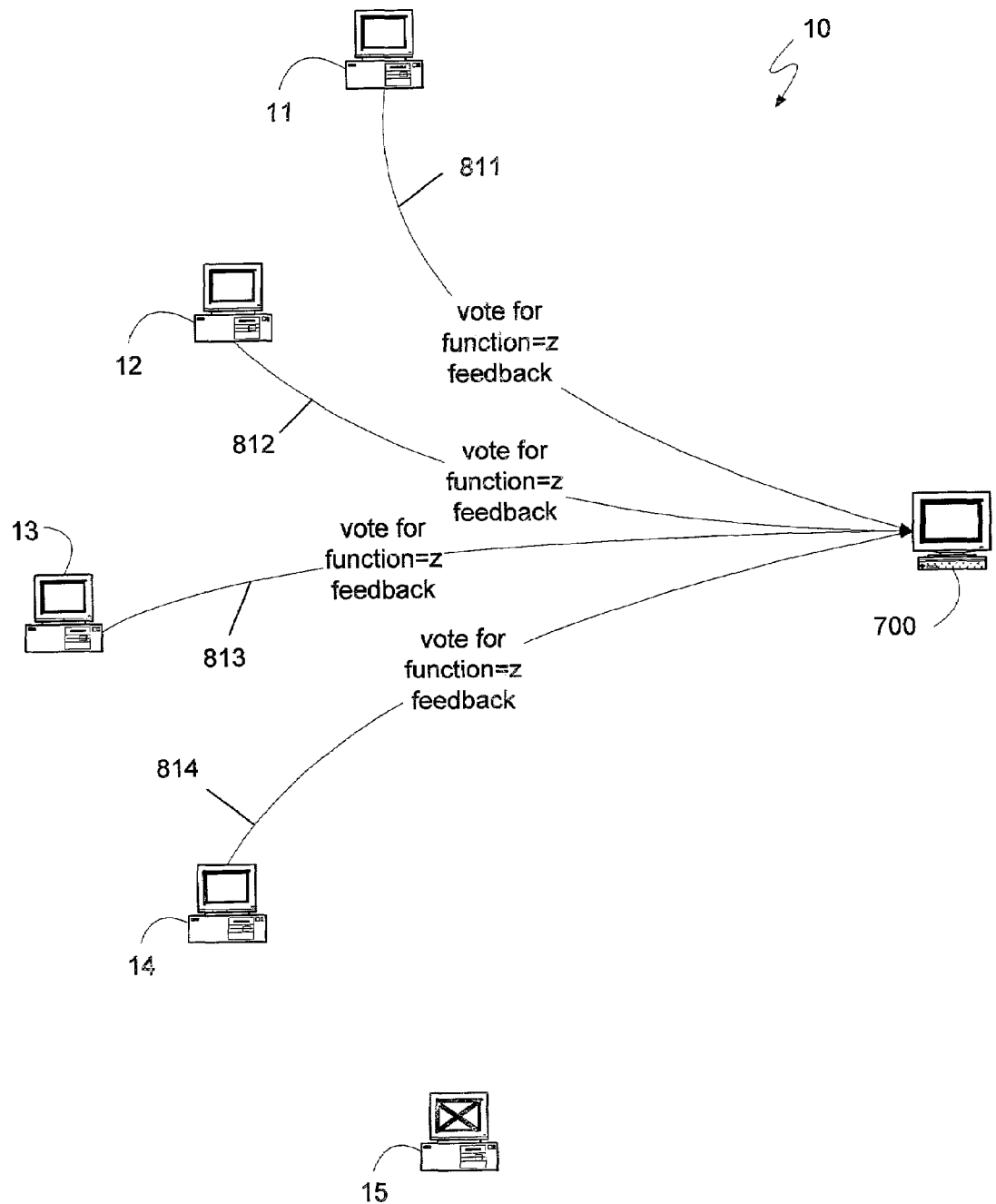

Turning to FIG. 9*b*, the devices 11-14 transmit responses 811-814 back to the client 700 indicating that they voted for the requested function and providing the appropriate feedback. Device 15 may be suffering a failure and may not, therefore, respond. Because the total number of devices in the exemplary distributed computing system is five, a quorum can be at least four devices to enable any quorum to share a majority of its devices with any other quorum, for the reasons described above. Therefore, client 700 receives messages from a quorum of devices 11-14 indicating that they executed the function, and can, as a result, consider the function executed. In such a manner the exemplary system shown can perform the message-delay-reducing algorithm described above because, if fewer devices than the maximum have failed, the system may still have a quorum of devices that can select functions.

Figure 9C:
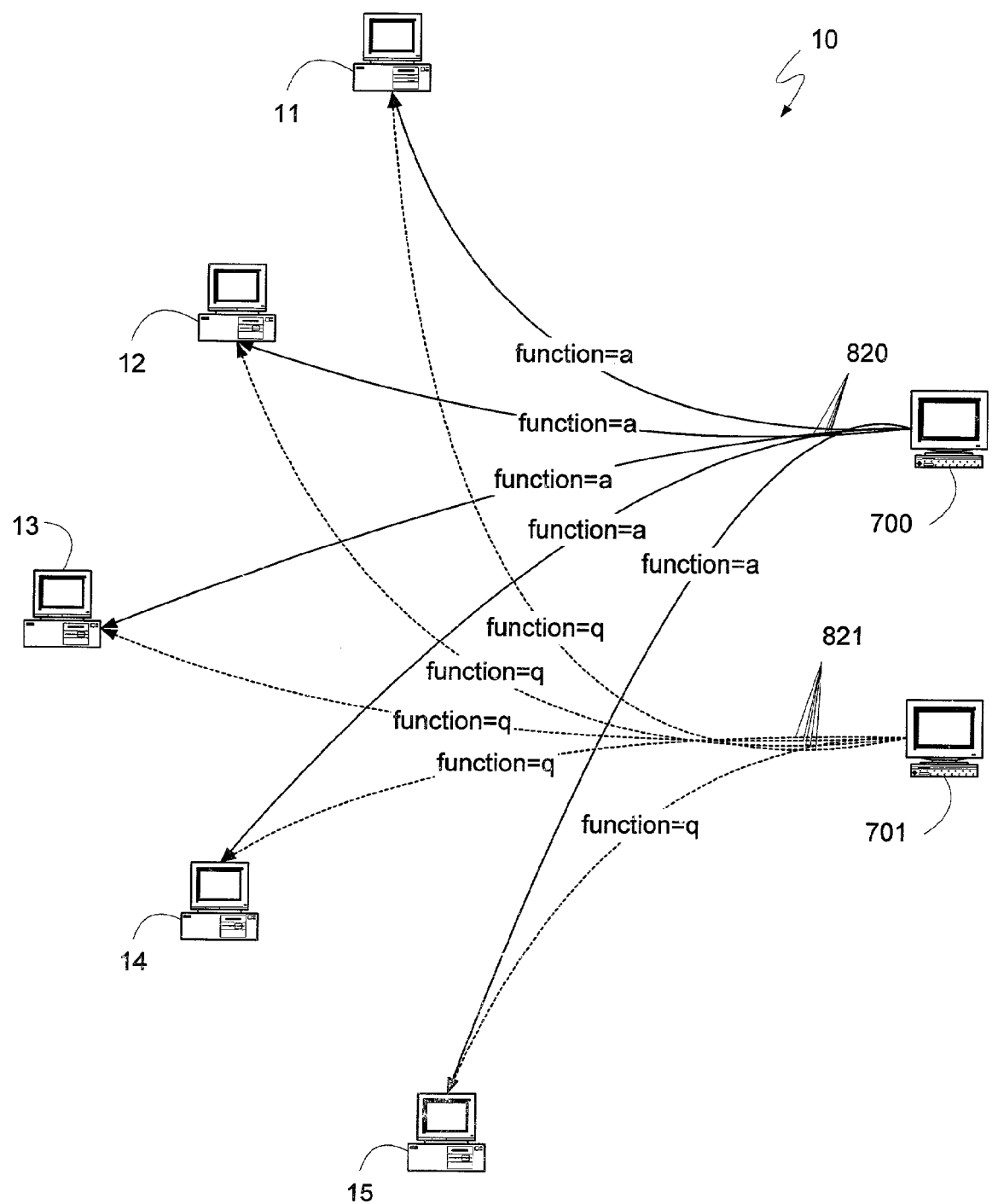
Figure 9D:
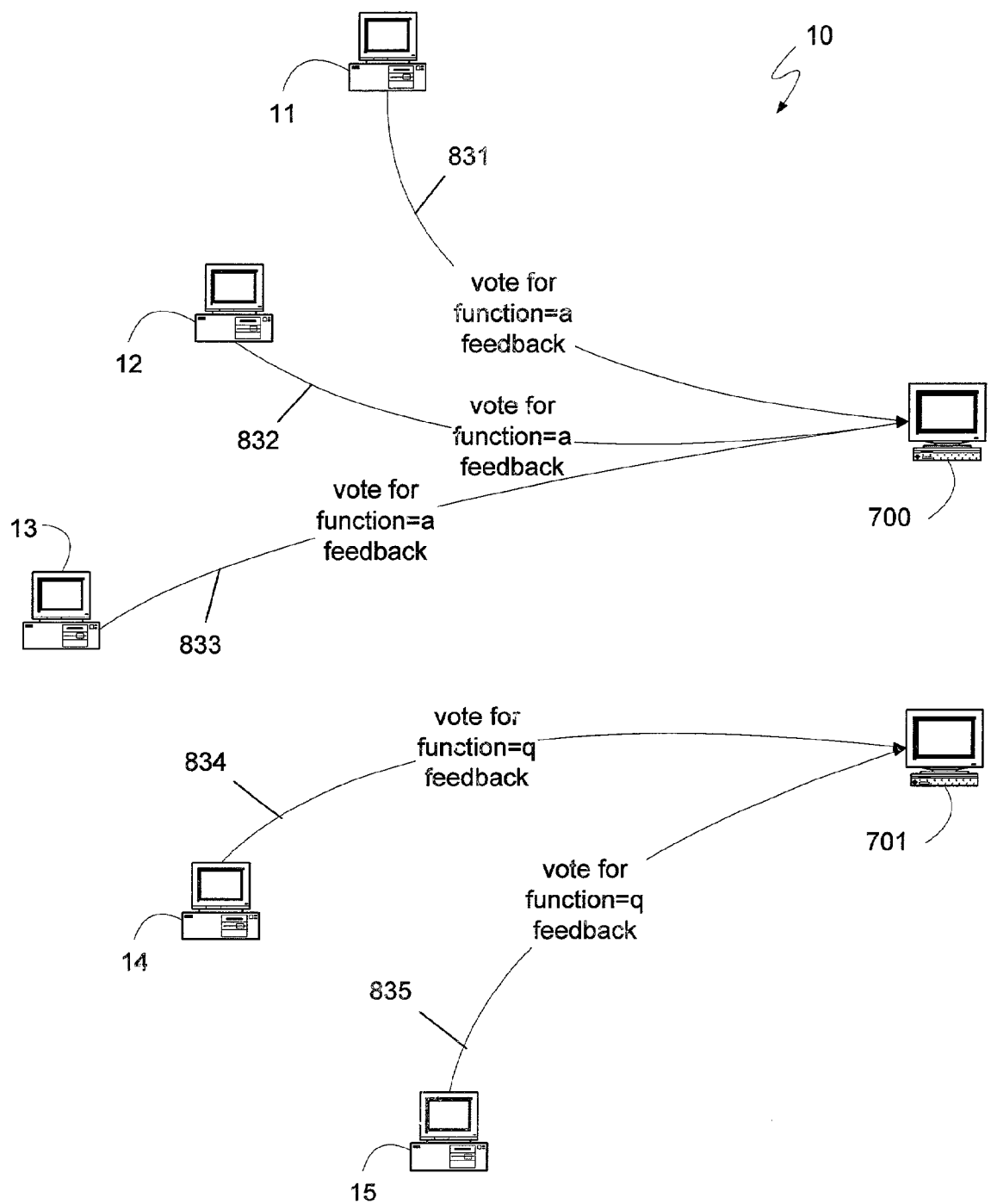

To further illustrate the operation of the system above, FIG. 9*c* shows two clients 700 and 701, each transmitting a request 820 and 821, respectively, to the devices 11-15. In a manner analogous to that described above with respect to FIG. 8*c*, devices 11-13 might first receive request 820 and vote for it, while devices 14 and 15 might first receive request 821 and vote for it. Therefore, as shown in FIG. 9*d*, devices 11-13 can vote for request 820, and can indicate their response to client 700 in messages 831-833, respectively, and devices 14 and 15 can vote for request 821 and indicate their responses to client 701 in messages 834 and 835. As before, messages 831-835 can also be sent to each of the devices of the system 10, or at least to a leader device. Either of these can then detect that a quorum of the devices in the system 10 did not vote for a proposal. A leader can then suggest a new proposal number and learn of the previous votes by devices 11-15. Even if one of the devices were to fail, such as device 11, the leader would still have a quorum of four devices 12-15 from which to receive last vote responses. Two of the devices 12 and 13 would indicate a last vote for request 820, while devices 14 and 15 would indicate a last vote for request 821. As above, all of the devices could indicate that their last votes were for the same proposal number. The leader can only determine that function "a" or function "q" were selected. The leader can, at the leader's discretion, select one of these functions and propose it to ensure that a quorum of devices selects it. Once selected, the leader can let all of the devices know that the function was selected and that they should execute it, and it can propose the other function for the next step, and can similarly have the system select that function. In such a manner, the above mechanisms for avoiding at least one message delay can still be used for a system with fewer than the requisite number of devices.

However, if four of the devices 11-15 of FIG. 9*d* had selected the same function, then that function would have been selected by a quorum and the involvement of the leader would not have been necessary. For example, if the devices provisionally execute whichever function they vote for, as described above, then the client whose function was selected could transmit a message to all of the devices informing them that a quorum of them selected the same function and that the function was, therefore, chosen and should be executed by all of them. Because provisionally executing a function did not result in a change in the state of the device, each device, when instructed to execute the function, can do so, and all of the devices can remain synchronized. Alternatively, if the devices execute the function when they vote for it, a message indicating that the chosen function is a different function from that a particular device voted for, can cause the device to undo the previous function and perform the selected function, again maintaining synchronization.

Figure 9E:
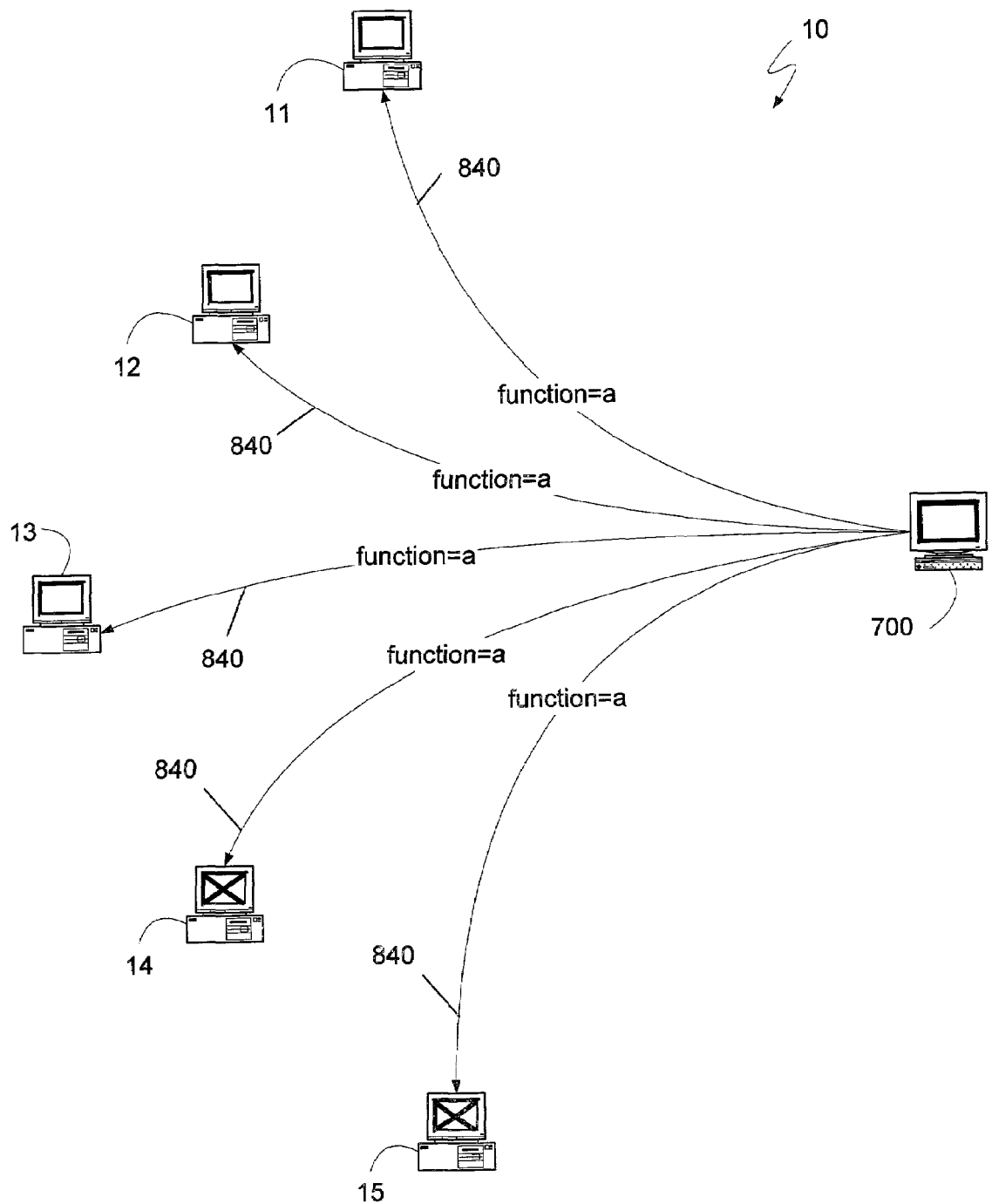
Figure 9F:
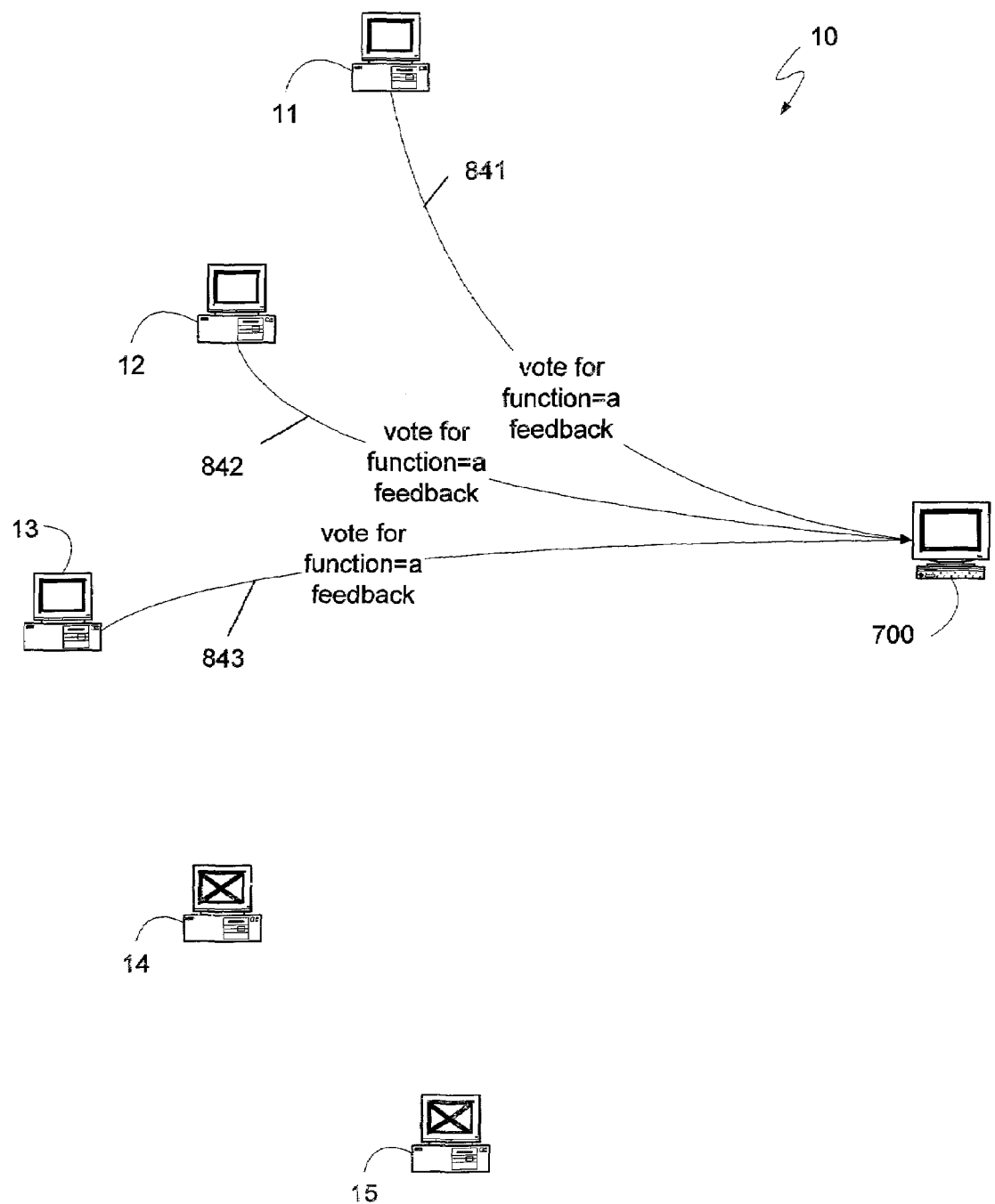

Turning to FIG. 9e, the system 10 is shown with its maximum number of failed devices. The client 700 can transmit request 840 in the same manner as above, but because devices 14 and 15 are both experiencing failures, the client 700 will not be able to obtain a quorum of votes, as shown in FIG. 9f. As shown, devices 11-13 can indicate that they will vote for request 840 with response messages 841-843, respectively. However, because the client 700 will not obtain a quorum, it does not believe that the function has been selected by the system 10, and it, or another monitoring device, can invoke a leader. As before, the leader can suggest a larger proposal number and can attempt to obtain last vote information from the devices in an effort to execute the client's request.

Figure 9G:
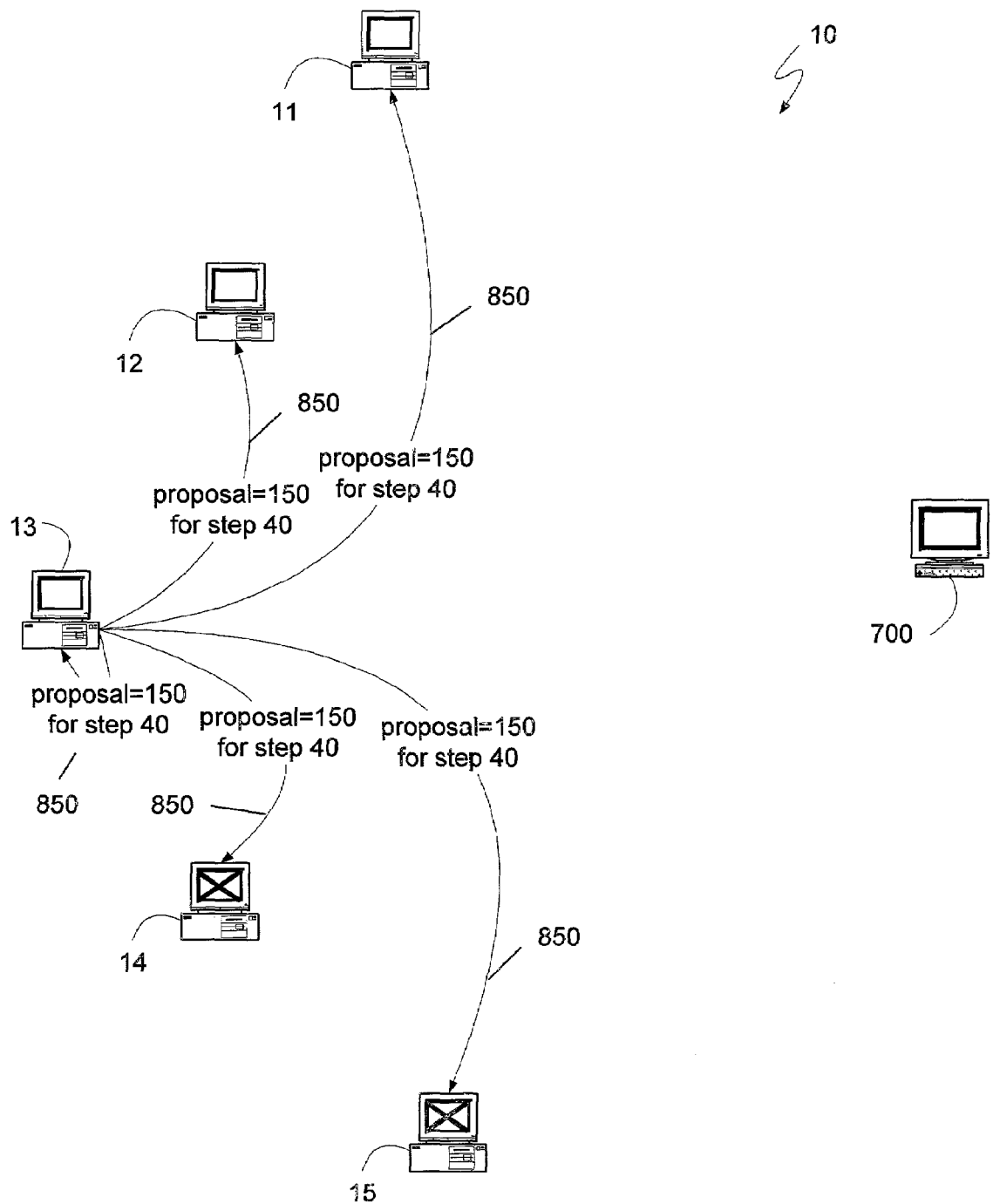
Figure 9H:
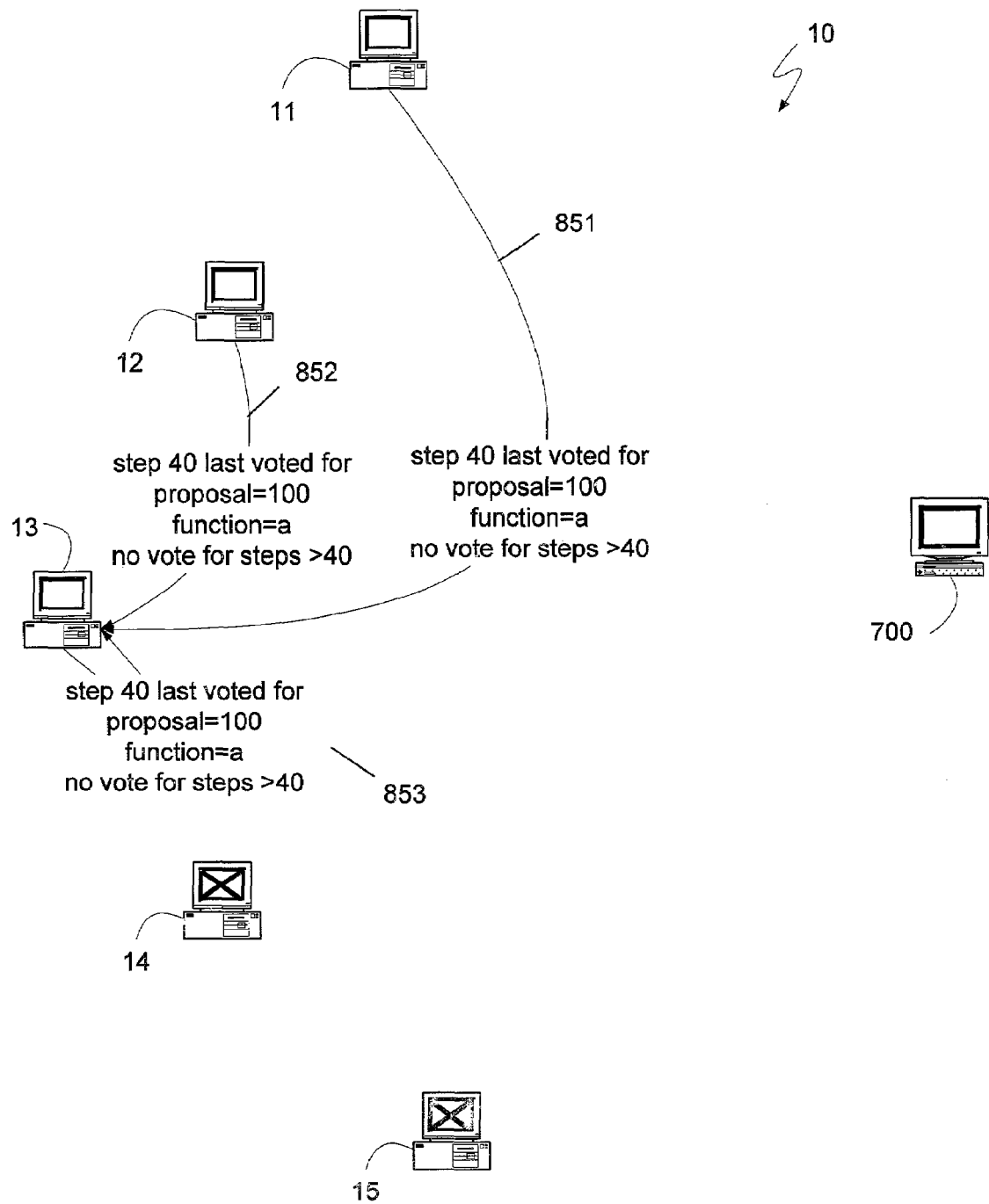
Figure 9I:
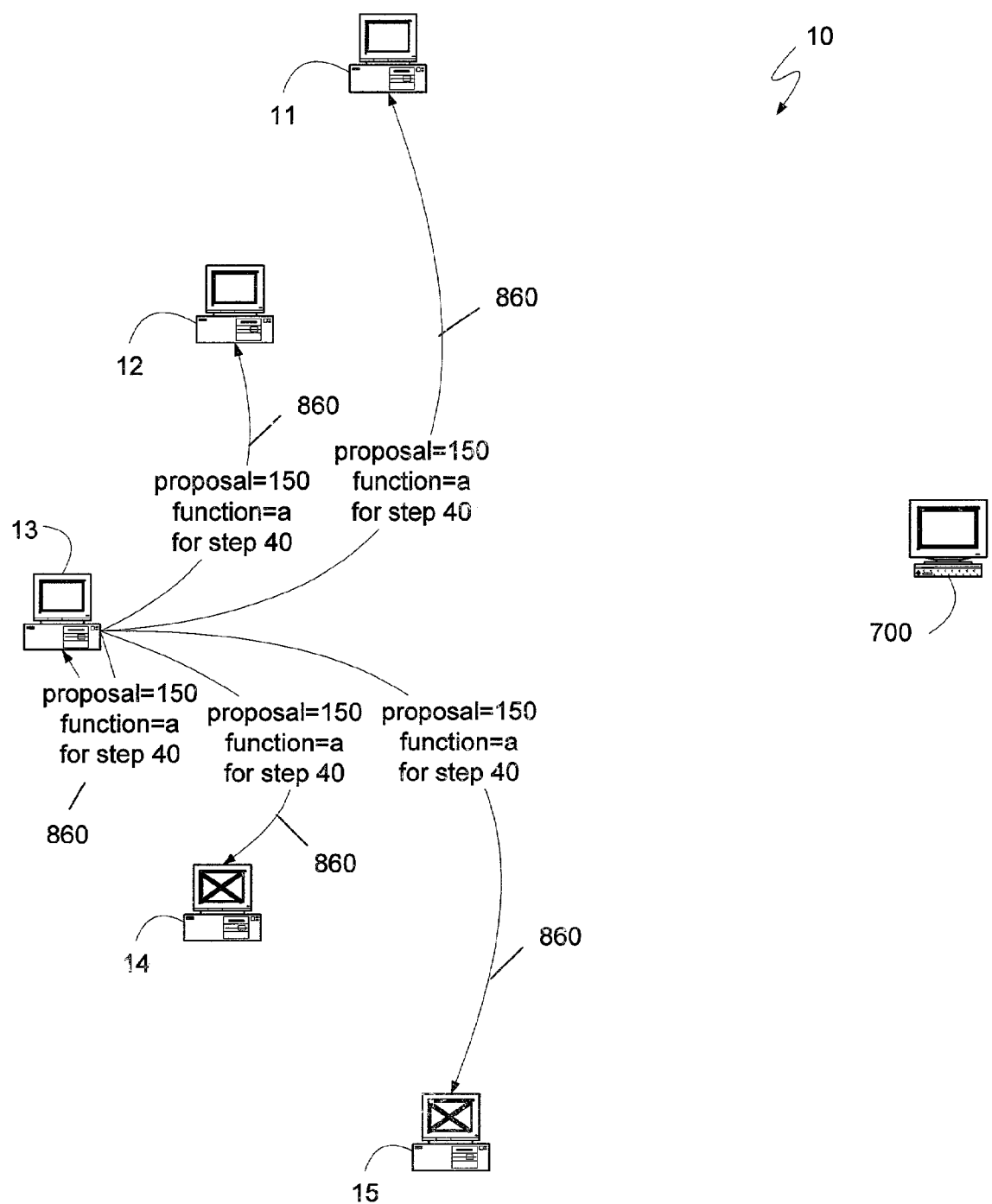
Figure 9J:
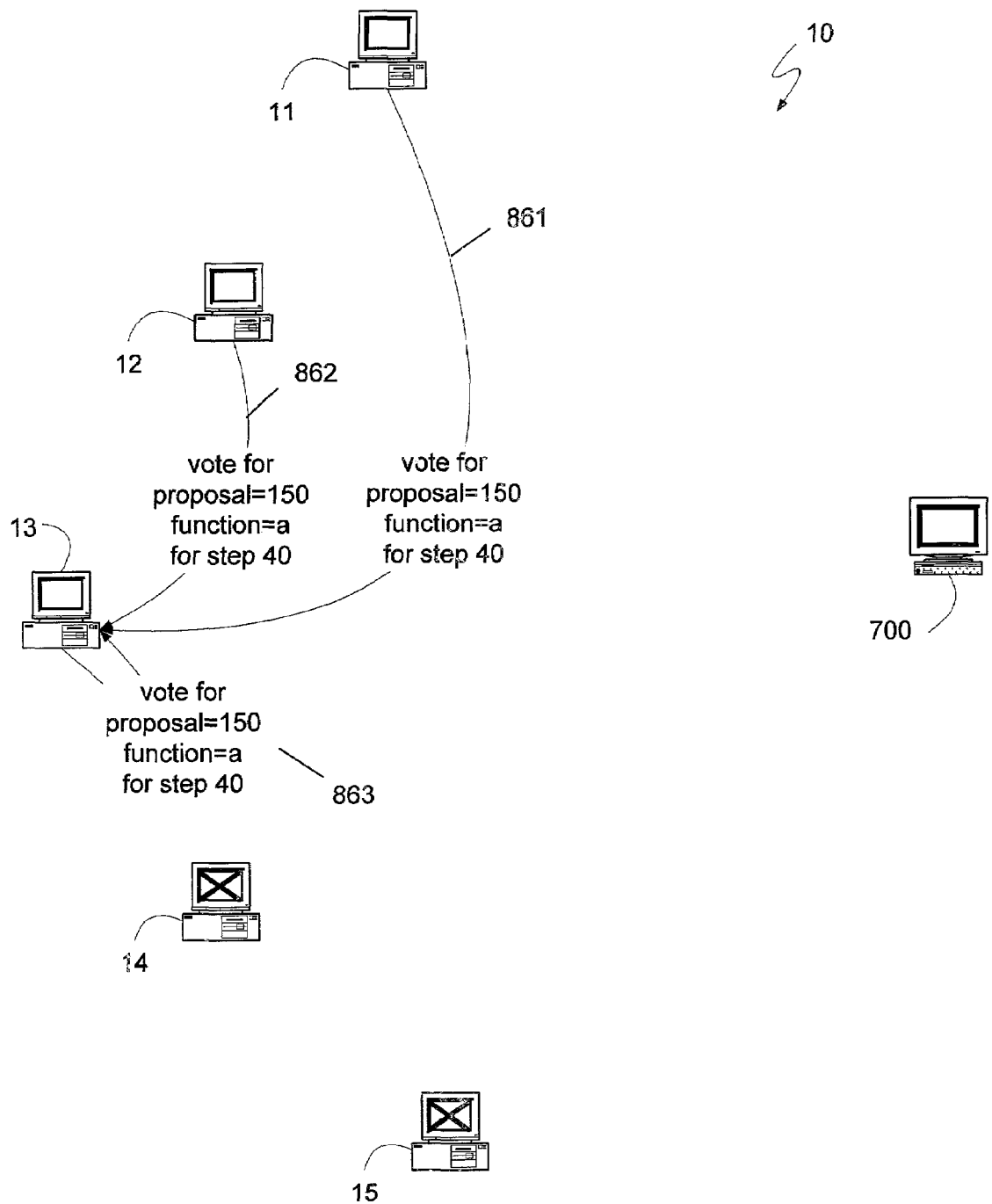
Figure 9K:
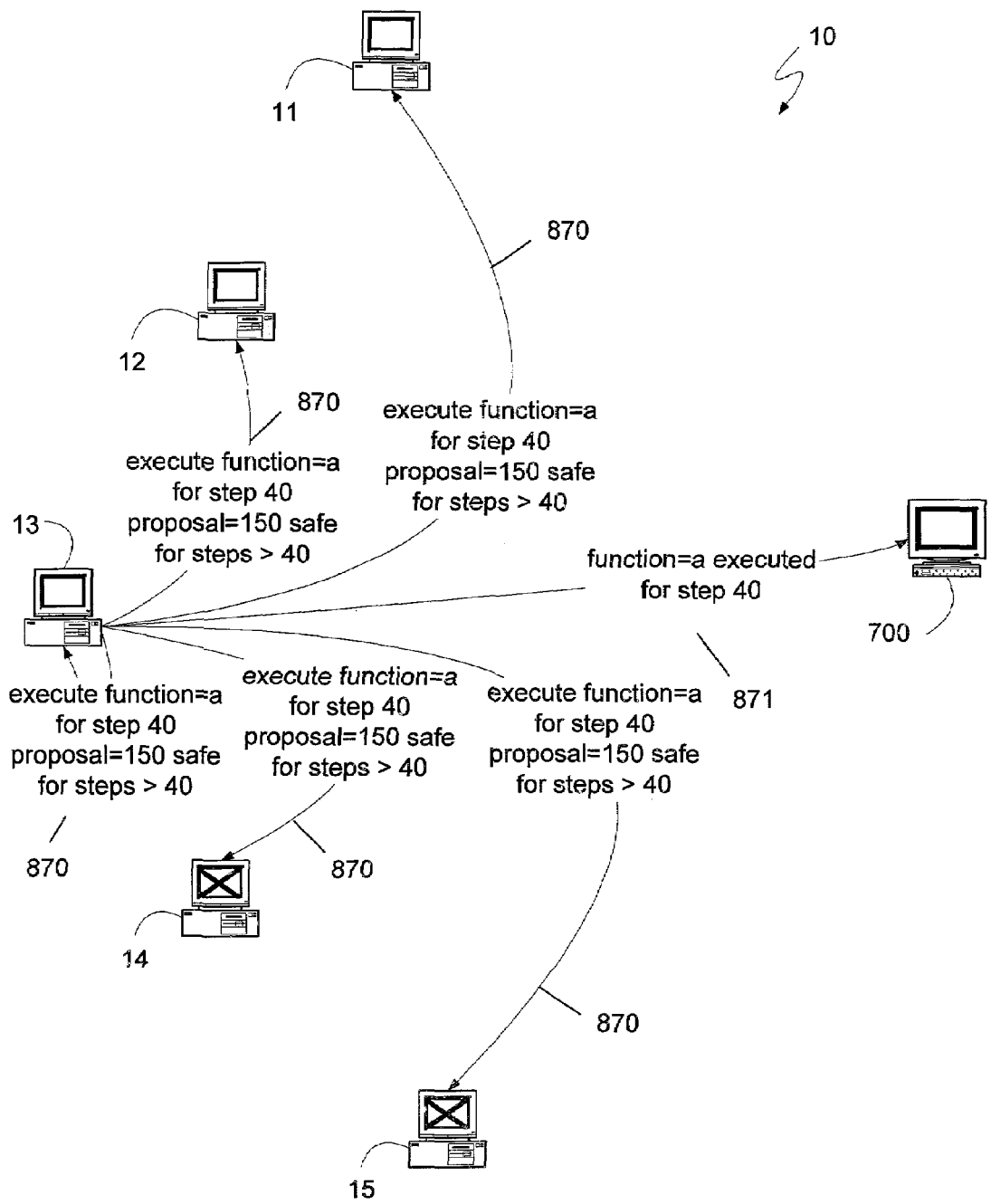

FIG. 9g illustrates device 13 acting as a leader and sending a suggested new proposal number message 850 to devices 11-15. In response, the leader can receive messages 851-853 from devices 11-13, respectively, indicating a last vote for function "a" as requested by the client 700, as shown in FIG. 9h. The leader can, based on the number of responses received, recognize that devices 14 and 15 have failed and that the system 10 can no longer obtain a quorum of four devices to use the message-delay-reducing algorithms above. Instead, the leader can submit a proposal for a vote using the previously suggested proposal number in the manner described in the detailed description of the Paxos algorithm above. FIG. 9i illustrates leader 13 transmitting, as message 860, the proposal to vote for function "a" using the proposal number from message 850. In response, the leader can obtain messages 861-863 from devices 11-13, as shown in FIG. 9j. Because the Paxos algorithm can use a simple majority as a quorum, the devices 11-13 constitute a quorum and the leader 13 can signal, as shown by message 870 in FIG. 9k, that the devices should execute function "a", and the leader can also similarly inform the client 700 of the execution of function "a", with message 871.

As before, if two devices had made requests, and neither achieved a quorum, the leader could attempt to determine requests that may have been selected and, could select them one at a time and attempt to have the system vote for them. A similar situation would exist if only three devices were operational and two clients made requests. In such a case, while the leader might abort due to an uncertainty regarding the two proposed values with the same proposal number, the leader could recognize that the system 10 could use the Paxos algorithm described above, and the leader could request that all of the devices forward client requests, rather than attempting to respond, as would be the case with the message-delay-reducing algorithms.

If the number of devices needed for a quorum can be expressed as N−a, where a is smaller than the maximum number of devices that can fail at any one time, F, then a system having more than 2a+F number of devices can implement the message-delay-reducing algorithms described above if the number of failures does not exceed "a", and as long as the number of devices is also greater that 2F as required by the Paxos algorithm, as described above. Once the number of failures exceeds "a", the system can revert to the Paxos algorithm described above. As can be seen from the above examples, for the message-delay-reducing algorithms to operate properly, a leader should be able to identify a unique value that may have been selected by a previous quorum. To ensure a unique value, despite the fact that proposals may share the same proposal number, the above algorithms rely on the fact that a properly sized quorum will share at least a majority of its devices with any other quorum, such that the majority vote for a proposal provides a unique value and an indication of the value previously selected. Therefore, if N−a devices constitute a quorum, then, even if all F devices that can fail are in that quorum, the remaining devices can be at least a majority of another quorum. Mathematically, if N−a−F are the remaining devices from a first quorum that selected a proposal, then N−a−F>(N−F)/2, which can be a majority of the remaining operational devices that constitute the quorum. Multiplying both sides by 2 yields: 2N−2a−2F>N−F. Subtracting N from both sides yields: N−2a−2F>−F. Consolidating results in the above requirement that N>2a+F.

Therefore, a system with greater than 2a+F number of devices can implement the message-delay-reducing algorithms described above if a quorum is defied as at least N−a devices. Alternatively, if fewer than N−a devices are operational, such as N−F devices, then the system can implement the Paxos algorithm to achieve a consensus. The variable "a", therefore, can indicate the maximum number of failures that can occur before the system can revert to the Paxos algorithm. As can be seen, while a system with a larger "a" can continue to use the efficient algorithms above in the face of more failures, such robustness can come at the cost of additional devices in the system. As will also be obvious to those skilled in the art, setting "a" equal to F yields a system that can use the efficient algorithms continually, but requires the full N>3F number of devices derived above.

Fast Database Commit

The above algorithms can be used in computing situations where a client can perform a series of tasks and, at the end of a session, seek to either save those efforts, through a commit command, or abort them. Such a system, commonly used to access large databases, can benefit from the above algorithms by providing distributed copies of a database, or replicas, to determine whether to commit a client's efforts, or abandon them and revert back to the state prior to the operations performed by the client during a given session. As will be known by those skilled in the art, such systems generally implement an algorithm known as a "two phase commit", in which a client can send a commit or abort message to a leader, that can then pass the message along to various distributed devices, such as database replicas. If each of them agrees to a commit, then the leader can send an instruction to perform a commit and return the results back to the client. However, if the leader fails, such a system can become significantly less robust and introduce delays. As will be shown, the present invention contemplates a "three phase commit" or a "non-blocking commit." Additional information regarding two phase commit algorithms can be found in the book entitled "Concurrency Control and Recovery in Database Systems" by Philip A. Bernstein, Vassos Hadzilacos, and Nathan Goodman, published by Addison-Wesley in 1987, the disclosure of which is incorporated herein by reference in its entirety.

Figure 10A:
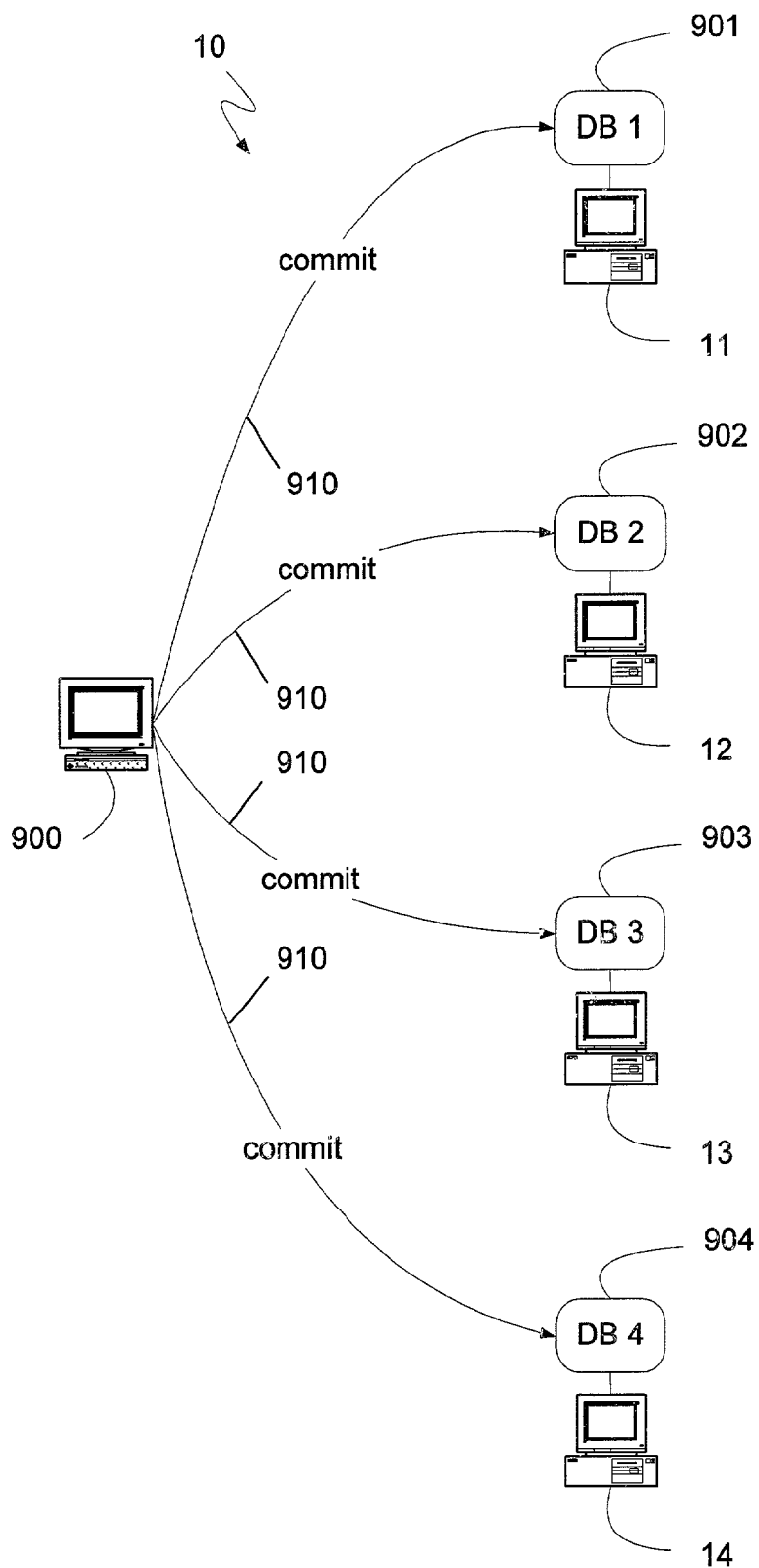
FIGS. 10a-10e generally illustrate a fast transaction commit algorithm.

Turning to FIG. 10a, a database client 900 can send a commit request 910 to database replicas 901-904, which can be implemented on computing devices, such as computing device 100 illustrated in FIG. 2, that also act as devices 11-14 in an exemplary distributed computing system 10. The commit request 910 can seek to have the database replicas 901-904 store the modifications or other work that the user performed on a cached copy of the database, in a manner known to those skilled in the art. Upon receipt of commit message 910, the database replicas 901-904 can individually determine whether to attempt to carry out the user's commit request, or whether to attempt to abort. A database replica can abort a user's session, even if the user sought to commit their changes, if, for example, the database detects that another user has made a change that conflicts with the first user's commit request, or the database detects an error.

Figure 10B:
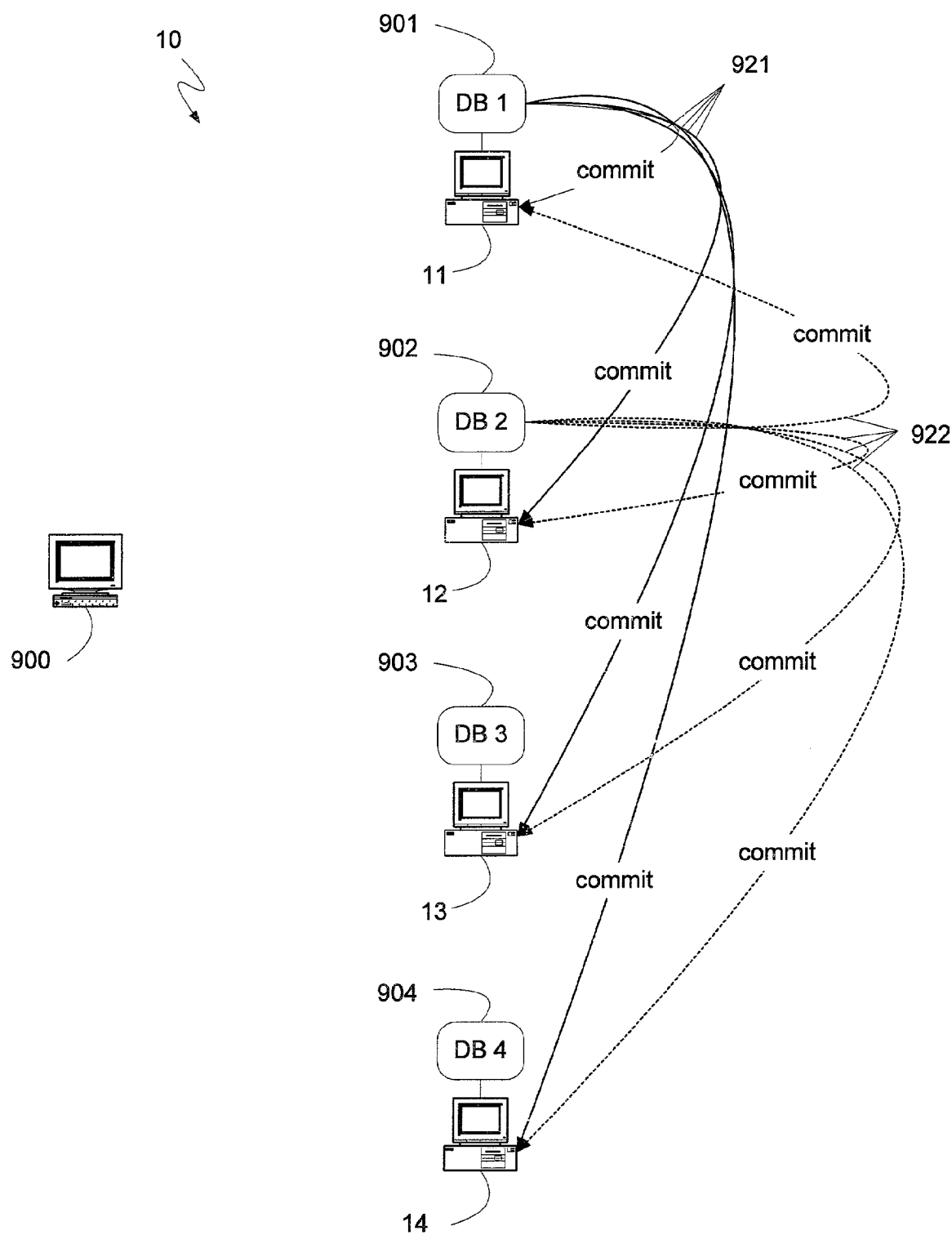

If database replicas 901-904 determine that they will attempt to execute the user's commit request, they can use the above algorithms to ensure that each replica remains synchronized with the other replicas. For example, as shown in FIG. 10b, each of the replicas 901-904 can send a message to each of the devices 11-14 requesting that the devices vote for a commit function. For simplicity, FIG. 10b illustrates only requests 921 and 922 from replicas 901 and 902, respectively. However, it is to be understood that each of the replicas 901-904 sends requests, such as requests 921 and 922 to each of the devices 11-14. When sending the requests, such as requests 911 and 922, the replicas 901-904 act as clients of the distributed computing system 10 comprising devices 11-14. Specifically, using the message-delay-reducing algorithm described in detail above, each of the devices 11-14, upon receiving the requests can assign the requests the safe proposal number determined initially by a leader, and can vote for the request, if appropriate.

Figure 10C:
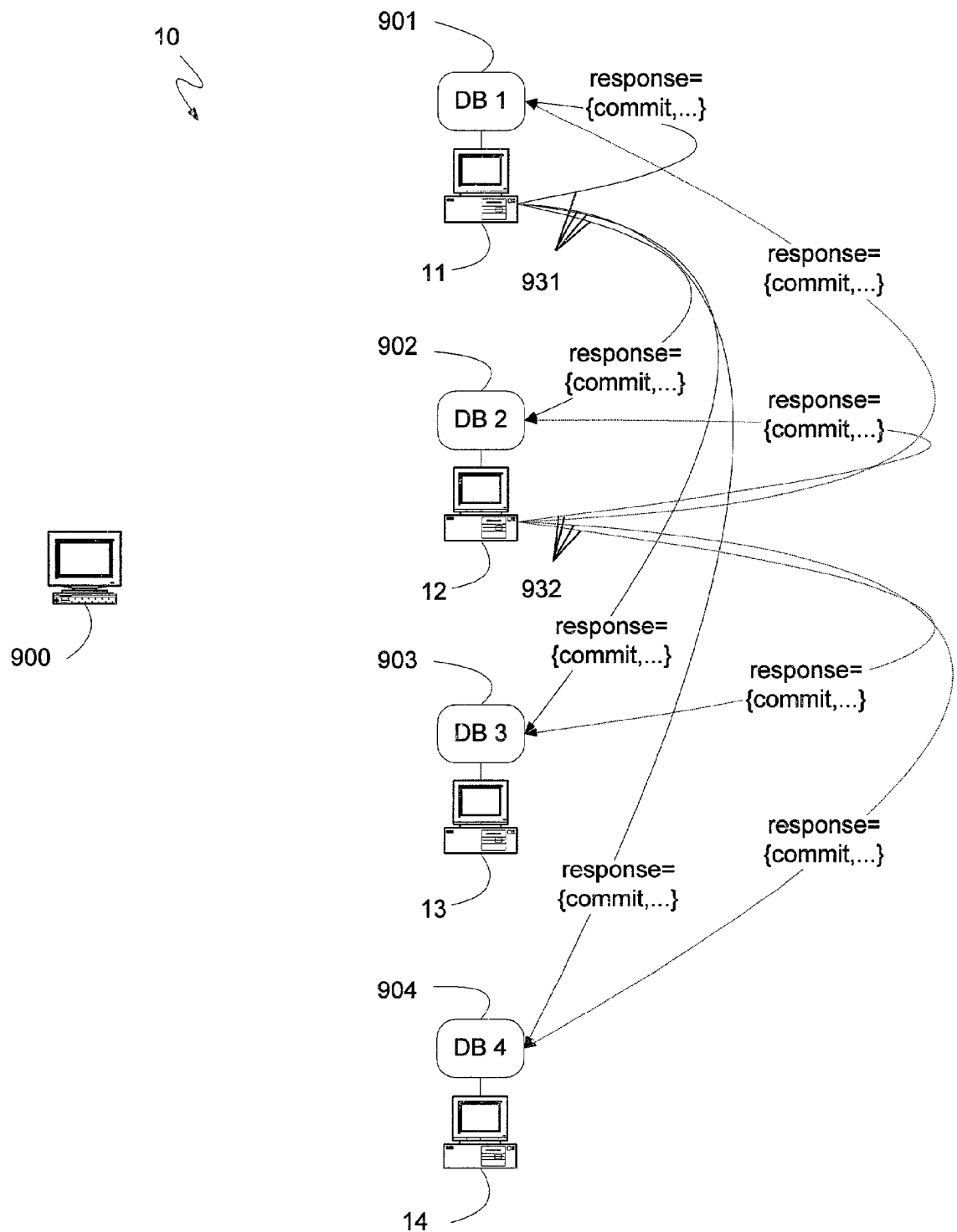

If any of the replicas request an abort, then all of the replicas can abort to remain synchronized with the aborting replica. Therefore, prior to voting for the replicas' requests, each of the clients 11-14 can wait to receive a request, such as requests 921 and 922, from all of the replicas 901-904 to determine if any of the replicas requested an abort. If all of the replicas 901-904 requested a commit, then the devices 11-14 can vote for the commit and can return the response in response messages, such as messages 931 and 932. Again, as above, while only messages 931 and 932, from devices 11 and 12, respectively, are shown for simplicity, it is to be understood that each of the devices 11-14 sends a message, such as messages 931 and 932 to each of the replicas 901-904. Messages, such as messages 931 and 932 can contain a vector or array of responses indicating whether the sending device voted for a commit or abort for each of the replicas 901-904. Thus, in FIG. 10c, because each of the replicas had requested a commit in FIG. 10b, each of the response messages, such as messages 931 and 932, from the devices indicates that the devices voted for a commit for each of the replicas. As a result, each of the replicas 901-904 can commit whatever changes or work the database client 900 did.

Figure 10D:
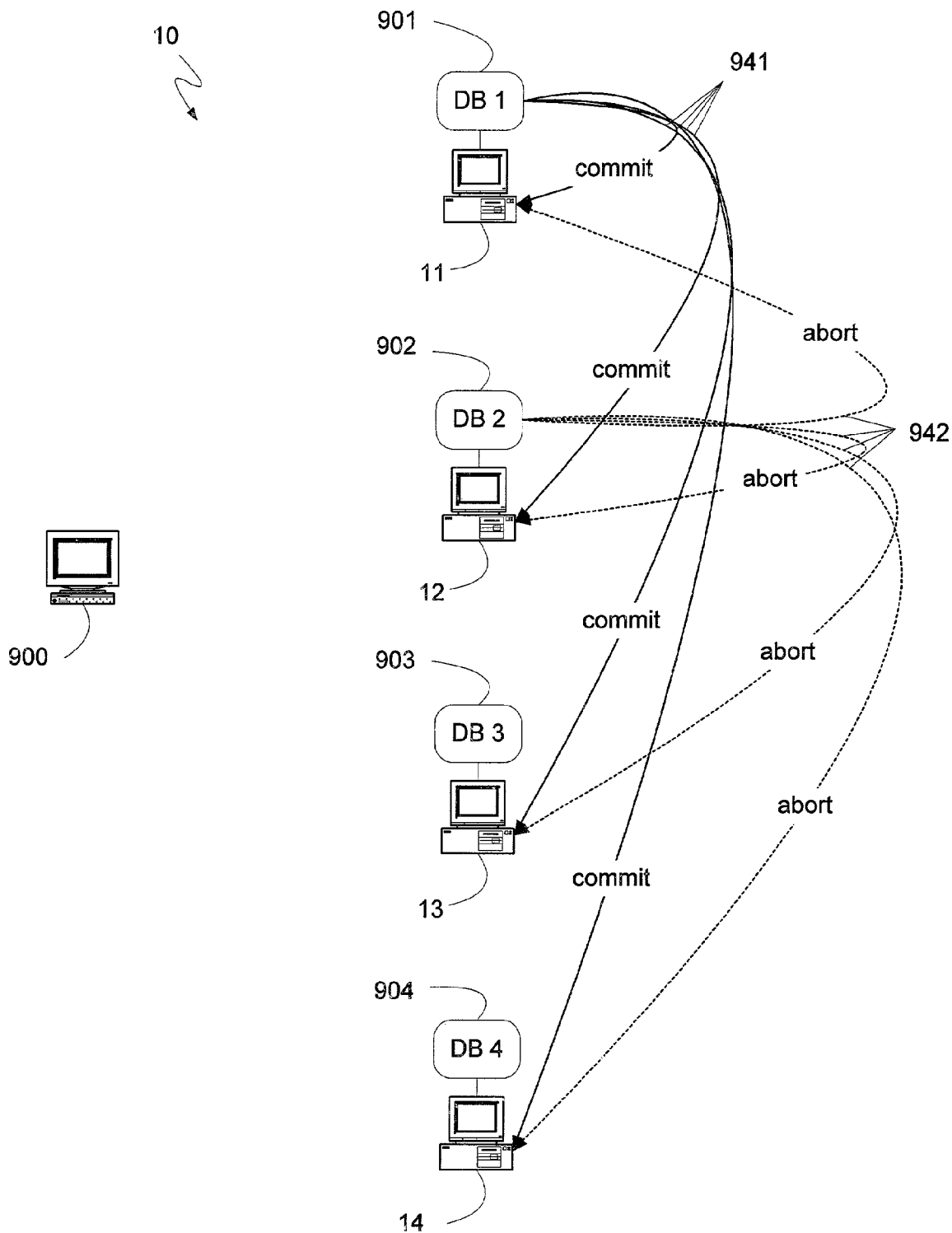
Figure 10E:
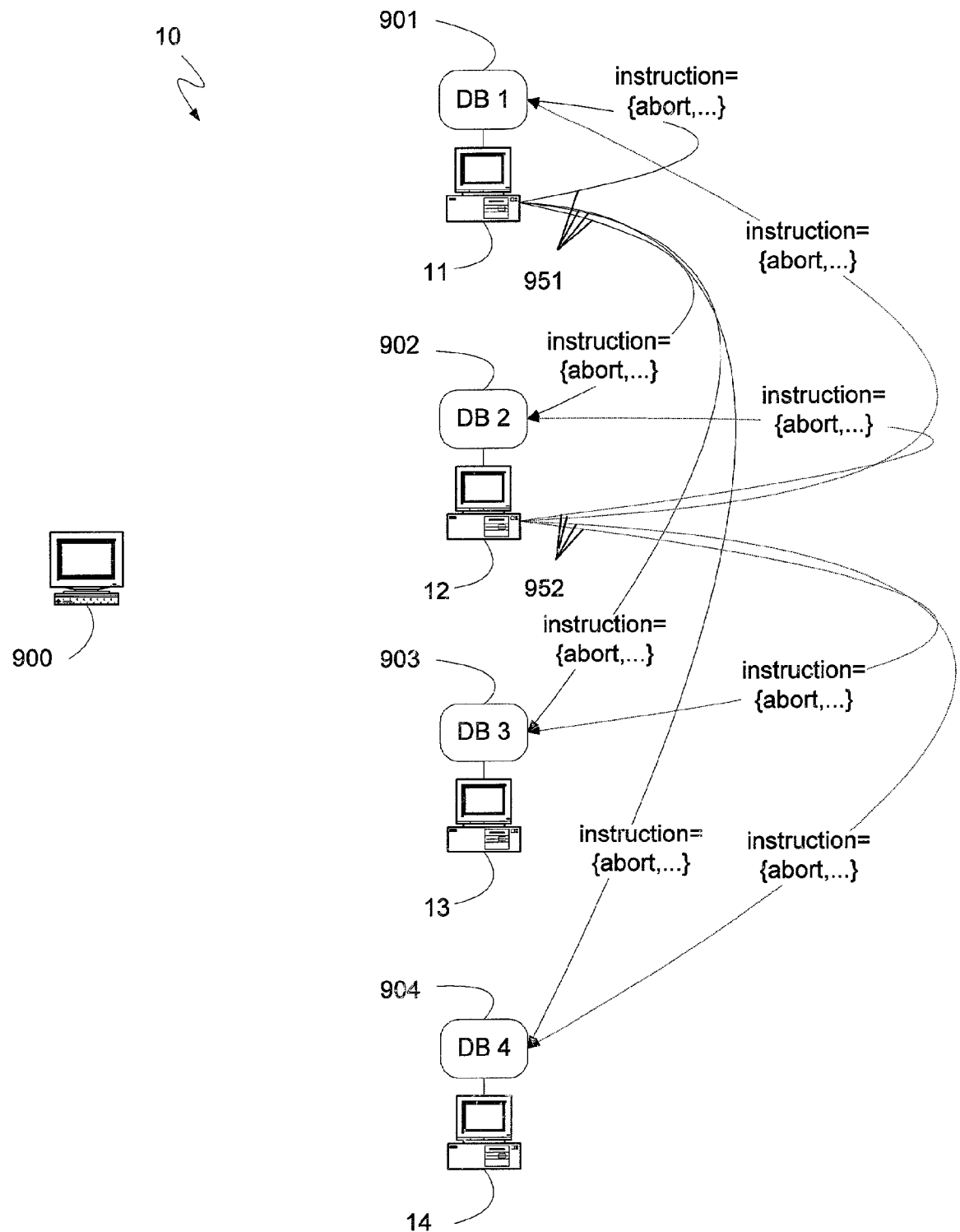

Turning to FIG. 10d, an analogous situation to that illustrated in FIG. 10b is shown. However, as shown in FIG. 10d, replica 902 detected a condition that resulted in it requesting an abort, despite the database client's request 910 for a commit. In such a case, replica 902 can transmit message 942 to the devices 11-14 requesting that they vote for an abort. Devices 11-14, upon receiving all of the requests, including request 942, can issue an abort instruction for all of the replicas, since at least one replica has requested an abort. Thus, instructions, such as instructions messages 951 and 952, shown in FIG. 10e, can instruct the replicas 901-904 to abort. As a result, each of the replicas can abort the database client's session and remain synchronized with each other.

The replicas 901-904 can also take advantage of the procedures described above if not all of the replicas make a request, or if one or more of the devices 11-14 fails. For example, each of the response messages, such as messages 931, 932, 951 and 952 can also be sent to all of the other devices 11-14, a leader, or both. Thus, if a device does not respond, or responds with a different vote than the other devices, a leader can, as described above, suggest a new proposal number and attempt to learn if either commit or abort was selected by a quorum of devices. If the leader cannot determine the selection of a quorum of devices, the leader can select a value from among the values that may have been chosen, and then, if that value is selected, can indicate that in a response to the replicas 901-904. Additionally, if using the message-delay-reduction algorithm described above, the number of devices can still be greater than twice the maximum number of devices that can fail at any one time, and a quorum of devices, which can be the minimum number of operational devices at any one time, can be used to select a commit or abort request. As also described above, the number of devices can be reduced, while still using the message-delay-reduction algorithm, if the system can revert to the Paxos algorithm if the number of failures increases beyond a threshold level.

As can be seen, the present invention provides a consensus algorithm with a reduction in the number of message delays by allowing clients to communicate directly with the devices of a distributed computing system. While a system that can allow its constituent devices to receive and act upon client requests can have more than three times the number of devices as the number of failures that can be occurring at any time, systems with fewer devices can still allow direct communication between clients and the devices of the system as long as the system can detect when too many devices have failed, and can revert to more conventional algorithms, such as the Paxos algorithm. The above algorithms can also ensure synchronization in distributed systems where a client can issue commit or abort commands. All of the references cited herein, including patents, patent applications, and publications, are hereby incorporated in their entireties by reference.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

I claim:

1. A method comprising:
synchronizing multiple devices in a distributed computing system when two or more of said multiple devices assign a same proposal number to two or more proposals by:
if the distributed computing system has a number of said multiple devices that is greater than three times a number of failures tolerated by the distributed computing system, enabling direct communication of said multiple devices one to another and with client devices in the distributed computing system, such that said multiple devices are synchronized without designating a leader of said multiple devices that coordinates said proposals and voting to achieve the synchronizing;

determining if a majority of a quorum of said multiple devices voted for a particular one of said two or more proposals, wherein a size of the quorum is equal to a minimum number of operational devices defined as a number said multiple devices in the distributed computing system minus a number of failures tolerated by the distributed computing system;

submitting the particular one of said two or more proposals to remaining said multiple devices that did not vote for the particular said proposal; and if more of said multiple devices fail than the number of failures tolerated by the distributed computing system, performing the determining and submitting by a leader of said multiple devices.

2. A method as described in claim 1, wherein if the leader performs the determining and submitting, then the same proposal number is suggested by the leader.

3. A method as described in claim 1, wherein if the leader performs the determining and submitting, then the leader does not coordinate said proposals such that each said proposal has a unique proposal number.

4. A method as described in claim 1, wherein the two or more proposals are submitted to the respective two or more said devices by respective two or more clients.

5. A method comprising:

voting for a plurality of functions by a plurality of devices in a distributed computing system, wherein:
the plurality of functions has a same proposal number;
first and second quorums are formed by the plurality of devices; and
a size of the first and second quorums is selected such that the first and second quorums share a majority of said plurality of devices;

uniquely determining a particular said function of the plurality of functions selected by the first quorum by reference to a particular said function of the plurality of functions voted for by the majority of said plurality of devices in the second quorum, wherein the uniquely determining is performed without a leader device of the plurality of devices being designated to manage the voting among the plurality of devices in the distributed computing system if a number of said devices in the distributed computing system is greater than three times a number of failures tolerated by the distributed computing system; and if a number of failed devices exceeds the number of failures tolerated in the distributed computing system, using a leader to perform the uniquely determining.

6. A method as described in claim 5, wherein the particular said function is a unique value.

7. A method as described in claim 5, wherein:
the first quorum of said devices votes before the second quorum of said devices; and
said devices in the second quorum uniquely determine the particular said function selected by the first quorum by polling said devices in the second quorum.

8. A method as described in claim 5, wherein the proposal numbers are provided by respective said devices of the plurality that received respective requests for the respective functions from respective clients.

9. A distributed computing system comprising a plurality of devices, wherein the plurality of devices are configured to:

vote for a plurality of functions such that each said device of the plurality of devices votes for a respective said function of the plurality of functions of the plurality of functions; and be synchronized when two or more said devices of the plurality assign a same proposal number to two or more proposals by determining if a majority of a quorum of said devices of the plurality voted for a particular said proposal of the two or more proposals and submitting the particular said proposal of the two or more proposals to remaining said devices of the plurality, wherein:

if a number of said devices of the plurality in the distributed computing system is greater than three times a number of said device failures tolerated by the distributed computing system, direct communication of said devices of the plurality with client devices in the distributed computing system is enabled, such that said devices of the plurality are synchronized without designating a leader of said devices of the plurality that coordinates said proposals and voting to achieve the synchronizing; and if a number of failed devices exceeds the number of said device failures tolerated, a leader device is selected from the plurality of devices to manage voting among the plurality of devices in the distributed computing system.

10. A distributed computing system as described in claim 9, wherein the two or more proposals are submitted to the respective two or more said devices of the plurality by respective two or more clients.

* * * * *